(12) United States Patent
Fukushige et al.

(10) Patent No.: US 7,846,511 B2
(45) Date of Patent: *Dec. 7, 2010

(54) TRANSPARENT FILM AND METHOD FOR MANUFACTURING THE SAME, POLARIZED PLATE AND IMAGE DISPLAY DEVICE

(75) Inventors: Yuuichi Fukushige, Kanagawa (JP); Rikio Inoue, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 648 days.

This patent is subject to a terminal disclaimer.

(21) Appl. No.: 11/795,534

(22) PCT Filed: Jan. 16, 2006

(86) PCT No.: PCT/JP2006/000904

§ 371 (c)(1),
(2), (4) Date: Jul. 18, 2007

(87) PCT Pub. No.: WO2006/077995

PCT Pub. Date: Jul. 27, 2006

(65) Prior Publication Data

US 2008/0158675 A1    Jul. 3, 2008

(30) Foreign Application Priority Data

| Jan. 18, 2005 | (JP) | 2005-010456 |
| Mar. 14, 2005 | (JP) | 2005-071040 |
| Nov. 30, 2005 | (JP) | 2005-346429 |

(51) Int. Cl.
*G02B 1/10* (2006.01)
*G02B 1/11* (2006.01)
*G02B 5/30* (2006.01)
*C08F 2/50* (2006.01)
*C08F 290/06* (2006.01)

(52) U.S. Cl. ............... 427/496; 428/421; 428/313.9; 427/501; 427/503; 552/63; 552/83; 552/99; 552/120; 552/167

(58) Field of Classification Search ............ 428/313.9, 428/411.1, 421, 323; 522/16, 26, 63, 167, 522/99, 120, 83; 427/496, 501, 503
See application file for complete search history.

(56) References Cited

U.S. PATENT DOCUMENTS

| 4,505,793 | A | * | 3/1985 | Tamoto et al. ............... 522/26 |
| 4,772,534 | A | * | 9/1988 | Kawamura et al. ........... 430/176 |
| 4,774,163 | A | * | 9/1988 | Higashi .................. 430/281.1 |
| 6,794,469 | B2 | * | 9/2004 | Obayashi et al. ............ 526/247 |
| 6,863,841 | B2 | * | 3/2005 | Kirsch et al. ............ 252/299.61 |
| 6,908,647 | B2 | * | 6/2005 | Obayashi et al. ............ 428/1.32 |
| 7,041,429 | B2 | * | 5/2006 | Ohta et al. ............... 430/270.1 |
| 7,233,378 | B2 | * | 6/2007 | Obayashi et al. ............ 349/137 |
| 7,265,161 | B2 | * | 9/2007 | Leatherdale et al. ............ 522/25 |
| 7,270,883 | B2 | * | 9/2007 | Kato .......................... 428/421 |
| 7,419,707 | B2 | * | 9/2008 | Ando et al. .................. 428/1.1 |
| 7,435,531 | B2 | * | 10/2008 | Goto ..................... 430/271.1 |
| 7,502,088 | B2 | * | 3/2009 | Suzuki et al. ................ 349/141 |
| 7,629,051 | B2 | * | 12/2009 | Fukushige et al. .......... 428/421 |
| 2005/0207016 | A1 | * | 9/2005 | Ando ........................ 359/586 |
| 2006/0182945 | A1 | * | 8/2006 | Yoneyama et al. ........ 428/304.4 |
| 2006/0198021 | A1 | * | 9/2006 | Fukuda et al. ............... 359/490 |
| 2006/0233972 | A1 | * | 10/2006 | Muramatsu et al. ......... 428/1.31 |
| 2007/0042173 | A1 | * | 2/2007 | Nagaoka et al. ........... 428/313.9 |
| 2007/0047087 | A1 | * | 3/2007 | Fukuda et al. ............... 359/582 |
| 2007/0048509 | A1 | * | 3/2007 | Yoneyama et al. ........... 428/212 |
| 2007/0065660 | A1 | * | 3/2007 | Okamoto et al. ............. 428/328 |
| 2007/0086091 | A1 | * | 4/2007 | Sawanobori et al. ......... 359/582 |
| 2007/0207298 | A1 | * | 9/2007 | Suzuki et al. ................ 428/216 |
| 2007/0207307 | A1 | * | 9/2007 | Yoneyama et al. ........ 428/313.5 |
| 2008/0013019 | A1 | * | 1/2008 | Sugiyama .................... 349/108 |

FOREIGN PATENT DOCUMENTS

| JP | 55-77742 | A | 6/1980 |
| JP | 59-112870 | A | 6/1984 |
| JP | 60-90762 | A | 5/1985 |
| JP | 3-67697 | A | 3/1991 |
| JP | 4-301456 | A | 10/1992 |
| JP | 7-51641 | B2 | 6/1995 |
| JP | 7-311462 | A | 11/1995 |
| JP | 9-179299 | A | 7/1997 |
| JP | 11-189621 | A | 7/1999 |
| JP | 11-228631 | A | 8/1999 |
| JP | 11-268240 | A | 10/1999 |
| JP | 2000-275859 | A | 10/2000 |
| JP | 2000-313709 | A | 11/2000 |
| JP | 2000-338310 | A | 12/2000 |
| JP | 2002-156508 | A | 5/2002 |
| JP | 2003-222702 | A | 8/2003 |
| JP | 2003-300215 | A | 10/2003 |
| JP | WO 2004/017105 | A1 | 2/2004 |
| JP | 2004-285320 | A | 10/2004 |
| JP | 2004-341017 | A | 12/2004 |

OTHER PUBLICATIONS

International Search Report.

* cited by examiner

*Primary Examiner*—Susan W Berman
(74) *Attorney, Agent, or Firm*—Buchanan Ingersoll & Rooney PC

(57) ABSTRACT

A transparent film comprises: a transparent support; and a hard coat layer on the transparent support, wherein the hard coat layer is a layer which is obtained by: applying on a transparent support an applying composition comprising an ionizing radiation curable compound and at least one kind of active halogen compound; drying; and hardening by irradiation of ionizing radiation.

25 Claims, 6 Drawing Sheets

TRANSPARENT FILM AND METHOD FOR MANUFACTURING THE SAME, POLARIZED PLATE AND IMAGE DISPLAY DEVICE

This application is a national stage entry of PCT/JP2006/300904, filed Jan. 16, 2006.

TECHNICAL FIELD

The present invention relates to transparent film having excellent resistance to scratch and brittleness and to transparent film having more improved resistance to scratch where a sufficient reflection preventing property is still maintained as well as to a method for manufacturing the same. It also relates to a polarized plate and an image display device using the transparent film.

BACKGROUND ART

In a display device such as cathode-ray tube display device (CRT), plasma display (PDP), electroluminescence display (ELD) and liquid crystal display (LCD), it is the most cases that film where a transparent layer which is called a hard coat layer is provided on a transparent support is adhered on a display image surface. Generally, a hard coat layer is a layer which is prepared in such a manner that a photopolymerization initiator is compounded with a liquid wherein a monomer having multifunctional group is placed, application and drying are conducted and, after that, hardening is done by irradiation of ionizing radiation such as UV light. Recently, transparent film having an antiglare property for prevention of ghost in the background of display image and for improvement of visual confirmation or transparent film having a preventive function for reflection has been frequently used.

Generally, in a film having an antiglare property, unevenness is intentionally formed on the film surface (the case of a hard coat surface is frequent) for making the light from outside into diffused reflection and, in addition, in a transparent film having a preventive function for reflection, a thin membrane having lower refractive index is formed on the surface of the hard coat layer in order to prevent a lowering of contrast and a ghost of image due to reflection whereby reflection rate is reduced using a principle of optical interference. Transparent film having both functions of antiglare property and prevention of reflection has been also put into the market.

Since the transparent film as such is placed on the outermost surface of the display, users may scrub the front side of the image display with a cleansing instrument or the like whereby scratch is apt to be formed. Therefore, it is important in view of resistance to scratch to enhance the film strength of the hard coat layer and also to make the hard coat layer thick.

However, the hard coat layer which is designed as such has an insufficient softness and flexibility and a bad brittleness and, when it is bent during a handling process of transparent film, cracks may be generated and it has been difficult that both resistance to scratch and brittleness are satisfied.

Incidentally, as one of optical polymerization initiators, active halogen compound has been known and is disclosed, for example, in JP-A-7-311462 and JP-A-9-179299. However, they are the patents where the use is limited to the use as color filters and they do not refer to the formation of hard coat layer as mentioned above.

On the other hand, in a reflection preventive film, it is common that, in order to prevent a lowering of contrast and a ghost of image due to reflection, a film for prevention of reflection is provided on the outermost surface of the display so as to reduce the reflection rate using a principle of optical interference. Therefore, there is a high possibility of scratch and it has been an important problem to give an excellent resistance to scratch.

The film for prevention of reflection as such is usually prepared by forming a low refractive layer having an appropriate film thickness on the outermost surface or, in some cases, by appropriately forming high refractive layer, medium refractive layer, hard coat layer, etc. between the support (base material). In order to achieve a low refractive index, a material having a refractive index of as low as possible is desired for a low refractive layer. Further, since the film for prevention of reflection is used at the outermost surface of the display, a high resistance to scratch is demanded. In order to achieve a high resistance to scratch in a thin membrane where thickness is around 100 nm, strength of the film itself and close adhesion to the lower layer are necessary.

In order to lower the refractive index of a material, there are some means such as introduction of fluorine atoms and lowering of density (introduction of voids) but any of them tend to deteriorate the film strength and close adhesion and to lower the resistance to scratch whereby it is a difficult problem that both low refractive index and high resistance to scratch are satisfied.

In JP-A-11-189621, JP-A-11-228631 and JP-A-2000-313709, there are descriptions for means where a polysiloxane structure is introduced into a fluorine-containing polymer whereby friction coefficient of the film surface is lowered and resistance to scratch is improved. Although such means are effective to some extent for the improvement of resistance to scratch, a sufficient resistance to scratch is not achieved, only by such means, for the film where essential film strength and close adhesion of interface are insufficient.

On the other hand, in JP-A-2002-156508, it is described that hardness increases when an optically hardening resin is hardened at low oxygen concentration. However, a reflection preventing film is efficiently manufactured by webs, there is a limitation for the concentration which is able to be substituted with nitrogen whereby a satisfactory hardness has not been achieved.

In JP-A-11-268240, JP-A-60-090762, JP-A-59-112870, JP-A-4-301456, JP-A-3-067697 and JP-A-2003-300215, there are descriptions for specific means for substitution with nitrogen. However, in order to lower oxygen concentration to such an extent that thin membrane such as low refractive layer is well hardened, there is a problem that large amount of nitrogen is necessary and the cost for manufacture rises.

In JP-B-07-051641, there is a description for a method to wind on a hot roll surface followed by irradiating with ionizing radiation. However, it is also insufficient for hardening until a special thin membrane such as a low refractive layer is well hardened.

In JP-A-55-077742, there is a description for a novel compound for avoiding the fact that conventional active halogen compound is accompanied by sublimation or bad smell. However, such a novel compound is used by combining with an alkali-soluble binder in a system of photoresist.

DISCLOSURE OF THE INVENTION

An object of the present invention is to provide a transparent film having a hard coat layer in which sufficient resistance to scratch and brittleness are satisfied and a transparent film in which resistance to scratch is further improved while a sufficient reflection preventing ability is still available. Another object of the present invention is to provide a method for the manufacture of the transparent film as such.

Still another object of the present invention is to provide a polarizing plate and an image display device provided with the aforementioned transparent film.

As a result of intensive investigations, the present inventor has found that, when an active halogen compound is used as an optical polymerization initiator for formation of hardened layer such as a hard coat layer, it is hardly inhibited by oxygen in a hardening step by ionizing radiation whereby a hard coat layer where polymerization density is uniform in the direction of thickness or, in other words, a hard coat layer where brittleness, close adhesion and resistance to scratch are good is obtained.

It has been also found that the active halogen compound is suitable for formation of low refractive layer as well.

The above-mentioned objects are able to be achieved by the following constitutions.

1. A transparent film comprising: a transparent support; and a hard coat layer on the transparent support, wherein the hard coat layer is a layer which is obtained by: applying on a transparent support an applying composition comprising an ionizing radiation curable compound and at least one kind of active halogen compound; drying; and hardening by irradiation of ionizing radiation.

2. The transparent film according to the above 1, wherein the ionizing radiation curable compound is a compound having two or more ethylenic unsaturated groups.

3. The transparent film according to the above 1 or 2, wherein the applying composition forming the hard coat layer further comprises light-transmitting particles having an average particle size of 0.5 to 10.0 μm.

4. The transparent film according to the above 2 or 3, wherein the applying composition forming the hard coat layer further comprises a good solvent and a poor solvent to the ionizing radiation curable compound.

5. The transparent film according to the above 3 or 4, wherein an average roughness of center line (Ra) of a surface of the hard coat layer is 0 to 0.5 μm.

6. The transparent film according to any of the above 3 to 5, wherein a surface haze of the hard coat layer is 0 to 40%.

7. The transparent film according to any of the above 1 to 6, further comprising: a low refractive layer where refractive index is less than the hard coat layer to an extent of 0.05 or more, the low refractive layer provided at an opposite side to the transparent support with respect to the hard coat layer.

8. The transparent film according to the above 7, wherein the low refractive layer is formed by using an applying composition comprising a fluorine-containing polymer.

9. The transparent film according to the above 8, wherein the fluorine-containing polymer is a heat-curable and/or ionizing radiation curable fluorine-containing polymer represented by the following formula 1 or 2.

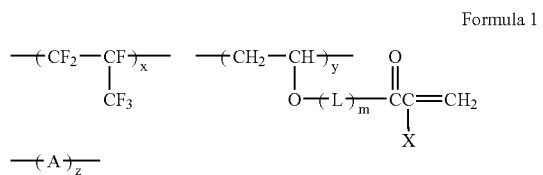

Formula 1

[In the formula 1, L is a connecting group having 1 to 10 carbon(s); m is 0 or 1; X is hydrogen atom or methyl group; A is any polymer unit of vinyl monomer, A may be either a single component or may be constituted from plural components, and A may comprise a silicone moiety; x, y and z each is molar % of each constituting component and is a value satisfying the relation of $30 \leqq x \leqq 60$, $5 \leqq y \leqq 70$ and $0 \leqq z \leqq 65$ with a proviso that $x+y+z=100$.]

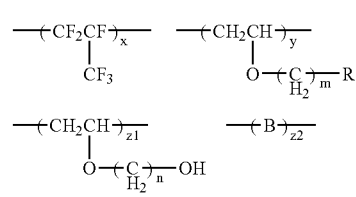

Formula 2

In the formula 2, R is an alkyl group having 1 to 10 carbon(s) or an ethylenic unsaturated group (—C(═O)C(—X)═CH$_2$) in the formula 1; m is an integer of $1 \leqq m \leqq 10$; n is an integer of $2 \leqq n \leqq 10$; B is a repeating unit derived from any vinyl monomer and it may be a single composition or may be constituted from plural compositions or it may contain a silicone moiety; and x, y, z1 and z2 each is molar % of each repeating unit in which x and y each satisfies $30 \leqq x \leqq 60$ and $0 \leqq y \leqq 70$ and z1 and z2 each satisfies $1 \leqq z1 \leqq 65$ and $1 \leqq z2 \leqq 65$ with a proviso that $x+y+z1+z2=100$.

10. The transparent film according to any of the above 7 to 9, wherein the applying composition forming the low refractive layer comprises a polysiloxane-containing yinyl monomer.

11. The transparent film according to the above 10, wherein the polysiloxane-containing vinyl monomer is represented by the following formula I.

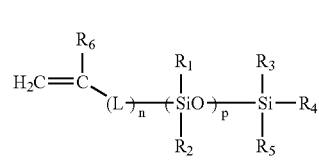

(Formula I)

In the formula I, $R_1$ and $R_2$ may be same or different and each is hydrogen atom, alkyl group or an aryl group; p is an integer of 10 to 500; $R_3$, $R_4$ and $R_5$ may be same or different and each is hydrogen atom or a univalent organic group; $R_6$ is hydrogen atom or methyl group; L is a single bond or a divalent connecting group; and n is 0 or 1.

12. The transparent film according to any of the above 7 to 11, wherein the aforementioned low refractive layer comprises fine hollow silica particles.

13. The transparent film according to any of the above 7 to 12, wherein the low refractive layer is a layer which is obtained by: applying on a transparent support an applying composition comprising an ionizing radiation curable compound and at least one kind of active halogen compound; drying; and hardening by irradiation of ionizing radiation.

14. The transparent film according to any of the above 1 to 13, further comprising an antistatic layer provided between the transparent support and the hard coat layer.

15. The transparent film according to any of the above 1 or 13, wherein the active halogen compound is a compound represented by the following formulae (1) to (4).

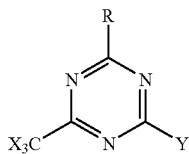

Formula (1)

In the formula (1), X is halogen atom; Y is —CX$_3$, —NH$_2$, —NHR', —NR'$_2$ or —OR' in which R' is an alkyl group or an aryl group; and R is —CX$_3$, an alkyl group, a substituted alkyl group, an aryl group, a substituted aryl group or a substituted alkenyl group.

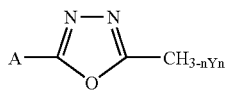

Formula (2)

In the formula (2), A is phenyl group, naphthyl group, substituted phenyl group or substituted naphthyl group in which a substituent is halogen atom, an alkyl group, an alkoxy group, nitro group, cyano group or methylenedioxy group; Y is halogen atom; and n is an integer of 1 to 3.

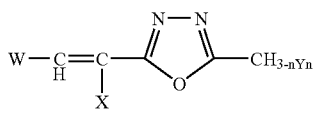

Formula (3)

In the formula (3), W is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, phenyl group or an alkyl group having 1 to 3 carbon(s); Y is halogen atom; and n is an integer of 1 to 3.

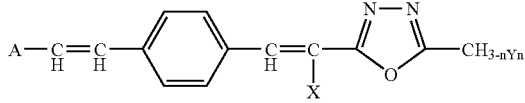

Formula (4)

In the formula (4), A is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, halogen atom, cyano group, an alkyl group or an alkyl group; Y is halogen atom; and n is an integer of 1 to 3.

16. The transparent film comprising: a transparent support; and a reflection preventing layer and a hard coat layer on the transparent support, wherein the reflection preventing layer is a layer which is obtained by hardening a compound comprising at least one kind of active halogen compound and an ionizing radiation curable compound with irradiation of ionizing radiation, the active halogen compound being a compound represented by the following formulae (1) to (4):

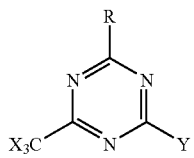

Formula (1)

In the formula (1), X represents halogen atom; Y represents —CX$_3$, —NH$_2$, —NHR', —NR'$_2$ or —OR' in which R' is an alkyl group or an aryl group; and R is —CX$_3$, an alkyl group, a substituted alkyl group, an aryl group, a substituted aryl group or a substituted alkenyl group;

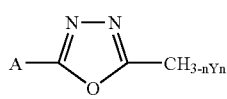

Formula (2)

In the formula (2), A is phenyl group, naphthyl group, substituted phenyl group or substituted naphthyl group in which a substituent is halogen atom, an alkyl group, an alkoxy group, nitro group, cyano group or methylenedioxy group; Y is halogen atom; and n is an integer of 1 to 3;

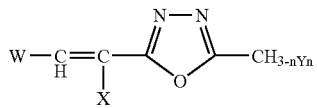

Formula (3)

In the formula (3), W is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, phenyl group or an alkyl group having 1 to 3 carbon(s); Y is halogen atom; and n is an integer of 1 to 3;

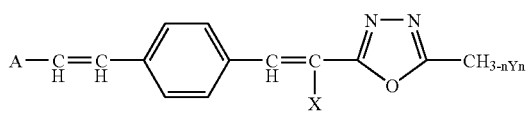

Formula (4)

In the formula (4), A is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, halogen atom, cyano group, an alkyl group or an alkyl group; Y is halogen atom; and n is an integer of 1 to 3.

17. A method for the manufacture of transparent film comprising at least one of a hard coat layer and a reflection preventing layer on a transparent support, the method comprising the step (1) and step (2) or (3) to form at least one layer of layers which are layered on the transparent support:

(1) a step where an applying liquid comprising at least one kind of active halogen compound and an ionizing radiation curable compound is applied on a web containing a support which runs continuously and then dried to form an applied layer;

(2) a step where ionizing radiation is irradiated for 0.5 second or longer under an atmosphere of not more than 3% by volume of oxygen concentration on the applied layer of the web to harden the applied layer; and (3) a step where the applied layer on the web is irradiated, together with heating, with ionizing radiation for 0.5 second or longer under an atmosphere of not more than 3% of oxygen concentration.

18. The method for the manufacture of transparent film according to the above 17, wherein, after the step (1) for forming the applied layer, (4) a step where the applied layer of the web is heated so that the applied layer is hardened by heating is provided and, after that, the step (2) or (3) is provided.

19. The method for the manufacture of the transparent film according to the above 17 or 18, wherein the web being continuously run and subjected to the step (1) or step (4) is conveyed in a previous chamber where oxygen concentration is made low by infusion of inert gas and, further, the web is conveyed in an ionizing radiation reaction chamber, being provided in connection with the previous chamber, where oxygen concentration is made not more than 3% by volume by infusion of inert gas whereupon a hardening step of the applied layer is conducted in the ionizing radiation reaction chamber.

20. The method for the manufacture of the transparent film according to the above 19, wherein the inert gas infused into the aforementioned ionizing radiation reaction chamber is blown out at least from the inlet side of the web of the aforementioned ionizing radiation reaction chamber.

21. The method for the manufacture of the transparent film according to the above 19 or 20, wherein, in the aforementioned hardening step (2) or (3) for the applying layer, the aforementioned ionizing radiation is irradiated for plural times to the applying layer on the web under the atmosphere of not more than 3% by weight of oxygen concentration and at least two irradiations of ionized radiation among the above are conducted in continued ionizing radiation chambers where oxygen concentration is not more than 3% by volume.

22. The method for the manufacture of the transparent film according to any of the above 19 to 21, wherein, in at least one of the surfaces constituting the inlet side of web of the aforementioned ionizing radiation reaction chamber and previous chamber, gap between the surface of the applying layer on the web is 0.2 to 15 mm.

23. The method for the manufacture of the transparent film according to any of the above 19 to 22, wherein, in at least one of the surfaces constituting the inlet side of web of the aforementioned ionizing radiation reaction chamber and previous chamber, at least a part of the surfaces constituting the inlet side of the aforementioned web is movable and, when a conjugating material to which the web is conjugated passes, at least the size corresponding to the thickness of the conjugating material is avoided.

24. The method for the manufacture of the transparent film according to any of the above 17 to 23, wherein the aforementioned method for the manufacture of the transparent film has a step where a land of front end lip of a slot die is made close onto the surface of a continuously running web being supported by a backup roll and an applying liquid is applied from a slot of the aforementioned front end lip and a land length in a web running direction of the front end lip in a proceeding direction of the web of the aforementioned slot die is 30 µm to 100 µm and, when the aforementioned slot die is set at the applying position, application is carried out using an applying device which is set in such a manner that the gap between the web and the front end lip at the reverse side in the proceeding direction of the aforementioned web is made larger to an extent of 30 µm to 120 µm from the gap between the web and the front end lip at the side in the proceeding direction of the aforementioned web.

25. The method for the manufacture of the transparent film according to any of the above 24, wherein viscosity of the aforementioned applying liquid during the application is not more than 2.0 [mPa·sec] and amount of the applying liquid applied onto the surface of the web is 2.0 to 5.0 [ml/m$^2$].

26. The method for the manufacture of the transparent film according to any of the above 24 or 25, wherein the aforementioned applying liquid is applied on the surface of the continuously running web at the rate of not less than 25 [m/min].

27. The transparent film according to the above 7 to 16, wherein the reflection preventing layer is manufactured by the method for the manufacture according to any of the above 17 to 26.

28. The transparent film according to the above 1 to 6, wherein the hard coat layer is manufactured by the method for the manufacture according to any of the above 17 to 26.

29. A polarizing plate comprising: a polarizing film; and two protective films for the polarizing film, wherein one of the two protectice films is the transparent film according to any of the above 1 to 16, 20 and 21.

30. An image display device comprising: a display; and a transparent film according to any of the above 1 to 16, 20 and 21 or a polarized plate according to the above 29, provided at the outermost surface of the display.

Figure 1:
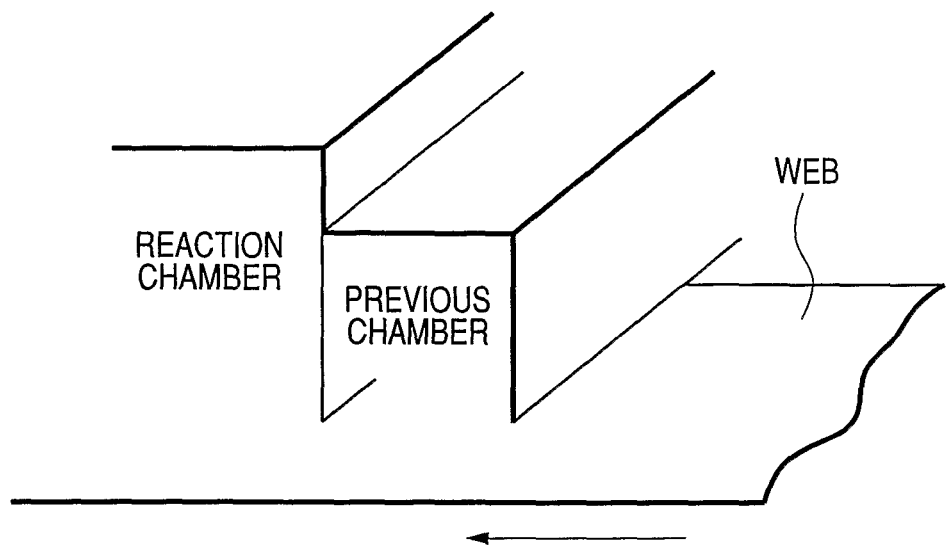
FIG. 1 is a schematic diagram showing a production apparatus provided with an ionizing radiation chamber and a previous chamber which are preferably used in the present invention.

A denotes a delivering roll; B denotes a take-up roll; 100, 200, 300, 400 denote a film making unit; 101, 201, 301, 401 denote an applying-liquid applying step; 102, 202, 302, 402 denote an applied film drying step; 103, 203, 303, 403 denote an applied film curing step; 1 denote an antireflection film; 2 denotes a transparent support; 3 denote a light scattering layer; 4 denotes a low refractive index layer; 5 denotes an optically transmissive particle; W denotes a web; 10 denotes a coater; 11 denotes a backup roll; 13 denotes a slot die; 14 denotes an applying liquid; 14a denotes a bead form; 14b denotes an applied film; 15 denotes a pocket; 16 denotes a slot; 16a denotes a slot opening; 17 denotes a front end lip; 18 denotes a land (flat portion); 18a denotes a upstream lip land; 18b denotes a downstream lip land; and $I_{up}$ denotes a land length of upstream lip land 18a.

BEST MODE FOR CARRYING OUT THE INVENTION

The present invention will now be illustrated in detail as hereunder. Incidentally, when numerals show values for physical property, values for characteristic, etc., the description reading "(numeral 1) to (numeral 2)" stands for "from (numeral 1) or more to (numeral 2) or less".

(Layer Constitution of Transparent Film)

The transparent film of the present invention (in the present invention, transparent film means a film having a transmission of 90% or more) has the following constitutions (1) and (2).

(1) There is at least a hard coat layer on a transparent support (hereinafter, it will be sometimes called a substrate or a substrate film) and, in the hard coat layer, an applying composition containing an ionizing radiation curable compound and at least one kind of active halogen compound is applied on a transparent support, dried and hardened by irradiation of ionizing radiation.

Further, in the transparent film having the above constitution, it is also preferred that the applying composition forming the hard coat layer contains light-transmitting particles having an average particle size of 0.5 to 10.0 μm, an ionizing radiation curable compound and at least one kind of active halogen compound and, in the present specification, a hard coat layer where unevenness is particularly formed on the surface (i.e., a hard coat layer into which light-transmitting particles are introduced) thereof is just called an antiglare layer.

Examples of the preferred constitution of the transparent film of the present invention having the above constitution are as follows.

Substrate film/hard coat layer;
Substrate film/antiglare layer;
Substrate film/antistatic layer/hard coat layer;
Substrate film/antistatic layer/antiglare layer;
Antistatic layer/substrate film/hard coat layer; and
Antistatic layer/substrate film/antiglare layer.

Incidentally, it is preferred that the antistatic layer is a layer containing electrically conductive polymer particles or fine particles of metal oxide (such as $SnO_2$ and ITO) and that may be provided by application, atmospheric plasma treatment, etc.

(2) If necessary, there is a hard coat layer on a transparent support and reflection preventing layer(s) is/are layered thereon where refractive index, membrane thickness, numbers of the layer, order of the layers, etc. are considered so as to reduce the reflectance by optical interference (hereinafter, the transparent film in such a constitution may sometimes be called "reflection preventing film").

Incidentally, when an active halogen compound is used in the formation of a hard coat layer in the aforementioned transparent film (1) and (2), it is possible to give a film having sufficient resistance to scratch and brittleness.

Further, it is preferred in the reflection preventing film of (2) that the reflection preventing layer or, particularly, a low refractive layer is a layer which is prepared in such a manner that an applying composition containing an ionizing radiation curable compound and at least one kind of active halogen compound is applied on a transparent support, dried and hardened by irradiation of ionizing radiation. When an active halogen compound is used in the low refractive layer, it is possible to prepare a film in which resistance to scratch is more improved while a sufficient reflection preventing property is still available.

(Layer Constitution of Reflection Preventing Film)

As mentioned already, in the reflection preventing film of the present invention, there is, if necessary, a hard coat layer which will be mentioned later on a support (hereinafter, it may sometimes be referred to as substrate or substrate film) and reflection preventing layer(s) is/are layered thereon where refractive index, membrane thickness, numbers of the layer, order of the layers, etc. are considered so as to reduce the reflectance by optical interference. The simplest constitution of the reflection preventing layer is that only a low refractive layer is applied, on the substrate. In order to further lower the reflectivity, it is preferred that the reflection preventing layer is constituted by a combination of a high refractive layer having higher refractive index than the substrate and a low refractive layer having lower refractive index than the substrate. Examples of the constitution are a two-layered one such as (high refractive layer)/(lower refractive layer) from the substrate side and three layers having different refractive index are layered in the order of (medium refractive layer [that is a layer having higher refractive index than the substrate or the hard coat layer but having lower refractive layer than the high refractive layer])/(high refractive layer)/(low refractive layer). Those in which more reflection preventive layers are layered have been also proposed. Among them, a product in which (medium refractive layer)/(high refractive layer)/(low refractive layer) are layered in that order on a substrate having a hard coat layer is preferred in view of durability, optical characteristic, cost, productivity, etc. In addition, the reflection preventive film of the present invention may also have functional layers such as antiglare layer and antistatic layer in addition to the aforementioned hard coat layer.

Preferred examples of the reflection preventive film of the present invention are as follows.

(Substrate film)/(low refractive layer)
(Substrate film)/(antiglare layer)/(low refractive layer)
(Substrate film)/(hard coat layer)/(antiglare layer)/(low refractive layer)
(Substrate film)/(hard coat layer)/(high refractive layer)/(low refractive layer)

(Substrate film)/(hard coat layer)/(medium refractive layer)/(high refractive layer)/(low refractive layer)

(Substrate film)/(antiglare layer)/(high refractive layer)/(low refractive layer)

(Substrate film)/(antiglare layer)/(medium refractive layer)/(high refractive layer)/(low refractive layer)

(Substrate film)/(antistatic layer)/(hard coat layer)/(medium refractive layer)/(high refractive layer)/(low refractive layer)

(Antistatic layer)/(substrate film)/(hard coat layer)/(medium refractive layer)/(high refractive layer)/(low refractive layer)

(Substrate film)/(antistatic layer)/(antiglare layer)/(medium refractive layer)/(high refractive layer)/(low refractive layer)

(Antistatic layer)/(substrate film)/(antiglare layer)/(medium refractive layer)/(high refractive layer)/(low refractive layer)

(Antistatic layer)/(substrate film)/(antiglare layer)/(high refractive layer)/(low refractive layer)/(high refractive layer)/(low refractive layer)

The reflection preventing film of the present invention is not particularly limited to those layer constitutions only so far as the reflectivity is able to be reduced by optical interference. The high refractive layer may be a light diffusing layer having no antiglare property. It is preferred that the antistatic layer is a layer containing electrically conductive polymer particles or fine particles of metal oxide (such as $SnO_2$ and ITO) and that is able to be provided by means of application, atmospheric plasma treatment or the like.

(Initiator)

The transparent film of the present invention has a layer in which an applying composition containing at least one kind of active halogen compound and an ionizing radiation curable compound is hardened by irradiation of ionizing radiation.

Examples of the active halogen compound are a compound in which halogen radical is directly generated by decomposition with ionizing radiation and a compound which generates halogen radical by a chemical decomposition by electron transfer from a coexisting substance, etc. and there may be listed carbon tetrabromide, iodonium, tribromoacetophenone, s-triazine and oxathiazole compound including 2-(p-methoxyphenyl)-4,6-bis(trichloromethyl)-s-triazine, 2-(p-methoxyphenyl)-4,6-bis(trichloromethyl)-s-triazine, 2-(p-styrylphenyl)-4,6-bis(trichloromethyl)-s-triazine, 2-(3-bromo-4-(ethyl acetate)amino)phenyl)-4,6-bis-(trichloromethyl)-s-triazine and 2-trihalomethyl-5-(p-methoxyphenyl)-1,3,4-oxadiazole.

Particularly in the present invention, it is particularly preferred to use at least one compound selected from the following formulae (1) to (4).

Hereinafter, the compounds represented by the formulae (1) to (4) will be illustrated.

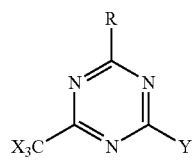

Formula (1)

In the formula (1), X is halogen atom; Y is —$CX_3$, —$NH_2$, —NHR', —$NR'_2$ or —OR' in which R' is an alkyl group or an aryl group; and R is —$CX_3$, an alkyl group, a substituted alkyl group, an aryl group, a substituted aryl group or a substituted alkenyl group.

With regard to the compound represented by the formula (1) used in the present invention, the compounds mentioned in Bull. Chem. Soc. Japan, 42, 2924 (1969) such as 2-phenyl-4,6-bis(trichloromethyl)-s-triazine, 2-(p-chlorophenyl)-4,6-bis(trichloromethyl)-s-triazine, 2-(p-tolyl)-4,6-bis(trichloromethyl)-s-triazine, 2-(p-methoxyphenyl)-4,6-bis(trichloromethyl)-s-triazine, 2-(2',4'-dichlorophenyl)-4,6-bis(trichloromethyl)-s-triazine, 2,4,6-tris(trichloromethyl)-s-triazine, 2-methyl-4,6-bis(trichloromethyl)-s-triazine, 2-n-nonyl-4,6-bis(trichloromethyl)-s-triazine and 2-(α,α,β-trichloroethyl)-4,6-bis(trichloromethyl)-s-triazine may be exemplified. Further, the compounds mentioned in British Patent No. 1,388,492 such as 2-styryl-4,6-bis(trichloromethyl)-s-triazine, 2-(p-methylstyryl)-4,6-bis(trichloromethyl)-s-triazine, 2-(p-methoxystyryl)-4,6-bis(trichloromethyl)-s-triazine and 2-(p-methoxystyryl)-4-amino-6-trichloromethyl-s-triazine may also be exemplified. Still further, the compounds mentioned in J. Org. Chem., 29, 1527 (1964) such as 2-methyl-4,6-bis(tribromomethyl)-s-triazine, 2,4,6-tris(tribromomethyl)-s-triazine, 2,4,6-tris(dibromomethyl)-s-triazine, 2-amino-4-methyl-6-tribromomethyl-s-triazine and 2-methoxy-4-methyl-6-trichloromethyl-s-triazine may also be exemplified.

In the formula (1), the case where a compound in which X is —$CX_3$ is used is particularly preferred. Preferred X is Cl, Br and F atoms.

Specific examples of the compound represented by the formula (1) are as follows.

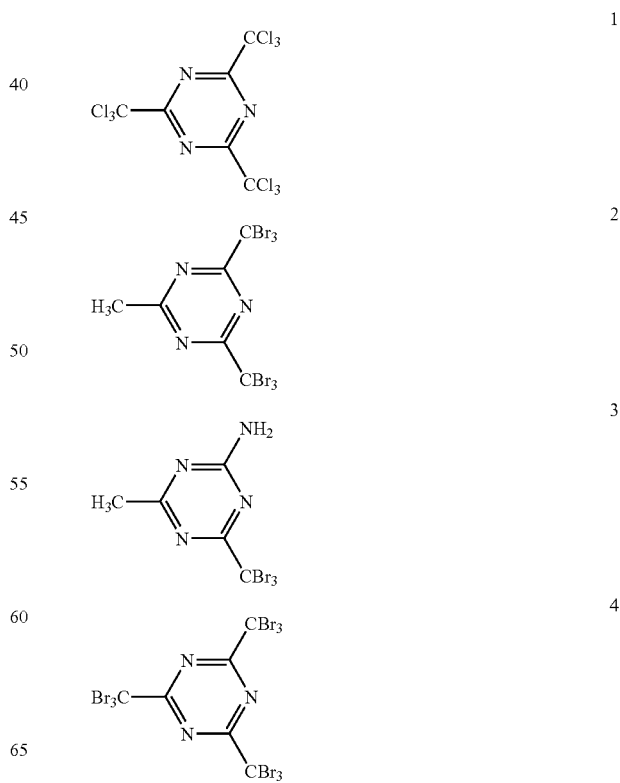

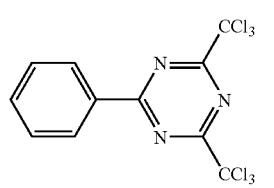
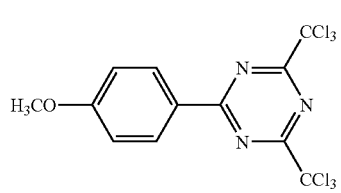
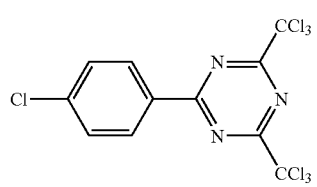
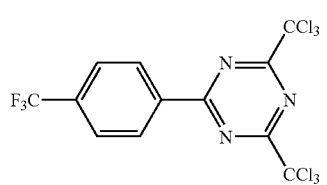
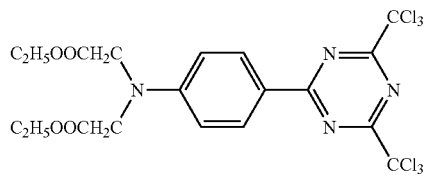
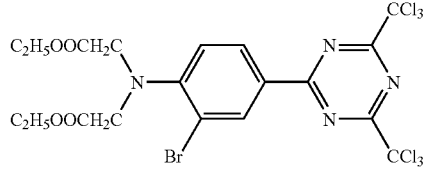
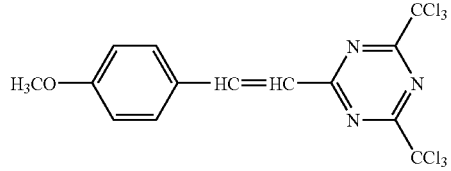
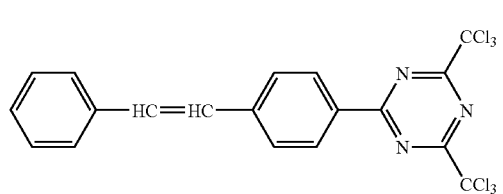
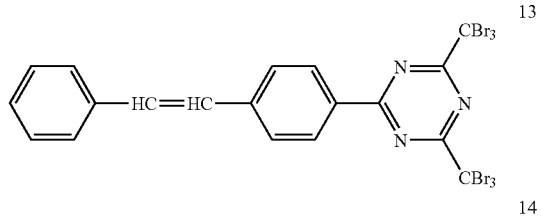
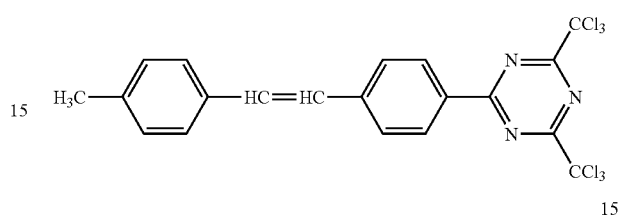
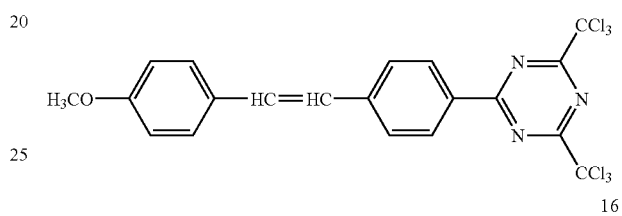
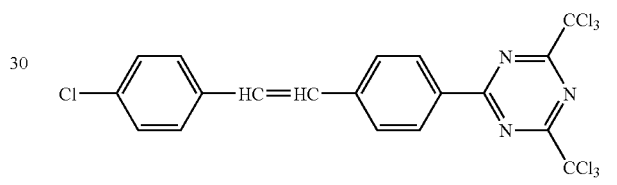
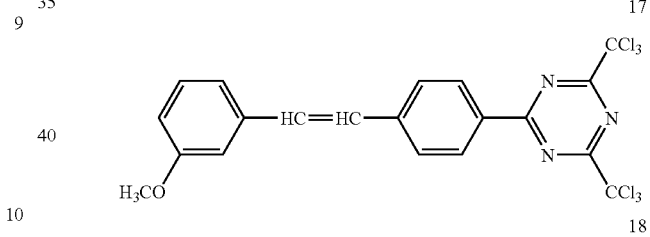
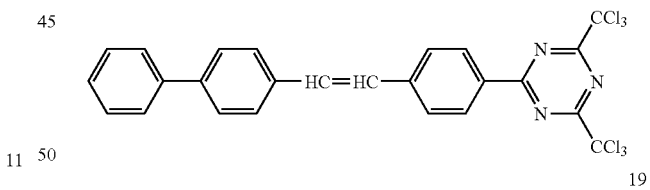
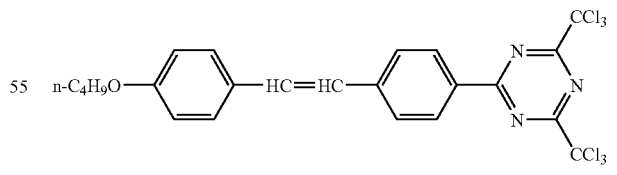
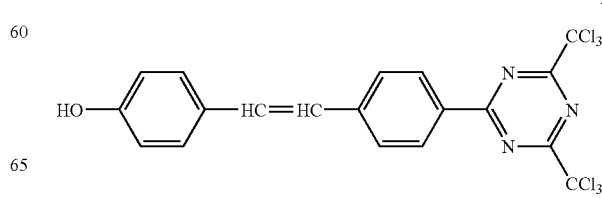

-continued

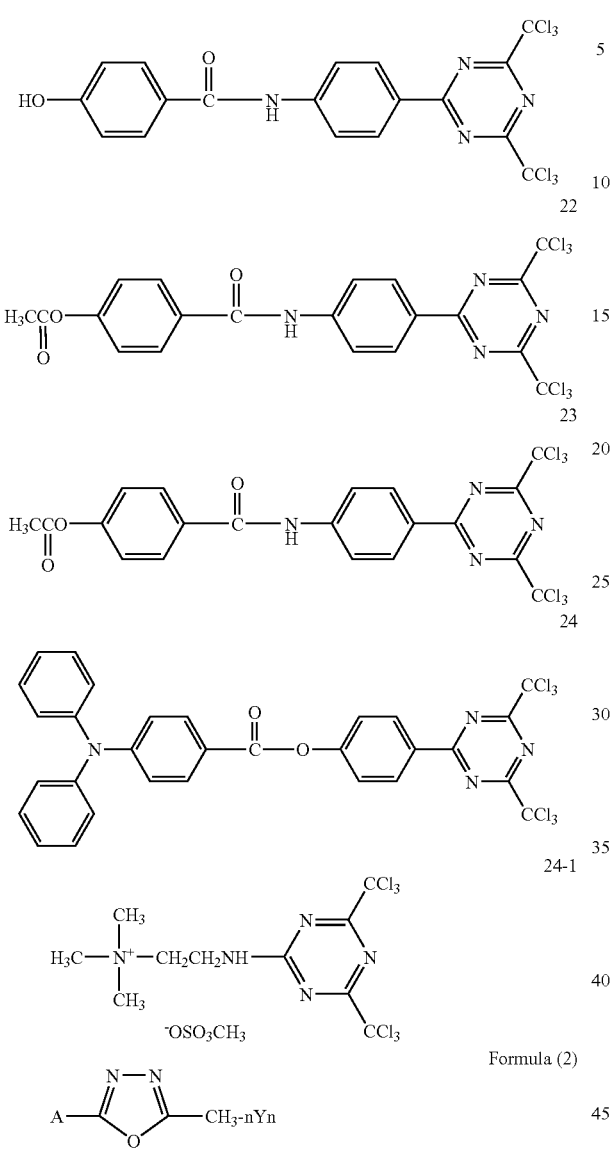

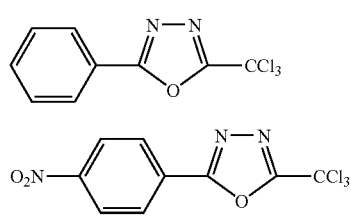

Formula (2)

A is phenyl group, naphthyl group, substituted phenyl group or substituted naphthyl group in which a substituent is halogen atom, an alkyl group, an alkoxy group, nitro group, cyano group or methylenedioxy group; Y is halogen atom; and n is an integer of 1 to 3.

Specific examples of the compound represented by the formula (2) are as follows.

-continued

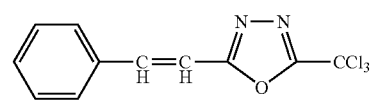

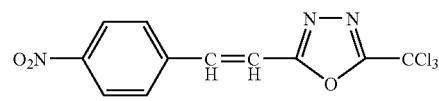

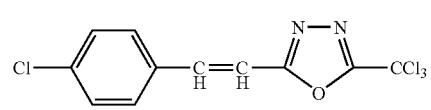

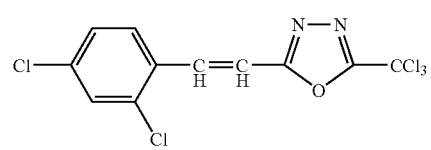

Formula (3)

W is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, phenyl group or an alkyl group having 1 to 3 carbon(s); Y is halogen atom; and n is an integer of 1 to 3.

Specific examples of the compound represented by the formula (3) are as follows.

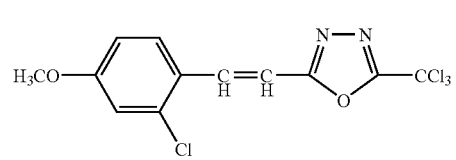

-continued

Formula (4)

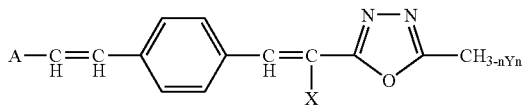

A is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, halogen atom, cyano group, an alkyl group or an alkyl group; Y is halogen atom; and n is an integer of 1 to 3.

Specific examples of the compound represented by the formula (4) are as follows.

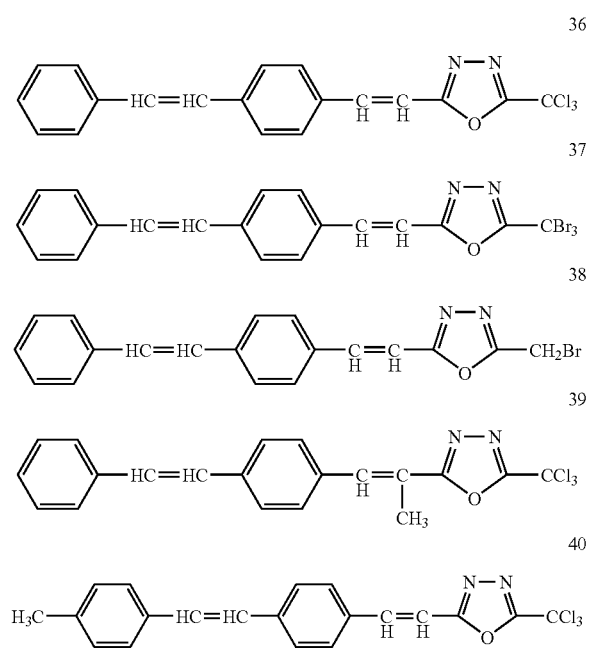

Although there is no particular limitation for the amount of the active halogen compound used, it is preferred to use it within a range of 0.1 to 30 part(s) by mass to 100 parts by mass of the ionizing radiation curable compound and, more preferably, it is 1 to 20 part(s) by mass. With regard to the active halogen compound of the formulae (1) to (4), it is possible to use plural species thereof or to use together with other radical polymerization initiator, photosensitizer, etc.

When such an active halogen compound or, preferably, the compound represented by the formulae (1) to (4) is used, diffusing property is improved partially due to the fact that the size of the resulting radical molecule is relatively small whereby, even when the temperature upon hardening by irradiation of ionizing radiation is low, there is achieved an advantage that a polymer in which a desired hardness is expressed is able to be formed.

(Method for Hardening of Coat)

In the present invention, an applying composition forming a layer on a transparent support may be applied and dried followed by directly irradiating the ionizing radiation to harden or hardening by heating may be conducted after drying followed by irradiating the ionizing radiation to harden.

A method for the manufacture of transparent film or, particularly, reflection preventing film according to the present invention has a step forming at least one of layers to be layered on a support by conducting a step of (2) or (3) after the following step (1) or by conducting a step of (2) or (3) after the hardening treatment by heating according to (4) after the step of (1).

(1) a step where an applying liquid containing at least one kind of active halogen compound and an ionizing radiation curable compound is applied on a web containing a support which runs continuously and then dried to form an applied layer;

(2) a step where ionizing radiation is irradiated for 0.5 second or longer under an atmosphere of not more than 3% by volume of oxygen concentration on the applied layer of the aforementioned web to harden the applied layer;

(3) a step where the applied layer on the aforementioned web is irradiated, together with heating, with ionizing radiation for 0.5 second or longer under an atmosphere of not more than 3% of oxygen concentration; and (4) a step where the applied layer of the aforementioned web is heated so that the applied layer is hardened by heating.

(Hardening by Ionizing Radiation)

Irradiation with ionizing radiation is carried out under the atmosphere where oxygen concentration is not more than 3% by volume. More preferably, it is not more than 1% by volume and, still more preferably, not more than 0.1% by volume. In order to reduce the oxygen concentration of more than necessary concentration, a large amount of inert gas is to be used and that is not preferred in view of the manufacturing cost. With regard to a means for reducing the oxygen concentration, it is preferred to substitute the air (about 79% by volume of nitrogen and about 21% by volume of oxygen) with other inert gas and it is particularly preferred to substitute with nitrogen (nitrogen purge).

In the present invention, hardening of an applied layer is conducted by irradiation of ionizing radiation for 0.5 second or longer under, the atmosphere where oxygen concentration is not more than 3% by volume. Time for the irradiation is preferably 0.7 second to 60 seconds and, more preferably, 0.7 second to 10 seconds from initiation of the irradiation. When it is shorter than 0.5 second, hardening reaction is unable to finish and a sufficient hardening is not possible.

Incidentally, in the present specification, "web" may be either a support itself or a thing where a layer is formed on a support.

In the present invention, it is preferred that the aforementioned hardening reaction is carried out in an ionizing radiation reaction chamber (hereinafter, it may be just referred to as "reaction chamber") which is controlled to a desired oxygen concentration. When the condition is made in such a manner that, in supplying the inert gas to the ionizing radiation reaction chamber, it is somewhat blown to an inlet side of web of the reaction chamber (which is an inlet for conveying the web), it is possible to eliminate the accompanied air as a result of conveyance of the web so that the oxygen concentration in the reaction chamber is effectively reduced and, in addition, it is also possible to efficiently reduce the substantial oxygen concentration on the polar surface where inhibition for hardening by oxygen is big. Direction of the flow of the inert gas at the inlet side of the web of the reaction chamber is able to be controlled by adjusting the balance of supplying and exhausted air of the reaction chamber. Incidentally, it is preferred to be a method for removal of the accompanied air that, immediately before irradiation of ionizing radiation to the applied layer on the web, inert gas is directly blown onto the surface of the applied layer on the web.

A low refractive layer which is the outermost layer and has a thin film thickness is particularly preferred to be hardened by such a method.

It is also preferred to provide a previous chamber before the reaction chamber. Preferably, the previous chamber is substituted with inert gas and is in a low oxygen concentration and, more preferably, oxygen concentration is not more than 5% by volume and oxygen concentration is not less than 0.01% by volume. Only the web before irradiation of ionizing radiation may be passed (conveyed) through the previous chamber or inert gas may be directly blown onto the surface of the applied layer on the web which is the aforementioned method for removal of the accompanied air.

When the previous chamber is provided and oxygen on the surface of the applied layer of the web is previously eliminated, it is now possible to maintain the low oxygen concentration in the reaction chamber and to proceed the hardening more efficiently.

Further, in at least one of the sides constituting the web inlet side of the ionizing radiation chamber or the previous chamber, its gap between the surface of the applied layer on the web is, in order to use the inert gas efficiently, preferably 0.2 to 15 mm, more preferably 0.2 to 10 mm and, most preferably, 0.2 to 5 mm. The gap hereinabove means the length between the surface of the applied layer on the web and the upper end of the web inlet at the side constituting the inlet side of the web.

However, in the continuous manufacture of the web, it is necessary that the webs are conjugated and connected and, for the conjugation, a method by sticking with a conjugating tape has been widely used. Therefore, when the gas between the ionizing radiation reaction chamber or the inlet of previous chamber and the surface of the applied layer on the web is too narrow, there is a problem that conjugating material of the conjugating tape is caught there. Accordingly, in order to make the gap narrow, it is preferred that at least a part of the inlet side of the previous chamber of the ionizing radiation reaction chamber is made movable and that, in case the conjugating part comes in, the gap is expanded to an extent of the thickness for the conjugation. In order to make it practical, there are a method (A) where inlet side of the previous chamber or the ionizing radiation reaction chamber is made movable in both forward and backward directions of the movement and, when the conjugating part passes, it moves forwardly and backwardly to expand the gap and a method (B) where inlet side of the previous chamber or the ionizing radiation reaction chamber is movable in the vertical direction to the web side and, when the conjugating part passes, it moves up and down to expand the gap.

As hereunder, by taking the operation of the inlet side of the web, of the previous chamber, the operation case of the web inlet side of the previous chamber of the reaction chamber to which the present invention is applicable will be illustrated on the basis of FIGS. 1 to 4 (incidentally, in the following illustration for the drawings, a web having an applied layer (not shown) is just called "web").

FIG. 1 is a schematic chart of the manufacturing device provided with an ionizing radiation reaction chamber and a previous chamber which are advantageously used in the present invention.

Figure 2:
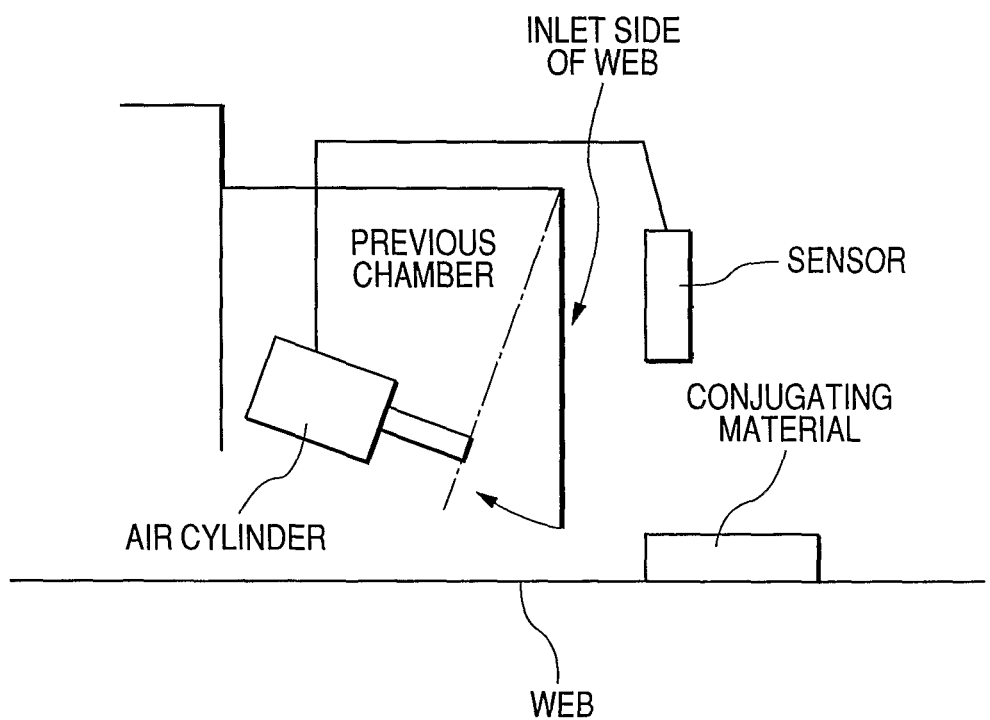
FIG. 2 is a side view schematically showing an example of an operation of a web entrance of the production apparatus provided with the ionizing radiation chamber and the previous chamber which are preferably used in the invention.

FIG. 2 is a side view which schematically shows an example of operation of the device at the web inlet side of the manufacturing device provided with an ionizing radiation reaction chamber and a previous chamber which are advantageously used in the present invention and shows an embodiment of the aforementioned (A). The device having the constitution of FIG. 2 is that, in conveying the web, before the conjugating material which connects the web by conjugation comes into the inlet of the previous chamber, the conjugating material is detected by a sensor and inlet side is made movable before and after the moving direction of the web by an air cylinder provided to at least a part of the inlet sides of the web of the previous chamber operating by synchronizing with the sensor passing through a control part (not shown). As a result, size corresponding to thickness of the conjugating material is able to be avoided.

Figure 3:
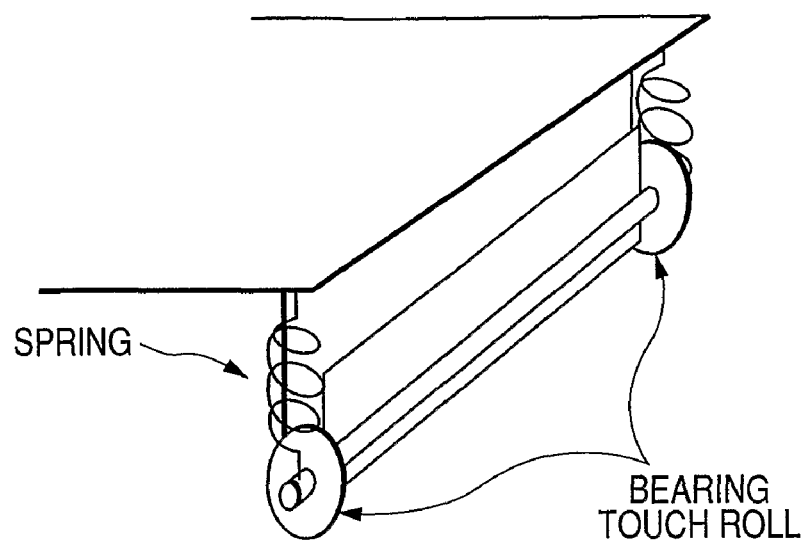
FIG. 3 is a diagram schematically showing an example of the web entrance of the previous chamber of the production apparatus provided with the ionizing radiation chamber and the previous chamber which are preferably used in the invention.
Figure 4:
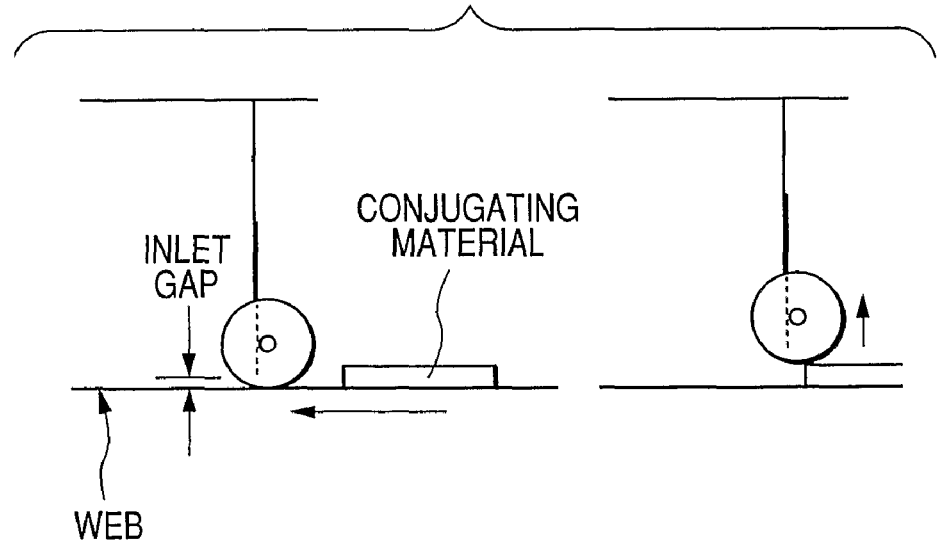
FIG. 4 is a side view schematically showing an operation of a web entrance of the previous chamber in FIG. 3.

FIG. 3 and FIG. 4 are the drawings which show the embodiment of the aforementioned (B) in which FIG. 3 is a drawing which schematically shows the inlet side of the web of the previous chamber while FIG. 4 is a drawing which schematically shows the operation of the inlet side of the web of the previous chamber. When the inlet side of the web of the previous chamber is partly movable and both ends of the width of the web are contacted by a bearing touch roll, the gap between the web and the inlet side is determined. When the conjugating material passes, the bearing touch roll comes over the conjugating material and the gap at the inlet side of the web is kept constant. There is no limitation for the means which makes the inlet movable so far as it is able to avoid the conjugated part.

When the applied layer on the web is hardened in the present invention, it is also preferred that irradiation of ionizing radiation being conducted in an atmosphere of not more than 3% by volume in the aforementioned hardening step is carried out by dividing into plural times.

In that case, it is preferred that at least two irradiations of ionizing radiation are carried out in a reaction chamber with continuous oxygen concentration of not more than 3% by volume. When irradiations of ionized radiation in plural times are carried out in a reaction chamber of low oxygen concentration, reaction time which is necessary for hardening is able to be secured effectively. Particularly when the manufacturing rate is increased for high productivity, ionizing radiation irradiations in plural times are necessary for securing the energy of ionizing radiation required for the hardening reaction and, together with the securing of the reaction time necessary for the hardening reaction, the aforementioned embodiment is effective.

For the "reaction chambers ... with continuous, ...", there are an embodiment where at least two irradiations of ionizing radiation are conducted in a reaction chamber where oxygen concentration is not more than 3% by volume and an embodiment where at least two reaction chambers where oxygen concentration is not more than 3% by volume are provided and the area between the reaction chambers is made a low-oxygen zone where oxygen concentration is not more than 3% by volume. In the latter case, oxygen concentration is different in each of the reaction chambers provided that oxygen concentration is not more than 3% by volume.

It is also preferred in the present invention that the aforementioned hardening step is carried out by heating the web so as to make the surface temperature of the applied layer not lower than 25° C. It is further preferred to heat in the atmosphere of not less than 3% by volume of oxygen together with and/or in a continuous manner with the irradiation of ionizing radiation. When the aforementioned hardening step is conducted together with heating, the hardening reaction is accelerated by heat whereby the coat having better physical strength and resistance to chemicals is able to be formed.

It is preferred to heat so as to make the temperature of the surface of the applied layer 25° C. to 170° C. When it is lower than 25° C., hardening by heating is little while, when it is higher than 170° C., there is a problem such as deformation of the substrate material. More preferred temperature is 25° C. to 100° C. Time for maintaining the surface temperature of the applied layer at the aforementioned temperature is preferably 0.1 second to 300 seconds from initiation of irradiation of ionized radiation and, more preferably, not longer than 10 seconds. When the time for maintaining the surface temperature of the applied layer within the aforementioned temperature range is too short, reaction of the hardening composition forming the coat is unable to be promoted while, when it is too long, optical property of film lowers and, in addition, there is a problem in view of manufacture such as that equipments become big.

Although there is no particular limitation for the heating method, preferred ones are a method where roll is heated and is contacted to web, a method where heated nitrogen is blown thereon, a method where far-infrared ray or infrared ray is irradiated, etc. It is also possible to utilize a method mentioned in Japanese Patent No. 2,523,574 where heating is conducted by passing a medium such as warm water, steam or oil into a rotating metal roll. With regard to a means for heating, a dielectric heating roll or the like may be used as well.

There is no particular limitation for the ionizing radiation species in the present invention and it may be appropriately selected from ultraviolet ray, electronic ray, near-ultraviolet ray, visible light, near-infrared ray, infrared ray, X-ray, etc. depending upon the type of the hardening composition forming the coat. In the present invention, irradiation by ultraviolet ray is preferred. Hardening by ultraviolet ray is preferred in view of the fact that rate of polymerization is quick whereby equipment is able to be made compact and that selectable compound species are abundant and the cost is low.

In the case of ultraviolet ray, it is possible to utilize an ultrahigh pressure mercy lamp, a high pressure mercury lamp, a low pressure mercury lamp, a carbon arc, a xenon arc, a metal halide lamp, etc. In the case of irradiation of electronic ray, there is used electronic ray having energy of 50 to 1,000 keV emitted from various kinds of electronic ray accelerator such as Cockcroft-Walton type, van de Graaf type, resonant transformation type, insulation core transformation type, linear type, dynamitron type and high frequency type.

(Hardening by Heating Treatment)

In the hardening by heating of (4), it is preferred that film surface is heated at 60° C. to 170° C. When it is lower than 60° C., hardening by heating is little while, when it is higher than 170° C., there is a problem such as deformation of the substrate material. More preferred temperature therefor is 60° C. to 130° C. Film surface means temperature of the surface of the coat of the layer which is to be hardened. Heating time may be within such a range that no deformation of the substrate material takes place and is preferably 2 to 20 minutes and, more preferably, 3 to 15 minutes.

(Binder for Formation of Coat)

In the present invention, it is preferred in view of strength of the coat, stability of applying liquid, productivity of the coat, etc. that, as a main binder component for formation of the coat for hardening composition forming the coat, an ionizing radiation curable compound or, preferably, a compound having an ethylenic unsaturated group is used. The main binder component for formation of the coat means that it occupies 10% by mass to 100% by mass of the coat forming component except inorganic particles. Preferably, the range is 20% by mass to 100% by mass and, more preferably, 30% by mass to 95% by mass.

In the present specification, "ionizing radiation curable compound" may be anything so far it is a compound which is hardened by irradiation of ionizing radiation.

With regard to the main binder for formation of binder, it is preferably a polymer having a saturated hydrocarbon chain or a polyether chain as a main chain and it is more preferably a polymer having a saturated hydrocarbon chain as a main chain. Further, it is preferred that such a polymer has a cross-linking structure.

With regard to a binder polymer having a saturated hydrocarbon chain as a main chain and having a cross-linking structure, a (co)polymer of monomer(s) having two or more ethylenic unsaturated groups is preferred.

In order to make into a highly refractive coat, it is preferred that the structure of the monomer contains an aromatic ring or at least one atom selected from halogen atom (excluding-fluorine), sulfur atom, phosphorus atom and nitrogen atom.

Examples of the monomer having two or more ethylenic unsaturated groups are esters of polyhydric alcohol with (meth)acrylate such as ethylene glycol di(meth)acrylate, 1,4-cyclohexane diacrylate, pentaerythritol tetra(meth)acrylate, pentaerythritol tri(meth)acrylate, trimethylolpropane tri (meth)acrylate, trimethylolethane tri(meth)acrylate, dipentaerythritol tetra(meth)acrylate, dipentaerythritol penta (meth)acrylate, dipentaerythritol hexa(meth)acrylate, pentaerythritol hexa(meth)acrylate, 1,2,3-cyclohexane tetramethacrylate, polyurethane polyacrylate and polyester polyacrylate; vinylbenzene and derivatives thereof such as 1,4-vinylbenzene, 2-acryloylethyl 4-vinylbenzoate and 1,4-divinylcyclohexanone; vinylsulfones such as divinylsulfone; acrylamides such as methylenebisacrylamide; and methacrylamide.

Two or more kinds of the aforementioned monomers may be used together. Incidentally, in the present specification, the terms "(meth)acrylate", "(meth)acryloyl" and "(meth)acrylic acid" mean "acrylate or methacrylate", "acryloyl or methacryloyl" and "acrylic acid or methacrylic acid", respectively.

Specific examples of the highly refractive monomer are bis(4-methacryloylthiophenyl)sulfide, vinylnaphthalene, vinylphenyl sulfide and 4-methacryloxyphenyl 4'-methoxyphenyl thioether. With regard to those monomers, two or more thereof may be used together as well.

Polymerization of such a monomer having ethylenic unsaturated group is able to be carried out by irradiation of ionizing radiation or by heating in the presence of, in addition to the aforementioned active halogen compound, other optical radical initiator or thermal radical initiator if necessary.

Examples of the optical radical polymerization initiator are acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfoniums. Examples of the acetophenones include 2,2-diethoxyacetophenone, p-dimethylacetophenone, 1-hydroxydimethyl phenyl ketone, 1-hydroxycyclohexyl phenyl ketone, 1-hydroxydimethyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)butanone. Examples of the benzoins include benzoylbenzene, sulfonates, benzointoluene sulfonate, benzoin methyl ether, benzoin ethyl ether and benzoin isopropyl ether. Examples of benzophenones include benzophenone, 2,4-dichlorobenzophenone, 4,4-dichlorobenzophenone and p-chlorobenzophenone. Examples of phosphine oxides included 2,4,6-trimethylbenzoyl diphenylphosphine oxide.

Various examples are also mentioned in "Saishin UV Koka Gijutsu" (Modern UV Hardening Technique) (page 159; publishing person: Kazuhiro Takausu; publishing firm: K. K. Gijutsu Joho Kyokai (Technical Information Association); 1991) and they are useful for the present invention.

With regard to the commercially available optical radical polymerization initiator of an optical cleavage type, Irgacure (651, 184, 907), etc. manufactured by Ciba Specialty Chemicals may be listed as preferred examples.

The photopolymerization initiator is preferred to be useful when used within a range of 0.1 to 15 part(s) by mass to 100 parts by mass of a polyfunctional monomer and, more preferably, the range is within 1 to 10 part(s) by mass.

A photosensitizer may also be used in addition to the photopolymerization initiator. Specific examples of the photosensitizer are n-butylamine, triethylamine, tri-n-butylphosphine, Michler's ketone and thioxanthone.

With regard to a thermal radical initiator, organic or inorganic peroxide, organic azo and diazo compounds, etc. may be used.

To be more specific, examples of the organic peroxide are benzoyl peroxide, halobenzoyl peroxide, lauroyl peroxide, acetyl peroxide, dibutyl peroxide, cumene hydroperoxide and butyl hydroperoxide; example of the inorganic peroxide are hydrogen peroxide, ammonium persulfate and potassium peroxide; examples of the azo compound are 2,2'-azobis(isobutyronitrile), 2,2'-azobis(butyronitrile) and 1,1'-azobis(cyclohexanecarbonitrile); and examples of the diazo compound are diazoaminobenzene and p-nitrobenzene diazonium.

It is also possible to use a polymer having polyether as a main chain in the present invention. A ring-open polymer of multifunctional epoxy compound is preferred. Ring opening polymerization of a multifunctional epoxy compound is able to be carried out by irradiation of ionizing radiation or by heating in the presence of, if necessary, optical oxygen generator or thermal oxygen generator in addition to the aforementioned active halogen compound. With regard to the optical oxygen generator and thermal oxygen generator, known ones may be used.

In place of or in addition to the monomer having two or more ethylenic unsaturated groups, a monomer having cross-linking functional group may be used for introduction of cross-linking functional group into the polymer and, as a result of the reaction of the cross-linking functional group, a cross-linking structure may be introduced into a binder polymer.

Examples of the cross-linking functional group include isocyanate group, epoxy group, aziridine group, oxazoline group, aldehyde group, carbonyl group, hydrazine group, carboxyl group, methylol group and active methylene group. Vinylsulfonic acid, acid anhydride, cyanoacrylate derivative, melamine, etherized methylol, ester, urethane and metal alkoxide such as tetramethoxysilane may also be utilized as a monomer for introduction of a cross-linking structure. It is also possible to use a functional group showing a cross-linking property as a result of decomposition reaction such as block isocyanate group. Thus, the cross-linking functional group in the present invention may not only be that which immediately reacts but may also be that which shows reactivity as a result of decomposition.

When a binder polymer having a cross-linking functional group as such is heated after application, a crosslinking structure is able to be formed.

Now, illustration will be made for hard coat layer and antiglare layer.

(Hard Coat Layer and Antiglare Layer)

A hard coat layer has a hard coat property to improve the resistance of film to scratch. It is also used preferably for the purpose of giving light diffusion by scattering of either surface scattering and inner scattering to the film. Accordingly, it is preferred to contain light-transmitting resin for giving a hard coat property and light-transmitting particles for giving light diffusion and, if necessary, inorganic filler for making refractive index high, preventing the cross-linking shrinkage and making the strength high is contained.

For the purpose of providing a hard coat property, thickness of the hard coat layer is preferable 1 to 40 μm and, more preferably, 1 to 30 μm. When the thickness is within the above range, hard coat property is well provided and, in addition, there is no lowering in processing adaptability due to deterioration of brittleness and curl.

In order to make both excellent resistance to scratch and brittleness available, it is preferred that a hard coat layer is hardened and formed by such a manner that an applying composition containing at least one kind of active halogen compound and an ionizing radiation curable compound for formation of light-transmitting resin is applied on a transparent support and dried and then ionizing radiation is irradiated.

On the other hand, when light diffusion property is provided to film, it is preferred that an applying composition containing light-transmitting particles for providing antiglare property, an ionizing radiation curable compound for forming a light-transmitting resin and at least one kind of active halogen compound is applied onto a transparent support and dried and then hardening is resulted by irradiation of ionizing radiation (hereinafter, light-transmitting particles may be sometimes referred to as "antiglare layer").

The antiglare layer according to the present invention has unevenness on its surface and has an antiglare property by that and it is particularly preferred that an applying composition for the formation of antiglare layer contains light-transmitting particles where an average particle size is 0.5 to 10.0 μm, at least one kind of active halogen compound, an ionizing radiation curable compound and good solvent and poor solvent for the ionizing radiation curable compound. In this method, as the good solvent decreases upon application and drying, the ionizing radiation curable compound forming a light-transmitting resin in the poor solvent is gelled whereby unevenness is formed on the surface and that is mentioned in detail in Japanese Patent No. 3,515,426. It is important to select the size of the light-transmitting particles and good and poor solvents for the ionizing radiation curable compound.

When this art is used, it is possible to form the unevenness on the surface of thick hard coat layer using relatively small light-transmitting particles and design which is advantageous for resistance to scratch is now possible.

Thickness of the hard coat layer and the antiglare layer may be within a range of 1 to 40 μm and, particularly preferably, it is 1 to 30 μm.

Surface shape and optical characteristic of the antiglare layer will be mentioned later.

Hereinafter, each of light-transmitting resin, light-transmitting particles and other additives used for the hard coat layer and the antiglare layer will be illustrated taking a method for the formation of the antiglare layer as an example.

<Light-Transmitting Fine Particles>

Light-transmitting particles used for a hard coat layer are used for an object of providing antiglare property and light diffusing property and an average particle size thereof is 0.5 to 15 μm and, preferably, 1.0 to 10.0 μm. When an average particle size is smaller than 0.5 μm, distribution of scattered angle of light expands to wide angle and, therefore, lowering in resolving power for the letters of the display is resulted and unevenness of the surface is hardly formed whereby antiglare property is insufficient. That is not preferred. On the other hand, when it is larger than 15 μm, it is necessary to make the thickness of the hard coat big and problems such as that curl becomes big and cost for the material increases are resulted.

With regard to specific examples of the aforementioned light-transmitting fine particles, resin particles such as poly ((meth)acrylate) particles, cross-linked poly((meth)acrylate) particles, polystyrene particles, cross-linked polystyrene particles, cross-linked poly(acryl-styrene) particles, melamine resin particles and benzoguanamine resin particles may be preferably listed. It is also possible to use silica particles, inorganic particles of aggregating silica where secondary particle size is within the aforementioned range and $TiO_2$ particles. Among them, cross-linked polystyrene particles, cross-linked poly((meth)acrylate) particles, cross-linked poly(acryl-styrene) particles and silica particles are used preferably. When refractive index of light-transmitting resin is adjusted to meet the refractive index of each light-transmitting fine particles selected from those particles, it is possible to achieve inner haze, surface haze and average roughness of center line of the antiglare layer according to the present invention. To be more specific, a combination of light-transmitting fine particles comprising an ionizing radiation curable compound (refractive index after hardening: 1.50 to 1.53) where tri- or more multifunctional (meth)acrylate monomer preferably used in an antiglare layer of the present invention is a main component as will be mentioned later and a cross-linked poly((meth)acrylate) polymer where amount of acryl is 50 to 100% by weight is preferred and a combination of light-transmitting fine particles (reference index: 1.48 to 1.54) comprising cross-linked poly(styrene-acryl)copolymer is particularly preferred.

With regard to the shape of the light-transmitting particles, any of spherical and amorphous ones may be used.

It is also possible that two or more kinds of light-transmitting fine particles having different particle sizes are used together. It is possible that antiglare property is provided by light-transmitting fine particles having larger particle size and that rough feeling of the surface is reduced by light-transmitting fine particles having smaller particle size. For example, when transparent film (particularly, reflection preventing film) is adhered onto a highly fine display of 133 ppi or more, there is a demand that there is no inconvenience in terms of optical property called glare. Glare is caused by the fact that pixel is enlarged or reduced by unevenness (contributing in antiglare property) existing on the film surface whereby uniformity in luminance is lost and it is able to be greatly improved by the joint use with light-transmitting particles having smaller particle size than the light-transmitting particles for providing antiglare property and having different refractive index from the binder.

With regard to the particle size distribution of the aforementioned light-transmitting particles, it is more preferred to be monodispersed and, with regard to the particle size of each particle, it is better when the size is near the same each other. For example, when particles where particle size thereof is larger than an average particle size to an extent of 20% or more are defined to be coarse particles, it is preferred that the rate of the coarse particles in the total particle numbers is not more than 1%, more preferably not more than 0.1% and, still more preferably, not more than 0.01%. Light-transmitting particles having such a particle size distribution is able to be prepared by classification after usual synthetic reaction and, when frequency of the classification is made more or when its degree is made stronger, more preferred distribution is able to be achieved.

The aforementioned light-transmitting fine particles are compounded with the resulting antiglare layer so as to be contained in 3 to 30% by mass in the total solid of the antiglare layer by taking light diffusing effect, resolving power of image, brittleness and turbidity of the surface, etc. into consideration. More preferably, it is 5 to 20% by mass. When it is less than 3% by mass, antiglare property is insufficient while, when it is more than 30% by mass, problems such as blur of the image and turbidity and glare of the surface are resulted.

Density of the light-transmitting fine particles are preferably 10 to 1,000 $mg/m^2$ and, more preferably, 100 to 700 $mg/m^2$.

Particle size distribution of the light-transmitting particles is measured by a Coulter counter method and the measured distribution is converted into particle number distribution.

Refractive index of the light-transmitting resin and the light-transmitting fine particles in the present invention are preferably 1.45 to 1.70 and, more preferably, 1.48 to 1.65. In order to make the refractive index within the above range, type and amount ratio of the light-transmitting resin and the light-transmitting fine particles may be appropriately selected. How to select them may be easily known previously by means of experiments.

In the present invention, difference in refractive indexes between the light-transmitting resin and the light-transmitting fine particles [(refractive index of the light-transmitting resin)–(refractive index of the light-transmitting fine particles)] in terms of absolute value is preferably 0.001 to 0.030, more preferably 0.001 to 0.020 and, still more preferably, 0.001 to 0.015. When the difference is more than 0.030, problems such as blur of letters on film, lowering in contrast in dark chamber, turbidity on the surface, etc. are resulted.

Here, refractive index of the aforementioned light-transmitting resin is able to be directly measured by an Abbe's refractometer or able to be quantitatively evaluated by measurement of spectral reflection spectrum or spectral ellipsometry. Refractive index of the aforementioned light-transmitting fine particles is measured in such a manner that the light-transmitting fine particles in the same amount are dispersed in a solvent where refractive index is varied by changing the mixing ratio of two kinds of solvents having different refractive index, turbidity thereof is measured and the refractive index when the turbidity becomes smallest is measured by an Abbe's refractometer.

<Light-Transmitting Resin>

It is preferred that a light-transmitting resin is a binder polymer having a saturated hydrocarbon chain or a polyether chain as a main chain and it is more preferred that the resin is a binder polymer having a saturated hydrocarbon chain as a main chain. It is preferred that the binder polymer has a cross-linking structure.

With regard to a binder polymer having a saturated hydrocarbon chain as a main chain, a polymer of an ethylenic unsaturated monomer is preferred. With regard to a binder polymer having a saturated hydrocarbon chain as a main chain and having a cross-linking structure, a (co)polymer of monomer(s) having two or more ethylenic unsaturated groups is preferred.

In order to make the refractive index of a binder polymer high, it is also possible to select a highly refractive monomer containing aromatic ring or at least one atom selected from halogen atom (excluding fluorine), sulfur atom, phosphorus atom and nitrogen atom or to select a monomer having a fluorene skeleton in a molecule or the like.

Examples of the monomer having two or more ethylenic unsaturated group are esters of polyhydric alcohol with (meth)acrylic acid [such as ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri (meth)acrylate, trimethylolethane tri(meth)acrylate, dipentaerythriol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate and polyester polyacrylate], denatured product of the aforementioned ester with ethylene dioxide or caprolactone, vinylbenzene and derivatives thereof [such as 1,4-divinylbenzene, 2-acryloylether 4-vinyl benzoate and 1,4-divinylcyclohexanone], vinylsulfones (such as divinylsulfone), acrylamides (such as methylenebisacrylamide) and methacrylamides. Two or more of the aforementioned monomers may be used together.

Specific examples of the highly refractive monomer are (meth)acrylate having a fluorene skeleton, bis(4-methacryloylthiophenyl)sulfide, vinylnaphthalene, vinylphenyl sulfide and 4-methacryloxyphenyl-4'-methoxyphenyl thioether. Two or more of those monomers may also be used together.

Polymerization of those monomers having ethylenic unsaturated group (ionizing radiation curable compound (precursor for light-transmitting resin)) is able to be carried out by irradiation of ionizing radiation in the presence of an optical radical initiator or a thermal radical initiator.

Accordingly, the aforementioned antiglare layer is able to be formed in such a manner that an applying liquid containing an ionizing radiation curable compound such as the aforementioned ethylenic unsaturated monomer, active halogen compound, light-transmitting fine particles and, if necessary, inorganic fine particles, optical radical initiator or thermal radical initiator which will be mentioned later is prepared, the applying liquid is applied onto a transparent support and dried and polymerization reaction is conducted using ionizing radiation to harden.

Further, in addition to the above, an optical sensitizer which may be contained in the aforementioned low refractive layer may also be used.

Examples of the optical radical polymerization initiator are acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimmers, onium salts, borate salts, active esters, inorganic complexes and coumarins.

Examples of the acetophenones are 2,2-dimethoxyacetophenone, 2,2-diethoxyacetophenone, p-dimethylacetophenone, 1-hydroxy-dimethylphenyl ketone, 1-hydroxy-dimethyl-p-isopropylphenyl ketone, 1-hydroxycyclohexylphenyl ketone, 2-methyl-4-methylthio-2-morpholinopropiophenone, 2-benzyl-2-dimethylamino-1-(4-morpholinophenyl)-butanone, 4-phenoxydichloroacetophenone and 4-tert-butyl-dichloroacetophenone.

Examples of the benzoins are benzoin, benzoin methyl ether, benzoin ethyl ether, benzoin isopropyl ether, benzyl dimethylketal, benzoin benzenesulfonate, benzoin toluenesulfonate, benzoin methyl ether, benzoin ethyl ether and benzoin isopropyl ether.

Examples of the benzophenones are benzophenone, hydroxybenzophenone, 4-benzoyl-4'-methyldiphenyl sulfide, 2,4-dichlorobenzophenone, 4,4-dichlorobenzophenone and p-chlorobenzophenone, 4,4'-dimethylaminobenzophenone (Michler's ketone) and 3,3',4,4'-tetra(tert-butylperoxycarbonyl)benzophenone.

Examples of the phosphine oxides include 2,4,6-trimethylbenzoyl diphenylphosphine oxide.

Examples of the active esters include 1,2-octanedione, 1-[4-(phenylothio)-2-(o-benzoyloxime)], sulfonates and cyclic active ester compound.

Examples of the onium salts include aromatic diazonium salt, aromatic iodonium salt and aromatic sulfonium salt.

Examples of the borate include ion complexes with cationic dye.

Examples of the inorganic complex include bis($\eta^5$-2,4-cyclopentadien-1-yl)-bis(2,6-difluoro-3-(1H-pyrrol-1-yl) phenyl)titanium.

Examples of the coumarins include 3-ketocoumarin.

Each of those initiators may be used either solely or jointly.

Various examples are also mentioned in "Saishin UV Koka Gijutsu" (Modern UV Hardening Technique) (page 159; K. K. Gijutsu Joho Kyokai (Technical Information Association); 1991) and they are useful for the present invention.

With regard to the commercially available optical radical polymerization initiator of an optical cleavage type, Irgacure (651, 184, 907, 1870 (a mixed initiator of CGI-403/Irg184=7/3, 500, 369, 1173, 2959, 4265, 4263, etc.), OXE 01), etc. manufactured by Ciba Specialty Chemicals, Kayacure (DETX-S, BP-100, BDMK, CTX, BMS, 2-EAQ, ABQ, CPTX, EPD, ITX, QTX, BTC, MCA, etc.) manufactured by Nippon Kayaku, Esarue (KIP 100F, KB1, EB3, BP, X33, KT046, KT37, KIP 150, TZT) manufactured by Sartomer, etc. may be listed as preferred examples.

The photopolymerization initiator is preferred to be useful when used within a range of 0.1 to 15 part(s) by mass to 100 parts by mass of a polyfunctional monomer and, more preferably, the range is within 1 to 10 part(s) by mass.

A photosensitizer may also be used in addition to the photopolymerization initiator. Specific examples of the photosensitizer are n-butylamine, triethylamine, tri-n-butylphosphine, Michler's ketone and thioxanthone. Further, one or more of auxiliary agent(s) such as azide compound, thiourea compound and mercapto compound may be used together.

With regard to the commercially available photosensitizer, Kayacure (DMBI, EPA) manufactured by Nippon Kayaku, etc. may be listed.

With regard to a thermal radical initiator, organic or inorganic peroxides, organic azo and diazo compounds, etc. may be used.

To be more specific, examples of the organic peroxides are benzoyl peroxide, halobenzoyl peroxide, lauroyl peroxide, acetyl peroxide, dibutyl peroxide, cumene hydroperoxide and butyl hydroperoxide; example of the inorganic peroxides are hydrogen peroxide, ammonium persulfate and potassium peroxide; examples of the azo compounds are 2,2'-azobis(isobutyronitrile), 2,2'-azobis(butyronitrile) and 1,1'-azobis(cyclohexanecarbonitrile); and examples of the diazo compounds are diazoaminobenzene and p-nitrobenzene diazonium.

With regard to a polymer having polyether as a main chain in the present invention, a ring-open polymer of multifunctional epoxy compound is preferred. Ring opening polymerization of a multifunctional epoxy compound is able to be carried out by irradiation of ionizing radiation or by heating in the presence of, if necessary, optical oxygen generator or thermal oxygen generator in addition to the aforementioned active halogen compound.

Accordingly, an antiglare layer is able to be formed in such a manner that an applying liquid containing a multifunctional epoxy compound, light-transmitting fine particles, active halogen compound and, if necessary, optical acid generator or thermal acid generator is prepared and the applying liquid is applied on a transparent support and then hardened by polymerization reaction using ionizing radiation.

In place of or in addition to the monomer having two or more ethylenic unsaturated groups, a monomer having cross-linking functional group may be used for introduction of cross-linking functional group into the polymer and, as a result of the reaction of the cross-linking functional group, a cross-linking structure may be introduced into a binder polymer.

Examples of the cross-linking functional group include isocyanate group, epoxy group, aziridine group, oxazoline group, aldehyde group, carbonyl group, hydrazine group, carboxyl group, methylol group and active methylene group. Vinylsulfonic acid, acid anhydride, cyanoacrylate derivative, melamine, etherized methylol, ester, urethane and metal alkoxide such as tetramethoxysilane may also be utilized as a monomer for introduction of a cross-linking structure. It is also possible to use a functional group showing a cross-linking property as a result of decomposition reaction such as block isocyanate group. Thus, the cross-linking functional group in the present invention may not only be that which immediately reacts but may also be that which shows reactivity as a result of decomposition.

When a binder polymer having cross-linking functional group as such is heated after application, a cross-linking structure is able to be formed.

In order to adjust the refractive index of the layer and to reduce a haze value caused by inner scattering, the antiglare layer may contain an inorganic filler comprising at least one kind of metal oxide selected from silicon, titanium, zirconium, aluminum, indium, zinc, tin and antimony and having an average particle size of not more than 0.2 µm, preferably not more than 0.1 µm and, more preferably, not more than 0.06 µm in addition to the aforementioned light-transmitting fine particles. Generally, such an inorganic filler has higher specific gravity than organic substances and makes the density of the applying composition high whereby it also has an effect of retarding the sedimentation speed of the light-transmitting fine particles.

In order to make the difference in refractive index from light-transmitting particles, it is preferred that a hard coat layer using highly refractive light-transmitting particles uses an oxide of silicon so as to maintain the refractive index of the layer low.

Specific examples of the inorganic filler used for the hard coat layer are $TiO_2$, $ZrO_2$, $Al_2O_3$, $In_2O_3$, $ZnO$, $SnO_2$, $Sb_2O_3$, ITO and $SiO_2$, etc. $TiO_2$ and $ZrO_2$ are particularly preferred in view of making the refractive index high. It is also preferred that the inorganic filler used in the antiglare layer is subjected to a silane coupling treatment or a titanium coupling treatment on its surface and a surface treatment agent having a functional group which is able to react with a binder species on the filler surface is preferably used.

When such an inorganic filler is used, its adding amount is preferably 10 to 90% by mass, more preferably 20 to 80% by mass and, particularly preferably, 30 to 75% by mass of the total mass of the antiglare layer.

Since the particle size of such an inorganic filler is well smaller than wavelength of light, no scattering takes place and a dispersion where the filler is dispersed in a bind polymer acts as an optically uniform substance.

The antiglare layer may also use at least any of organosilane compound, hydrolysate of organosilane and/or partial condensate thereof (sol).

Adding amount of the sol component to a layer which is other than the low refractive layer is preferably 0.001 to 50% by mass, more preferably 0.01 to 20% by mass, still more preferably, 0.05 to 10% by mass and, particularly preferably, 0.1 to 5% by mass of the total solid of the contained layer (added layer). In the case of a hard coat layer, restriction for the adding amount of the aforementioned organosilane compound or sol component thereof is not so severe as in the case of a low refracting layer and, therefore, the aforementioned organosilane compound is preferably used.

Refractive index of a bulk of a mixture of the light-transmitting resin and the light-transmitting particles is preferably 1.48 to 2.00 and, more preferably, 1.50 to 1.80. In order to make the refractive index within the aforementioned range, type and amount ratio of the light-transmitting resin and the light-transmitting particles are to be appropriately selected. How to select is able to be easily known previously by means of experiments.

With regard to the difference in the refractive index between the light-transmitting resin and the light-transmitting particles [(refractive index of the light-transmitting particles)–(refractive index of the light-transmitting resin)] is preferably 0.02 to 0.2 and, more preferably, 0.05 to 0.15. When the difference is within the above range, an effect of inner scattering is sufficient, no glare is generated and, further, no turbidity on the film surface takes place.

Refractive index of the aforementioned light-transmitting resin is preferably 1.45 to 2.00 and, more preferably, 1.48 to 1.70.

Here, refractive index of the light-transmitting resin is either directly measured by an Abbe's refractometer or is quantitatively evaluated by the measurement of spectral reflection spectrum or spectral ellipsometry.

<Surfactant for Antiglare Layer>

Particularly in the antiglare layer of the present invention, it is preferred that surfactant(s) of any of fluorine type and silicone type or of both types is/are contained in an applying composition for the formation of an antiglare layer particularly for ensuring the uniformity of the surface such as uneven application, uneven drying and point defect. Particularly, a surfactant of a fluorine type is preferably used because an effect for improvement of troubles on the surface such as uneven application, uneven drying and point defect of a transparent film (particularly, a reflection preventing film) of the present invention is achieved in less adding amount.

An object is that high-speed application adaptability is resulted together with enhancing the uniformity of the surface whereby productivity is enhanced.

An example of the surfactant of a fluorine type is a copolymer which contains a fluoro aliphatic group (it may be abbreviated as "fluorine-type polymer") and, with regard to the fluorine-type polymer, useful ones are acrylic resin containing a repeating unit corresponding to a monomer of the following (i), methacrylic resin and a vinyl-type monomer which is able to be copolymerized with them (such as a monomer of the following (ii)).

(i) Monomer containing fluoro aliphatic group represented by the following formula A.

Formula A:

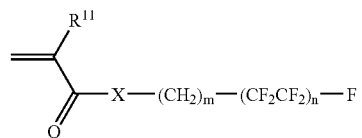

In the formula A, $R^{11}$ is hydrogen atom or methyl group; X is oxygen atom, sulfur atom or —$N(R^{12})$—; m is an integer of 1 to 6; n is an integer of 2 to 4; $R^{12}$ is hydrogen atom or an alkyl group having 1 to 4 carbon(s) or, to be more specific, methyl group, ethyl group, propyl group or butyl group and, preferably, hydrogen atom or methyl group; and X is preferably oxygen atom.

(ii) Monomer being able to be copolymerized with the aforementioned (i) and represented by the following formula B Formula B:

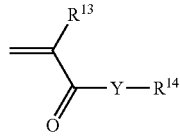

In the formula B, $R^{13}$ is hydrogen atom or methyl group; and Y is oxygen atom, sulfur atom or —N($R^{15}$)— in which $R^{15}$ is hydrogen atom or an alkyl group having 1 to 4 carbon(s) (to be more specific, it is methyl group, ethyl group, propyl group or butyl group) and, preferably, it is hydrogen atom or methyl group. With regard to Y, oxygen atom, —N(H)— and —N($CH_3$)— are preferred.

$R^{14}$ is an optionally substituted linear, branched or cyclic alkyl group having 4 to 20 carbons. Examples of the substituent for the alkyl group of $R^{14}$ are hydroxyl group, an alkylcarbonyl group, an arylcarbonyl group, carboxyl group, an alkyl ether group, an aryl ether group, halogen atom such as fluorine atom, chlorine atom and bromine atom, nitro group, cyano group and amino group although they are non-limitative. Preferred examples of the linear, branched or cyclic alkyl group having 4 to 20 carbons are linear or branched butyl group, pentyl group, hexyl group, heptyl group, octyl group, nonyl group, decyl group, undecyl group, dodecyl group, tridecyl group, tetradecyl group, pentadecyl group, octadecyl group, eicosanyl group, a monocyclic cycloalkyl group such as cyclohexyl group and cycloheptyl group and a polycyclic cycloalkyl group such as bicycloheptyl group, bicyclodecyl group, tricycloundecyl group, tetracyclododecyl group, adamantyl group, norbornyl group and tetracyclodecyl group.

Amount of the monomer containing fluoro aliphatic group represented by the formula A used in the fluorine-type polymer used in the present invention on the basis of each of the monomers of the fluorine-type polymer is not less than 10 molar %, preferably within a range of 15 to 70 molar % and, more preferably, 20 to 60 molar %.

Preferred mass-average molecular weight of the fluorine-type polymer used in the present invention is 3,000 to 100,000 and, more preferably, 5,000 to 80,000.

Preferred adding amount of the fluorine-type polymer used in the present invention to the applying liquid is within a range of 0.001 to 5% by mass, preferably within a range of 0.005 to 3% by mass and, more preferably, within a range of 0.01 to 1% by mass. When the adding amount of the fluorine-type polymer is less than 0.001% by weight, the resulting effect is insufficient while, when it is more than 5% by mass, drying of the coat is unable to be well conducted or properties as a film (such as reflectivity and resistance to scratch) are badly affected.

As hereunder, examples of the specific structure of the fluorine-type polymer comprising a monomer containing fluoro aliphatic group represented by the formula A are shown although they are non-limitative. Incidentally, numeral in each formula is a molar ratio of the monomer component. Mw is weight-average molecular weight.

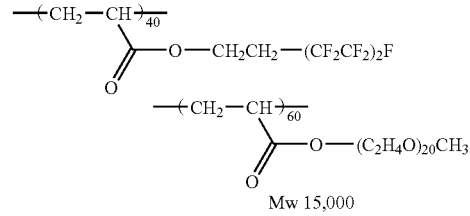

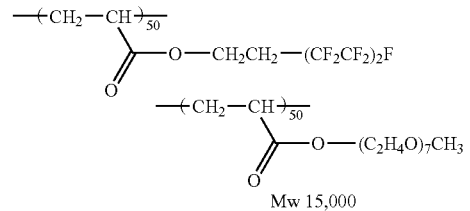

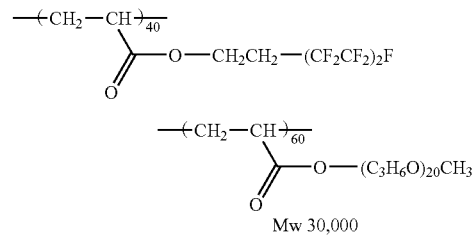

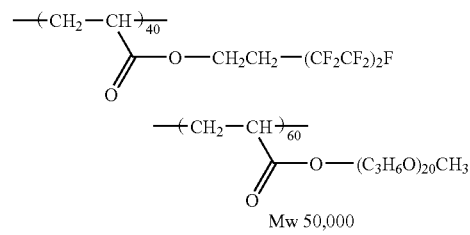

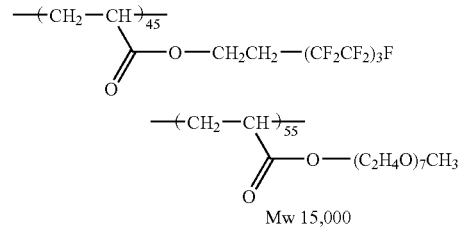

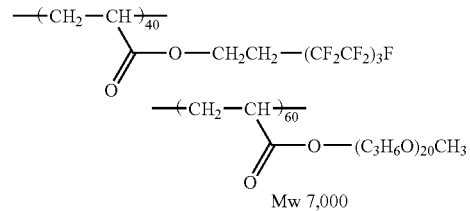

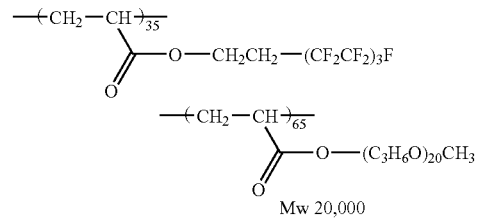

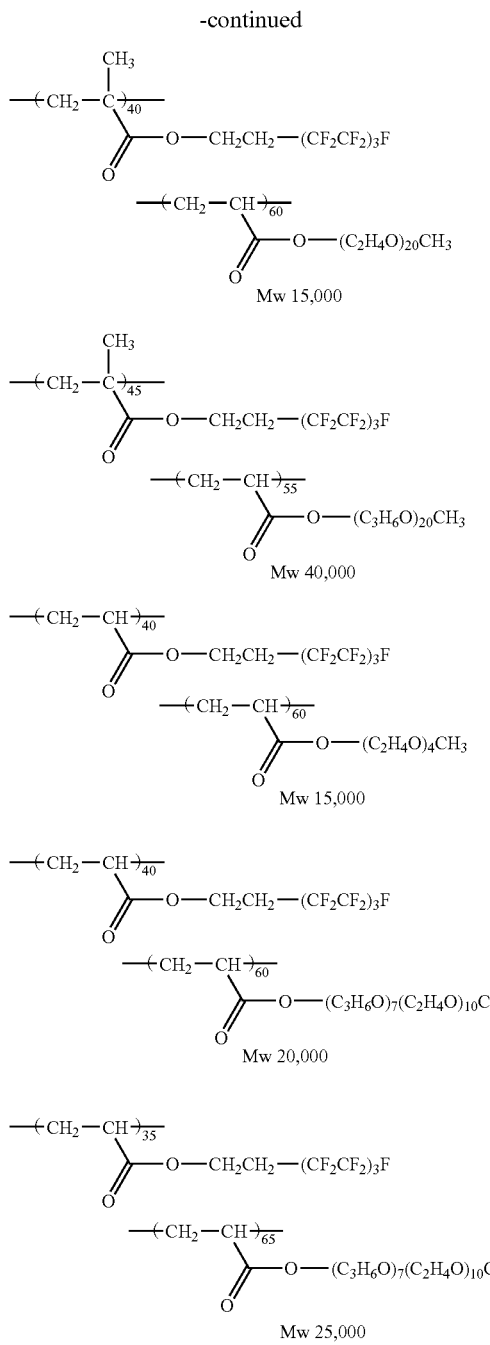

However, when the aforementioned fluorine-type polymer is used, functional groups containing fluorine atom are segregated on the surface of the antiglare layer whereby surface energy of the antiglare layer lowers and there is resulted a problem that, when a low refractive layer is coated over the aforementioned antiglare layer, its reflection preventing property is deteriorated. That is presumably due to the fact that wetting property of the hardening composition used for the formation of the low refractive layer is deteriorated whereby fine unevenness being unable to be detected by naked eye in the low refractive layer is deteriorated. In order to solve such a problem, it has been found to be effective that structure and adding amount of the fluorine-type polymer are adjusted so that surface energy of the antiglare layer is controlled preferably to from 20 mN·m$^{-1}$ to 50 mN·m$^{-1}$ and, more preferably, from 30 mN·m$^{-1}$ to 40 mN·m$^{-1}$. In order to achieve the surface energy as mentioned above, it is necessary that F/C which is a ratio of the peak derived from fluorine atom to the peak derived from carbon atom measured by an X-ray photoelectron spectroscopy is from 0.1 to 1.5.

Alternatively, when a fluorine-containing polymer to be extracted with a solvent forming the upper layer is selected in application of an upper layer, it is not segregated on the surface (interface) of the lower layer and close adhesion of upper and lower layers is achieved so that uniformity of the surface state is maintained even by a high-speed application and, moreover, lowering of surface free energy which is able to provide an antiglare reflection preventing transparent film having a strong resistance to scratch is prevented whereby it is able to achieve an object by controlling the surface energy of the antiglare layer before application of the low refractive layer to the aforementioned range. Examples of the material as such are acrylic resin and methacrylic resin which are characterized in containing a repeating unit corresponding to a monomer containing fluoro aliphatic group represented by the following formula C and a copolymer of a vinyl-type monomer (such as a monomer represented by the following (iv)) which is able to be copolymerized therewith.

(iii) Monomer containing fluoro aliphatic group represented by the following formula C

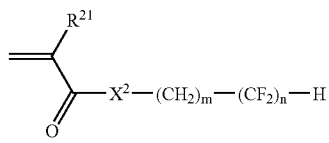

Formula C

In the formula C, $R^{21}$ is hydrogen atom, halogen group or methyl group and, more preferably, it is hydrogen atom or methyl group; $X^2$ is oxygen atom, sulfur atom or —N($R^{22}$)— in which oxygen atom or —N($R^{22}$)— is more preferred and oxygen atom is still more preferred; m is an integer of 1 to 6 (1 to 3 is more preferred and 1 is still more preferred); n is an integer of 1 to 18 (4 to 12 is more preferred and 6 to 8 is still more preferred); $R^{22}$ is hydrogen atom or an optionally substituted alkyl group having 1 to 8 carbon(s) in which hydrogen atom or an alkyl group having 1 to 4 carbon(s) is more preferred and hydrogen atom or methyl group is still more preferred; and oxygen atom is preferred for X.

In the fluorine-type polymer, two or more kinds of monomers containing fluoro aliphatic group represented by the formula C may be contained as constituting components.

(vi) Monomer represented by the following formula D which is able to be copolymerized with the aforementioned (iii)

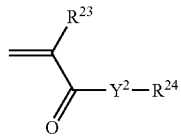

General formula D

In the formula D, $R^{23}$ is hydrogen atom, halogen group or methyl group and, more preferably, it is hydrogen atom or methyl group; $Y^2$ is oxygen atom, sulfur atom or —N($R^{25}$)— in which oxygen atom or —N($R^{25}$)— is more preferred and oxygen atom is still more preferred; $R^{25}$ is hydrogen atom or an alkyl group having 1 to 8 carbon(s) in which hydrogen atom or an alkyl group having 1 to 4 carbon(s) is more preferred and hydrogen atom or methyl group is still more preferred.

$R^{24}$ is an optionally substituted linear, branched or cyclic alkyl group having 1 to 20 carbon(s), an alkyl group containing a poly(alkyleneoxy) group or an optionally substituted aromatic group (such as phenyl group or naphthyl group) in which a linear, branched or cyclic alkyl group having 1 to 12 carbon(s) or an aromatic group having 6 to 18 carbons in total is more preferred and a linear, branched or cyclic alkyl group having 1 to 8 carbon(s) is still more preferred.

As hereunder, examples of the specific structure of the fluorine-type polymer containing a repeating unit corresponding to the monomer containing fluoro aliphatic group represented by the formula C are shown although they are non-limitative. Incidentally, the figure in the formula shows molar ratio of each monomer components. Mw is a mass-average molecular weight.

$$-(CH_2-\underset{\underset{CO_2-CH_2-(CF_2)_n-H}{|}}{\overset{R}{C}})_{100}-$$

| | R | n | Mw |
|---|---|---|---|
| P-1 | H | 4 | 8000 |
| P-2 | H | 4 | 16000 |
| P-3 | H | 4 | 33000 |
| P-4 | CH$_3$ | 4 | 12000 |
| P-5 | CH$_3$ | 4 | 28000 |
| P-6 | H | 6 | 8000 |
| P-7 | H | 6 | 14000 |
| P-8 | H | 6 | 29000 |
| P-9 | CH$_3$ | 6 | 10000 |
| P-10 | CH$_3$ | 6 | 21000 |
| P-11 | H | 8 | 4000 |
| P-12 | H | 8 | 16000 |
| P-13 | H | 8 | 31000 |
| P-14 | CH$_3$ | 8 | 3000 |

$$-(CH_2-\underset{\underset{CO_2-(CH_2)_p-(CF_2)_q-H}{|}}{\overset{R^1}{C}})_x-(CH_2-\underset{\underset{CO_2-(CH_2)_r-(CF_2)_s-H}{|}}{\overset{R^2}{C}})_{100-x}-$$

| | x | R$^1$ | p | q | R$^2$ | r | s | Mw |
|---|---|---|---|---|---|---|---|---|
| P-15 | 50 | H | 1 | 4 | CH$_3$ | 1 | 4 | 10000 |
| P-16 | 40 | H | 1 | 4 | H | 1 | 6 | 14000 |
| P-17 | 60 | H | 1 | 4 | CH$_3$ | 1 | 6 | 21000 |
| P-18 | 10 | H | 1 | 4 | H | 1 | 8 | 11000 |
| P-19 | 40 | H | 1 | 4 | H | 1 | 8 | 16000 |
| P-20 | 20 | H | 1 | 4 | CH$_3$ | 1 | 8 | 8000 |
| P-21 | 10 | CH$_3$ | 1 | 4 | H | 1 | 8 | 7000 |
| P-22 | 50 | H | 1 | 6 | CH$_3$ | 1 | 6 | 12000 |
| P-23 | 50 | H | 1 | 6 | CH$_3$ | 1 | 6 | 22000 |
| P-24 | 30 | H | 1 | 6 | CH$_3$ | 1 | 6 | 5000 |

$$-(CH_2-\underset{\underset{CO_2-CH_2-(CF_2)_n-H}{|}}{\overset{R^1}{C}})_x-(CH_2-\underset{\underset{CO_2-R^3}{|}}{\overset{R^2}{C}})_{100-x}-$$

| | x | R$^1$ | n | R$^2$ | R$^3$ | Mw |
|---|---|---|---|---|---|---|
| FP-148 | 80 | H | 4 | CH$_3$ | CH$_3$ | 11000 |
| FP-149 | 90 | H | 4 | H | C$_4$H$_9$(n) | 7000 |
| FP-150 | 95 | H | 4 | H | C$_6$H$_{13}$(n) | 5000 |
| FP-151 | 90 | CH$_3$ | 4 | H | CH$_2$CH(C$_2$H$_5$)C$_4$H$_9$(n) | 15000 |
| FP-152 | 70 | H | 6 | CH$_3$ | C$_2$H$_5$ | 18000 |
| FP-153 | 90 | H | 6 | CH$_3$ | C$_6$H$_{11}$ (cyclohexyl) | 12000 |
| FP-154 | 80 | H | 6 | H | C$_4$H$_9$(sec) | 9000 |
| FP-155 | 90 | H | 6 | H | C$_{12}$H$_{25}$(n) | 21000 |
| FP-156 | 60 | CH$_3$ | 6 | H | CH$_3$ | 15000 |
| FP-157 | 60 | H | 8 | H | CH$_3$ | 10000 |
| FP-158 | 70 | H | 8 | H | C$_2$H$_5$ | 24000 |
| FP-159 | 70 | H | 8 | H | C$_4$H$_9$(n) | 5000 |
| FP-160 | 50 | H | 8 | H | C$_4$H$_9$(n) | 16000 |
| FP-161 | 80 | H | 8 | CH$_3$ | C$_4$H$_9$(iso) | 13000 |
| FP-162 | 80 | H | 8 | CH$_3$ | C$_4$H$_9$(t) | 9000 |
| FP-163 | 60 | H | 8 | H | C$_6$H$_{11}$ (cyclohexyl) | 7000 |
| FP-164 | 80 | H | 8 | H | CH$_2$CH(C$_2$H$_5$)C$_4$H$_9$(n) | 8000 |
| FP-165 | 90 | H | 8 | H | C$_{12}$H$_{25}$(n) | 6000 |
| FP-166 | 80 | CH$_3$ | 8 | CH$_3$ | C$_4$H$_9$(sec) | 18000 |
| FP-167 | 70 | CH$_3$ | 8 | CH$_3$ | CH$_3$ | 22000 |
| FP-168 | 70 | H | 10 | CH$_3$ | H | 17000 |
| FP-169 | 90 | H | 10 | H | H | 9000 |

$$-(CH_2-\underset{\underset{CO_2-CH_2-(CF_2)_n-H}{|}}{\overset{R^1}{C}})_x-(CH_2-\underset{\underset{CO_2-R^3}{|}}{\overset{R^2}{C}})_{100-x}-$$

| | x | R$^1$ | n | R$^2$ | R$^3$ | Mw |
|---|---|---|---|---|---|---|
| FP-170 | 95 | H | 4 | CH$_3$ | —(CH$_2$CH$_2$O)$_2$—H | 18000 |
| FP-171 | 80 | H | 4 | H | —(CH$_2$CH$_2$O)$_2$—CH$_3$ | 16000 |
| FP-172 | 80 | H | 4 | H | —(C$_3$H$_6$O)$_7$—H | 24000 |
| FP-173 | 70 | CH$_3$ | 4 | H | —(C$_3$H$_6$O)$_{13}$—H | 18000 |
| FP-174 | 90 | H | 6 | H | —(CH$_2$CH$_2$O)$_2$—H | 21000 |
| FP-175 | 90 | H | 6 | CH$_3$ | —(CH$_2$CH$_2$O)$_8$—H | 9000 |
| FP-176 | 80 | H | 6 | H | —(CH$_2$CH$_2$O)$_2$—C$_4$H$_9$(n) | 12000 |
| FP-177 | 80 | H | 6 | H | —(C$_3$H$_6$O)$_7$—H | 34000 |
| FP-178 | 75 | F | 6 | H | —(C$_3$H$_6$O)$_{13}$—H | 11000 |
| FP-179 | 85 | CH$_3$ | 6 | CH$_3$ | —(C$_3$H$_6$O)$_{20}$—H | 18000 |
| FP-180 | 95 | CH$_3$ | 6 | CH$_3$ | —CH$_2$CH$_2$OH | 27000 |
| FP-181 | 80 | H | 8 | CH$_3$ | —(CH$_2$CH$_2$O)$_8$—H | 12000 |
| FP-182 | 95 | H | 8 | H | —(CH$_2$CH$_2$O)$_9$—CH$_3$ | 20000 |
| FP-183 | 90 | H | 8 | H | —(C$_3$H$_6$O)$_7$—H | 8000 |
| FP-184 | 95 | H | 8 | H | —(C$_3$H$_6$O)$_{20}$—H | 15000 |
| FP-185 | 90 | F | 8 | H | —(C$_3$H$_6$O)$_{13}$—H | 12000 |
| FP-186 | 80 | H | 8 | CH$_3$ | —(CH$_2$CH$_2$O)$_2$—H | 20000 |
| FP-187 | 95 | CH$_3$ | 8 | H | —(CH$_2$CH$_2$O)$_9$—CH$_3$ | 17000 |
| FP-188 | 90 | CH$_3$ | 8 | H | —(C$_3$H$_6$O)$_7$—H | 34000 |
| FP-189 | 80 | H | 10 | H | —(CH$_2$CH$_2$O)$_3$—H | 19000 |
| FP-190 | 90 | H | 10 | H | —(C$_3$H$_6$O)$_7$—H | 8000 |
| FP-191 | 80 | H | 12 | H | —(CH$_2$CH$_2$O)$_7$—CH$_3$ | 7000 |
| FP-192 | 95 | CH$_3$ | 12 | H | —(C$_3$H$_6$O)$_7$—H | 10000 |

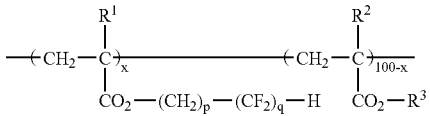

| | x | R¹ | p | q | R² | R³ | Mw |
|---|---|---|---|---|---|---|---|
| FP-193 | 80 | H | 2 | 4 | H | $C_4H_9(n)$ | 18000 |
| FP-194 | 90 | H | 2 | 4 | H | $-(CH_2CH_2O)_9-CH_3$ | 16000 |
| FP-195 | 90 | $CH_3$ | 2 | 4 | F | $C_6H_{13}(n)$ | 24000 |
| FP-196 | 80 | $CH_3$ | 1 | 6 | F | $C_4H_9(n)$ | 18000 |
| FP-197 | 95 | H | 2 | 6 | H | $-(C_3H_6O)_7-H$ | 21000 |
| FP-198 | 90 | $CH_3$ | 3 | 6 | H | $-CH_2CH_2OH$ | 9000 |
| FP-199 | 75 | H | 1 | 8 | F | $CH_3$ | 12000 |
| FP-200 | 80 | H | 2 | 8 | H | $CH_2CH(C_2H_5)C_4H_9(n)$ | 34000 |
| FP-201 | 90 | $CH_3$ | 2 | 8 | H | $-(C_3H_6O)_7-H$ | 11000 |
| FP-202 | 80 | H | 3 | 8 | $CH_3$ | $CH_3$ | 18000 |
| FP-203 | 90 | H | 1 | 10 | F | $C_4H_9(n)$ | 27000 |
| FP-204 | 95 | H | 2 | 10 | H | $-(CH_2CH_2O)_9-CH_3$ | 12000 |
| FP-205 | 85 | $CH_3$ | 2 | 10 | $CH_3$ | $C_4H_9(n)$ | 20000 |
| FP-206 | 80 | H | 1 | 12 | H | $C_6H_{13}(n)$ | 8000 |
| FP-207 | 90 | H | 1 | 12 | H | $-(C_3H_6O)_{13}-H$ | 15000 |
| FP-208 | 60 | $CH_3$ | 3 | 12 | $CH_3$ | $C_2H_5$ | 12000 |
| FP-209 | 60 | H | 1 | 16 | H | $CH_2CH(C_2H_5)C_4H_9(n)$ | 20000 |
| FP-210 | 80 | $CH_3$ | 1 | 16 | H | $-(CH_2CH_2O)_2-C_4H_9(n)$ | 17000 |
| FP-211 | 90 | H | 1 | 18 | H | $-CH_2CH_2OH$ | 34000 |
| FP-212 | 60 | H | 3 | 18 | $CH_3$ | $CH_3$ | 19000 |

When lowering of surface energy is prevented at the stage where a low refractive layer is coated over the antiglare layer, deterioration of the reflection preventing efficiency is able to be prevented. The object is able to be also achieved in such a manner that, in applying an antiglare layer, a fluorine-type polymer is used to reduce the surface tension of the applying liquid and to enhance the uniformity of surface state whereby high productivity by a high-speed application is maintained and, after application of the antiglare layer, a surface treatment means such as corona treatment, UV treatment, thermal treatment, saponifying treatment and solvent treatment is conducted (in which corona treatment is particularly preferred) to prevent the lowering of the surface free energy whereby the surface energy of the antiglare layer before application of the low refractive layer is controlled to the aforementioned range.

It is also preferred that a thixotropic agent is added to an applying composition for the formation of the antiglare layer of the present invention. Examples of the thixotropic agent are mica and silica of not more than 0.1 µm. It is appropriate that the amount of such an additive is usually made 1 to 10 part(s) by mass to 100 parts by mass of the resin which is hardened by ultraviolet ray.

In the antiglare layer of the present invention, a solvent may be used for a wet application of an applying composition directly onto a transparent support. Requirements for the preferred solvent in the present invention are that it fully dissolves each of the solvates such as the aforementioned light-transmitting resin, that its does not dissolve the aforementioned light-transmitting fine particles, that it hardly generates uneven application and uneven drying during the process of from application to drying, that it does not dissolve a support (it is necessary for the prevention of troubles such as worsening of flatness and whitening) and that, reservedly, it swells the support to a minimum extent (it is necessary for a close adhesion).

To be more specific, when triacetyl cellulose is used for a support, various kinds of ketones (such as methyl ethyl ketone, acetone, methyl isobutyl ketone and cyclohexanone) and various kinds of cellosolves (such as ethyl Cellosolve, butyl Cellosolve and propylene glycol monomethyl ether) are preferably used as a main solvent. When a small amount of solvent having hydroxyl group is added to the main solvent selected from the above, antiglare property is able to be adjusted and that is particularly preferred. The small amount of the solvent having hydroxyl group remains even after the main solvent in a drying step of the applying composition whereby antiglare property is able to be made strong and, therefore, its vapor pressure at the temperature within a range of 20 to 30° C. is lower than the aforementioned main solvent. For example, a combination of methyl isobutyl ketone as a main solvent (vapor pressure at 21.7° C.: 16.5 mmHg) with propylene glycol (vapor pressure at 20.0° C., 0.08 mmHg) as a small amount of solvent having hydroxyl group is listed as a preferred example. Mixing ratio by weight of the main solvent to the small amount of solvent having hydroxyl group is preferably from 99:1 to 50:50 and, more preferably, from 95:5 to 70:30. When the ratio is more than 50:50, unevenness in stability of the applying liquid and in surface quality at the drying step after application becomes big and that is not preferred.

Formation of the hard coat layer of the transparent film according to the present invention is also able to be conducted by the same manner as in the case of the aforementioned antiglare layer except that light-transmitting particles are added.

(Materials for Low Refractive Layer)

Now a low refractive layer will be illustrated as hereunder.

(Low Refractive Layer)

Refractive index of the low refractive layer in the reflection preventing film according to the present invention is within a range of 1.20 to 1.46, preferably 1.25 to 1.46, and most preferably 1.30 to 1.46.

When the refractive index is less than 1.30, although the reflection preventing ability is improved, mechanical strength of the coat lowers while, when it is more than 1.55, reflection preventing property is significantly deteriorated.

Further, it is preferred in view of making the refractive index low that the low refractive layer satisfies the following formula (I).

$$(m\lambda/4) \times 0.7 < n1 \times d1 < (m\lambda/4) \times 1.3$$

In the formula, m is a positive odd number, n1 is a refractive index of the low refractive layer and d1 is film thickness (nm) of the low refractive layer. λ is wavelength and is a value within a range of 500 to 550 nm.

The expression saying "to satisfy the formula (I)" means that, in the aforementioned wavelength range, m (positive odd number; usually 1) which satisfies the formula (I) is present.

Further, in the reflection preventing film of the present invention, it is preferred that refractive index of the low refractive layer is lower than that of the hard coat layer to an extent of not less than 0.05 or, more preferably, to an extent of 0.07 to 0.3. When the difference in refractive indexes between the low refractive layer and the hard coat layer is less than 0.05, reflectivity increases and reflection preventing ability is lost whereby that is not preferred.

With regard to the low refractive layer, there may be used a low refractive layer comprising cross-linking of fluorine-containing resin (hereinafter, it may be referred to as "fluorine-containing resin before cross-linking") which is cross-linked by heat or by ionizing radiation (embodiment 1), a low refractive layer by a sol-gel method (embodiment 2), a low refractive layer using particles and binder polymer and having gap among the particles or inside of the particles (embodiment 3), etc.

Materials which form a low refractive layer comprising cross-linking of fluorine-containing resin (hereinafter, it may be referred to as "fluorine-containing resin before cross-linking") which is cross-linked by heat or by ionizing radiation (embodiment 1) will be illustrated as hereunder.

A low refractive layer is a hardened membrane which is formed by applying a hardening composition mainly comprising a fluorine-containing polymer for example followed by drying and hardening.

<Fluorine-Containing Polymer for Low Refractive Layer>

When the aforementioned fluorine-containing polymer is that a dynamic friction coefficient when made into hardened coat is 0.03 to 0.20, that a contact angle to water is 90 to 120° and that a slipping-down angle of pure water is not more than 70° and is a polymer which is cross-linked by heat or by ionizing radiation, that is preferred in view of improvement in productivity in such a case where, for example, roll film is applied and hardened during being conveyed by web.

When the reflection preventing film of the present invention is attached to an image display device, it is apt to be detached after seal or memo is adhered thereto if its releasing force for commercially available adhesive tape is low. Therefore, the releasing force is preferably not more than 500 gf, more preferably not more than 300 gf and, most preferably, not more than 100 gf.

Releasing force is able to be measured in accordance with JIS Z0237-1980.

The higher the surface hardness measured by a microhardness tester, the rarer the scratch formation and, therefore, the surface hardness is preferably not less than 0.3 GPa and, more preferably, not less than 0.5 GPa.

The fluorine-containing polymer used for the low refractive layer is preferred to be a fluorine-containing polymer which contains fluorine atom within a range of 35 to 80% by mass and contains cross-linking or polymerizable functional group and its examples are a hydrolysate or dehydrated condensate of silane compound containing perfluoroalkyl group [such as (heptadecafluoro-1,1,2,2-tetrahydrodecyl)triethoxysilane] and a fluorine-containing copolymer in which a fluorine-containing monomer unit and a cross-linkingly reactive unit as constituting units. In the case of a fluorine-containing copolymer, the main chain is preferred to be composed of carbon atom only. Thus, it is preferred that the main chain skeleton has neither oxygen atom nor nitrogen atom.

Specific examples of the aforementioned fluorine-containing monomer unit are fluoroolefins (such as fluoroethylene, vinylidene fluoride, tetrafluoroethylene, perfluorooctylethylene, hexafluoropropylene and perfluoro-2,2-dimethyl-1,3-dioxole), alkyl ester derivative in which (meth)acrylic acid is partially or completely fluorinated (such as Biscoat 6FM (manufactured by Osaka Yuki Kagaku) and M-2020 (manufactured by Daikin) and partially or completely fluorinated vinyl ether. Preferred ones are perfluoroolefins and, in view of refractive index, solubility, transparency and availability, hexafluoropropylene is particularly preferred.

Examples of the aforementioned cross-linkingly reactive unit are a constituting unit prepared by polymerization of a monomer which already has a self-cross-linking functional group in a molecule such as glycidyl(meth)acrylate and glycidyl vinyl ether; and a constituting unit where a cross-linking group such as (methy)acryloyl group is introduced by a polymer reaction (the introduction is possible by, for example, a means where acrylic acid chloride is made to act to hydroxyl group) to a constituting unit prepared by polymerization of a monomer having carboxyl group, hydroxyl group, amino group, sulfo group, etc. [such as (meth)acrylic acid, methylol (meth)acrylate, hydroxyalkyl (meth)acrylate, allyl acrylate, hydroxyethyl vinyl ether, hydroxybutyl vinyl ether, maleic acid and crotonic acid].

Further, besides the aforementioned fluorine-containing monomer unit and the aforementioned cross-linking unit, it is also possible that a monomer containing no fluorine atom is appropriately copolymerized so that other polymerizing unit is introduced in view of solubility to a solvent, transparency of the coat, etc. There is no particular limitation for the monomer unit which is able to be used together and its examples are olefins [such as ethylene, propylene, isoprene, vinyl chloride and vinylidene chloride], acrylates [such as methyl acrylate, methyl acrylate, ethyl acrylate and 2-ethylhexyl acrylate], methacrylates [such as methyl methacrylate, ethyl methacrylate, butyl methacrylate and ethylene glycol dimethacrylate], styrene derivatives [styrene, divinylbenzene, vinyltoluene and α-methylstyrene], vinyl ethers [such as methyl vinyl ether, ethyl vinyl ether and cyclohexyl vinyl ether], vinyl esters [such as vinyl acetate, vinyl propionate and vinyl cinnamate], acrylamides [such as N-tert-butylacrylamide and N-cyclohexylacrylamide], methacrylamide and acrylonitriles.

As mentioned in Japanese Patent Laid-Open Nos. 10/025,388 and 10/147,739, a hardener may be appropriately used together with the aforementioned fluorine-containing polymer.

Particularly useful fluorine-containing polymer in the present invention is a random copolymer of perfluoroethylene with vinyl ether or with vinyl ester. It is particularly preferred that there is a group which is able to be cross-linked solely [a radical reactive group such as (meth)acryoyl group or a ring-opening polymerizable group such as epoxy group and oxetanyl group].

The polymer unit containing the cross-linking group as such is preferred to occupy 5 to 70 mol % or particularly preferred to occupy 30 to 60 mol % of the total polymerization unit of the polymer.

With regard to the low refractive layer concerning the present invention, more preferred one is a hardened coat formed from an applying liquid having fluorine-containing polymer and/or polysiloxane-containing vinyl monomer.

It is preferred that the fluorine-containing polymer in that case is preferred to be a copolymer in which a repeating unit derived from the fluorine-containing vinyl monomer and a repeating unit having a (meth)acryloyl group in side chain are essential constituting components. After formation of the coat, components derived from the copolymer occupy preferably not less than 60% by mass, more preferably not less than 70% by mass and, particularly preferably, not less than 80% by mass of the coat solid. From the both viewpoints of making into low refractivity and hardness of the coat, a hardener such as multifunctional (meth)acrylate is also able to be used preferably within such an adding amount that it does not deteriorate the compatibility.

Compounds mentioned in Japanese Patent Laid-Open No. 11/228,631 are also able to be used preferably.

As hereunder, copolymer which is preferably used for the formation of low refractive layer in the present invention will be illustrated.

With regard to the fluorine-containing monomer, its examples are fluoroolefins (such as fluoroethylene, vinylidene fluoride, tetrafluoroethylene and hexafluoropropylene), alkyl ester derivative in which (meth)acrylic acid is partially or completely fluorinated (such as Biscoat 6FM (manufactured by Osaka Yuki Kagaku) and R-2020 (manufactured by Daikin) and partially or completely fluorinated vinyl ether. Preferred ones are perfluoroolefins and, in view of refractive index, solubility, transparency and availability, hexafluoropropylene is particularly preferred. When the composition ratio of such a fluorine-containing vinyl monomer is increased, refractive index is able to lower but strength of the coat lowers. In the present invention, it is preferred to introduce the fluorine-containing vinyl monomer so as to make the fluorine content of the copolymer 20 to 60% by mass. More preferably, it is the case of 25 to 55% by mass and, particularly preferably, it is the case of 30 to 50% by mass.

In the present invention, it is preferred that the copolymer has a repeating unit having (meth)acryloyl group in side chain as an essential constituting component. When the composition ratio of the repeating unit containing (meth)acryloyl group as such is increased, strength of the coat becomes high but the refractive index becomes high as well. Although it depends upon the type of the repeating unit derived from the fluorine-containing vinyl monomer, it is usually preferred that the repeating unit containing (meth)acryloyl group occupies 5 to 90% by mass, it is more preferred that the unit occupies 30 to 70% by mass and it is particularly preferred that the unit occupies 40 to 60% by mass.

Besides the aforementioned repeating unit derived from the fluorine-containing vinyl monomer and repeating unit having (meth)acryloyl group in side chain, the copolymer which is useful in the present invention may also be appropriately copolymerized with other vinyl monomer from various viewpoints such as close adhesion to the substrate, Tg of polymer (which contributes in hardness of the coat), solubility in solvent, transparency, slipping property, dust-preventing property and stain-preventing property. Depending upon the object, plural kinds of the vinyl monomer as such may be combined and it is preferred to introduce within a range of 0 to 65 molar % as a whole in the copolymer. More preferably, it is within a range of 0 to 45 molar % and, particularly preferably, it is within a range of 0 to 30 molar %.

There is no particular limitation for the usable vinyl monomer unit and its examples are olefins (such as ethylene, propylene, isoprene, vinyl chloride and vinylidene chloride), acrylates (such as methyl acrylate, methyl acrylate, ethyl acrylate, 2-ethylhexyl acrylate and 2-ethylhexyl acrylate), methacrylates (such as methyl methacrylate, ethyl methacrylate, butyl methacrylate and 2-ethylhexyl methacrylate), styrene derivatives (styrene, p-hydroxymethylstyrene and p-methylstyrene), vinyl ethers (such as methyl vinyl ether, ethyl vinyl ether, cyclohexyl vinyl ether, hydroxyethyl vinyl ether and hydroxybutyl vinyl ether), vinyl esters (such as vinyl acetate, vinyl propionate and vinyl cinnamate), unsaturated carboxylic acids (such as acrylic acid, methacrylic acid, crotonic acid, maleic acid and itaconic acid), acrylamides (such as N,N-dimethylacrylamide, N-tert-butylacrylamide and N-cyclohexylacrylamide), methacrylamide (such as N,N-dimethylmethacrylamide) and acrylonitrile.

In the present invention, a fluorine-containing polymer which is hardened by heat and/or hardened by ionizing radiation represented by the following formula 1 or 2 is preferably used.

Formula 1

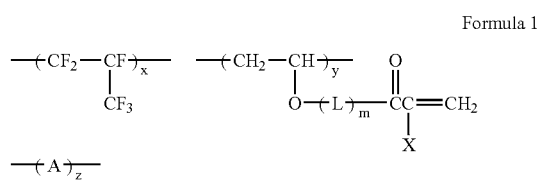

In the formula 1, L is a connecting group having 1 to 10 carbon(s), preferably a connecting group having 1 to 6 carbons and, particularly preferably, a connecting group having 2 to 4 carbons. It may be either in straight chain, in a branched structure or in a cyclic structure. It may also contain hetero atom(s) selected from O, N and S.

Preferred examples are *—$(CH_2)_2$—O—**, *—$(CH_2)_2$—NH—**, *—$(CH_2)_4$O—**, *—$(CH_2)_6$—O—, —$(CH_2)_2$—O—$(CH_2)_2$—O—, *—CONH—$(CH_2)_3$—O—**, *—$CH_2CH(OH)CH_2$—O—** and *—$CH_2CH_2OCONH(CH_2)_3$—O—** (in which * is a connecting site at the main chain side of the polymer and ** is a connecting site at the (meth)acryloyl group side). m is 0 or 1.

In the formula 1, X is hydrogen atom or methyl group. In view of the hardening reactivity, it is preferably hydrogen atom.

In the formula 1, A is a repeating unit derived from any vinyl monomer. There is no particular limitation therefor so far as it is a constituting component for a monomer which is able to be copolymerized with hexafluoropropylene and that may be appropriately selected from various viewpoints such as close adhesion to the substrate, Tg of the polymer (contributing in hardness of the coat), solubility in solvent, transparency, slipping property, dust-preventing property and stain-preventing property. It may be constituted from single or plural vinyl monomer(s) depending upon the object.

Preferred examples are vinyl ethers such as methyl vinyl ether, ethyl vinyl ether, tert-butyl vinyl ether, cyclohexyl vinyl ether, isopropyl vinyl ether, hydroxyethyl vinyl ether, hydroxybutyl vinyl ether, glycidyl vinyl ether and allyl vinyl ether; vinyl esters such as vinyl acetate, vinyl propionate and vinyl valerate; (meth)acrylates such as methyl (meth)acrylate, ethyl(meth)acrylate, hydroxyethyl(meth)acrylate, glycidyl methacrylate, allyl(meth)acrylate and (meth)acryloyloxypropyl trimethoxysilane; styrene derivatives such as styrene and p-hydroxymethylstyrene; and unsaturated carboxylic acids such as crotonic acid, maleic acid and itaconic acid as well as derivatives thereof. More preferred ones are vinyl ester derivatives and vinyl ester derivatives and particularly preferred ones are vinyl ether derivatives.

x, y and z each is molar % of each of the constituting components satisfying the relations of $30 \leq x \leq 60$, $5 \leq y \leq 70$ and $0 \leq z \leq 65$. Preferably it is the case where $35 \leq x \leq 55$, $30 \leq y \leq 60$ and $0 \leq x \leq 20$ and, particularly preferably, it is the case where $40 \leq x \leq 55$, $40 \leq y \leq 55$ and $0 \leq z \leq 10$.

With regard to the fluorine-containing polymer used in the present invention, the formula 2 may be also listed.

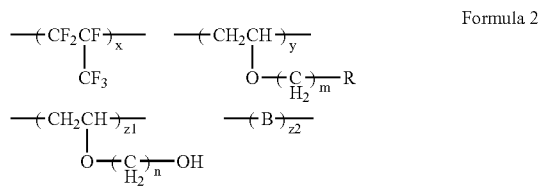

Formula 2

In the formula 2, R is an alkyl group having 1 to 10 carbon(s) or the ethylenic unsaturated group ($-O(C=O)C(-X)=CH_2$) in the formula 1.

m is an integer of $1 \leq m \leq 10$. Preferably, it is $1 \leq m \leq 6$ and, particularly preferably, it is $1 \leq m \leq 4$.

n is an integer of $2 \leq n \leq 10$. Preferably, it is $2 \leq n \leq 6$ and, particularly preferably, it is $2 \leq n \leq 4$.

B is a repeating unit derived from any vinyl monomer and it may be in a single composition or may be constituted from plural compositions. It may also contain a silicone moiety.

x, y, z1 and z2 each is molar % of each of the repeating units where x and y satisfy $30 \leq x \leq 60$ and $0 \leq y \leq 70$. Preferably it is the case where $35 \leq x \leq 55$ and $0 \leq y \leq 60$ and, particularly preferably, it is the case where $40 \leq x \leq 55$ and $0 \leq y \leq 55$. With regard to z1 and z2, they satisfy $1 \leq z1 \leq 65$ and $1 \leq z2 \leq 65$. Preferably it is the case where $1 \leq z1 \leq 40$ and $1 \leq z2 \leq 10$ and, particularly preferably, it is the case where $1 \leq z1 \leq 30$ and $1 \leq z2 \leq 5$. Incidentally $x+y+z1+z2=100$.

With regard to preferred specific examples of the copolymer represented by the formula 1 or 2, those which are listed in [0035] to [0047] of Japanese Patent Laid-Open No. 2004/045,462 may be referred to and they are able to be synthesized by the process mentioned in that patent.

It is also preferred that the fluorine-containing polymer of the present invention has a constituting unit having the following polysiloxane structure for providing a stain-preventing property.

Examples of the fluorine-containing polymer having a polysiloxane structure which is preferred in the present invention are fluorine-containing polymers in which the main chain comprises carbon atoms only and which contain at least one kind of (a) a fluorine-containing vinyl monomer polymerization unit, (b) a hydroxyl-containing vinyl monomer polymerization unit and (c) a polymerization unit having graft site containing a polysiloxane repeating unit represented by the following formula 3 at the side chain.

Formula 3

In the formula 3, $R^1$ and $R^2$ may be same or different and each is an alkyl group or an aryl group. With regard to the alkyl group, that having 1 to 4 carbon(s) is preferred and its examples are methyl group, trifluoromethyl group and ethyl group. With regard to the aryl group, that having 6 to 20 carbons is preferred and its examples are phenyl group and naphthyl group. Among the above, methyl group and phenyl group are preferred and the particularly preferred one is methyl group. p is an integer of 2 to 500, preferably 5 to 350 and, particularly preferably, 8 to 250.

The polymer having the polysiloxane structure represented by the formula 3 on the side chain is able to be synthesized by a method where polysiloxane (such as Sairaplane series (manufactured by Chisso)) having an opposite reactive group (such as epoxy group, amino group to acid anhydride group, mercapto group, carboxyl group or hydroxyl group) at one of the terminals is introduced into a polymer having a reactive group such as epoxy group, hydroxyl group, carboxyl group or acid anhydride group as mentioned, for example, in *J. Appl. Polym. Sci.*, 2000, 78, 1955 and Japanese Patent Laid-Open No. 56/028,219 or by a method where polysiloxane-containing silicon macromer is polymerized and any of the methods may be preferably used. In the present invention, a method where introduction is conducted by polymerization of silicon macromer is more preferred.

With regard to a silicon macromer, anything may be used so far as it has a polymeriable group which is able to copolymerize with a fluorine-containing olefin and, preferably, it is a structure represented by any of the formulae 4 to 7.

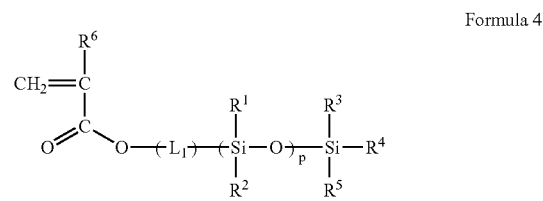

Formula 4

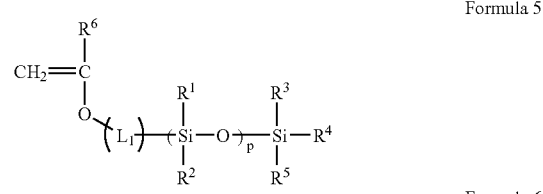

Formula 5

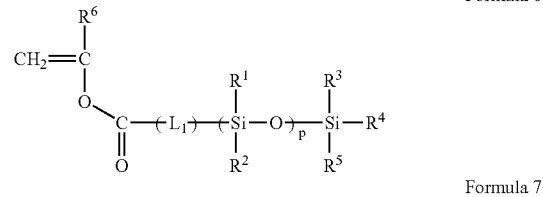

Formula 6

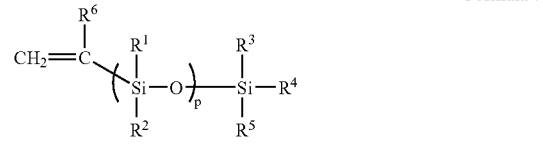

Formula 7

In the formulae 4 to 7, $R^1$, $R^2$ and p have the same meanings as those in the formula 3 and preferred range thereof are also the same as those. $R^3$ to $R^5$ each independently is a substituted or unsubstituted univalent organic group or hydrogen atom and particularly preferred ones are an alkyl group having 1 to 10 carbon(s) (such as methyl group, ethyl group and octyl group), an alkoxy group having 1 to 10 carbon(s) (such as methoxy group, ethoxy group and propyloxy group) and an aryl group having 6 to 20 carbons (such as phenyl group and naphthyl group) and the particularly preferred one is an alkyl group having 1 to 5 carbon(s). $R^6$ is hydrogen atom or methyl group. $L_1$ is any connecting group having 1 to 20 carbon(s). Its examples are a substituted or unsubstituted and linear, branched or alicyclic alkylene group or a substituted or unsubstituted arylene group where the preferred ones are an unsubstituted linear alkylene group having 1 to 20 carbon(s) and the particularly preferred one is ethylene group or propylene group. Such compounds are synthesized, for example, by the process mentioned in Japanese Patent Laid-Open No. 06/322,053.

Any of the compounds represented by the formulae 4 to 7 may be preferably used in the present invention and, among them, that having a structure represented by the formula 4, 5 or 6 is particularly preferred in view of copolymerizing property with the fluorine-containing olefin. The aforementioned polysiloxane moiety is preferred to occupy 0.01 to 20% by mass of the graft copolymer. More preferably, it is the case of 0.05 to 15% by mass and, particularly preferably, it is the case of 0.5 to 10%.

As hereunder, preferred examples of the polymerization unit of the polymer graft moiety containing a polysiloxane moiety on the side chain which is useful in the present invention are shown although the present invention is not limited thereto.

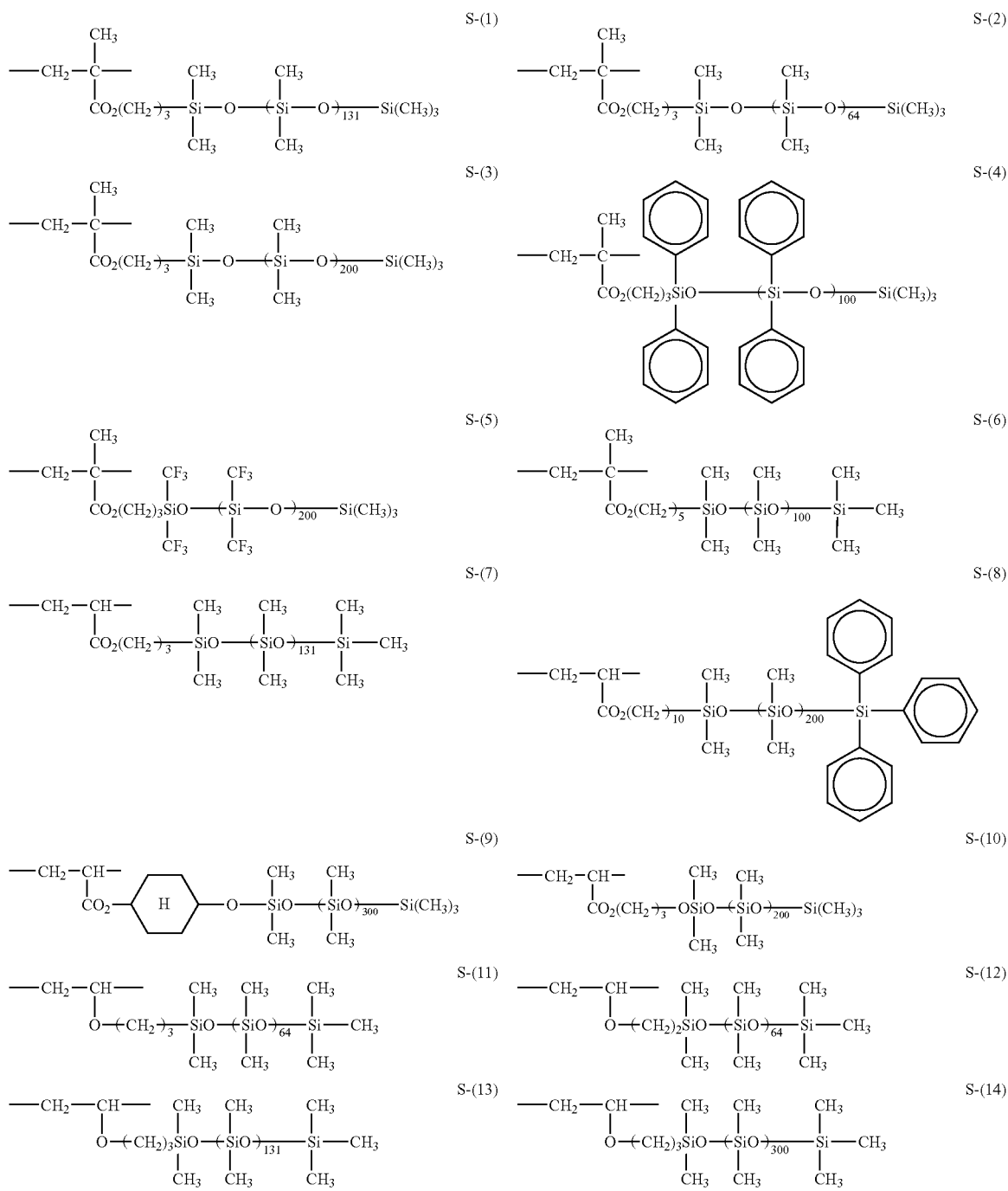

-continued
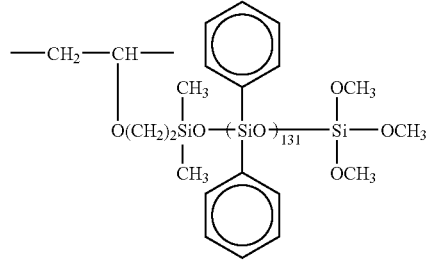 S-(15)
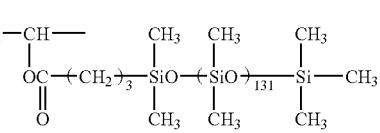 S-(16)
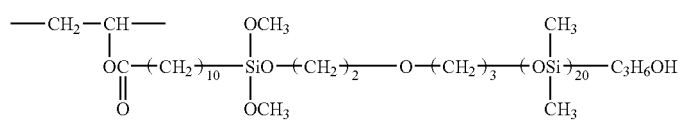 S-(17)
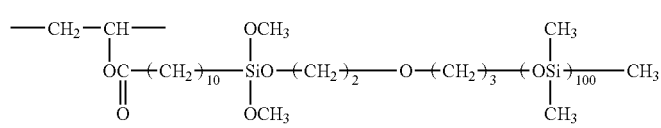 S-(18)
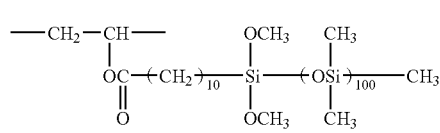 S-(19)
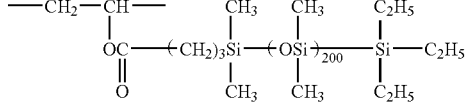 S-(20)
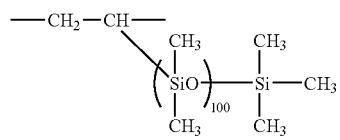 S-(21)
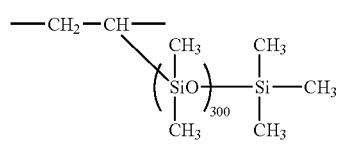 S-(23)
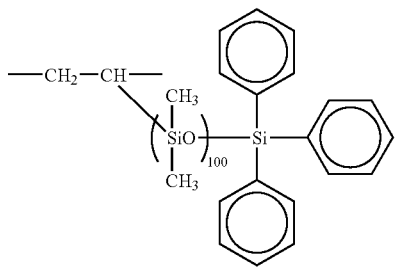 S-(22) / S-(24)
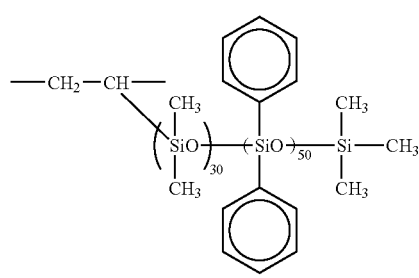 S-(25)
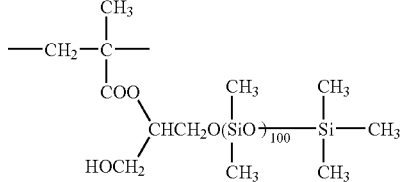 S-(26)
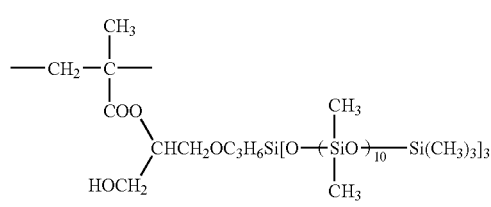 S-(27)
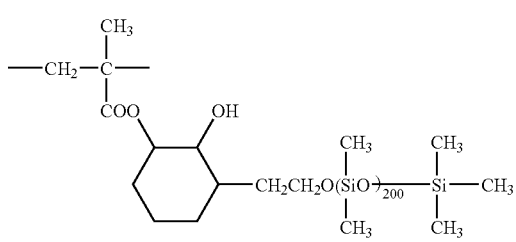 S-(28)

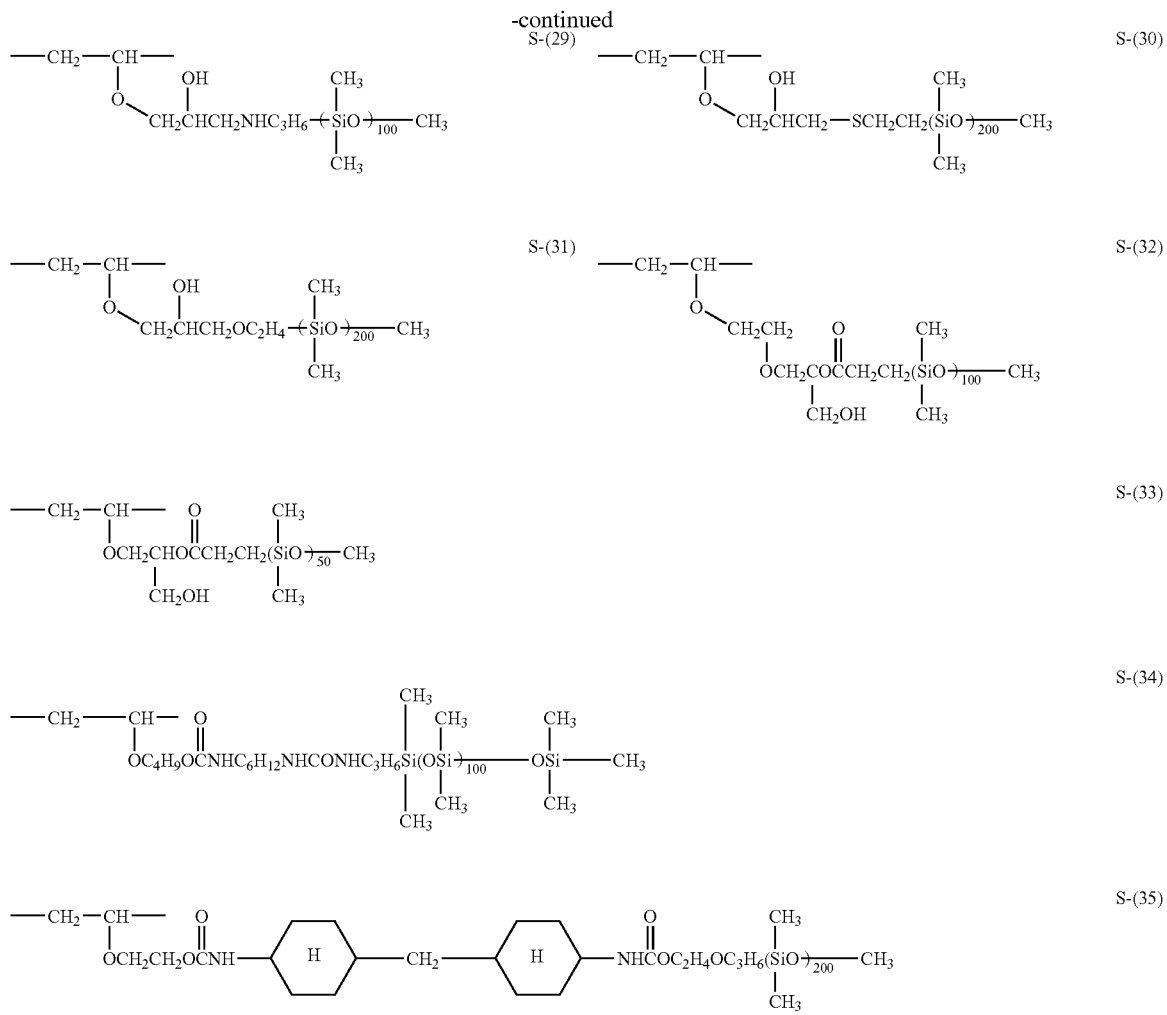

S-(36) Sairaplane FM-0711 (manufactured by Chisso)
S-(37) Sairaplane FM-0721 (same as above)
S-(38) Sairaplane FM-0725 (same as above)

As a result of introduction of the polysiloxane structure, a stain-preventing property and a dust-preventing property are provided to the coat and, at the same time, a slipping property is provided to the coat surface whereby that is advantageous in terms of resistance to scratch as well.

As hereunder, preferred examples of the fluorine-containing polymer useful in the present invention are shown although the present invention is not limited thereto.

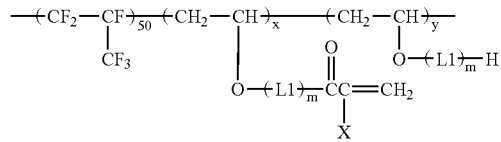

| | x | y | m | L1 | X |
|---|---|---|---|---|---|
| P-1 | 50 | 0 | 1 | *—CH$_2$CH$_2$O—** | H |
| P-2 | 50 | 0 | 1 | *—CH$_2$CH$_2$O—** | CH$_3$ |
| P-3 | 45 | 5 | 1 | *—CH$_2$CH$_2$O—** | H |

-continued

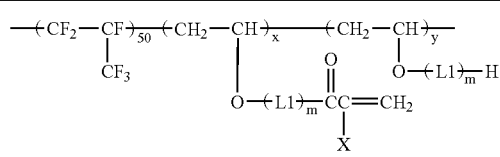

| | x | y | m | L1 | X |
|---|---|---|---|---|---|
| P-4 | 40 | 10 | 1 | *—CH$_2$CH$_2$O—** | H |
| P-5 | 30 | 20 | 1 | *—CH$_2$CH$_2$O—** | H |
| P-6 | 20 | 30 | 1 | *—CH$_2$CH$_2$O—** | H |
| P-7 | 50 | 0 | 0 | — | H |
| P-8 | 50 | 0 | 1 | *—C$_4$H$_8$O—** | H |
| P-9 | 50 | 0 | 1 | *—(CH$_2$)$_2$—O—(CH$_2$)$_2$—O—** | H |
| P-10 | 50 | 0 | 1 | *—⟨cyclohexyl⟩—O—** | H |

*shows the main chain side of the polymer and **shows the (meth)acryloyl group side thereof

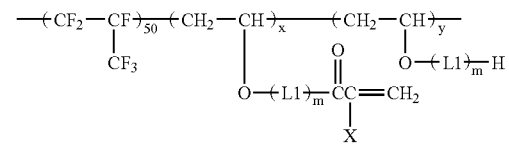

| | x | y | m | L1 | X |
|---|---|---|---|---|---|
| P-11 | 50 | 0 | 1 | *—CH₂CH₂NH—** | H |
| P-12 | 50 | 0 | 1 | *—CH₂CH₂OC(O)NHCH₂CH₂CH₂O—** | H |
| P-13 | 50 | 0 | 1 | *—CH₂CH₂OC(O)NHCH₂CH₂CH₂O—** | CH₃ |
| P-14 | 50 | 0 | 1 | *—CH₂CH₂CH₂CH₂OC(O)NHCH₂CH₂CH₂O—** | CH₃ |
| P-15 | 50 | 0 | 1 | *—CH₂CH(OH)CH₂O—** | H |
| P-16 | 50 | 0 | 1 | *—CH₂CH(CH₂OH)O—** | H |
| P-17 | 50 | 0 | 1 | *—CH₂CH₂OCH₂—CH(OH)CH₂O—** | H |
| P-18 | 50 | 0 | 1 | *—CH₂OCH₂CH(OH)—CH₂O—** | CH₃ |
| P-19 | 50 | 0 | 1 | *—CH₂OCH₂CH(CH₂OH)—O—** | CH₃ |
| P-20 | 40 | 10 | 1 | *—CH₂CH₂O—** | CH₃ |

*shows the main chain side of the polymer and **shows the (meth)acryloyl group side thereof

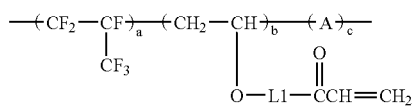

| | a | b | c | L1 | A |
|---|---|---|---|---|---|
| P-21 | 55 | 45 | 0 | *—CH₂CH₂O—** | — |
| P-22 | 45 | 55 | 0 | *—CH₂CH₂O—** | — |
| P-23 | 50 | 45 | 5 | *—CH₂CH₂OC(O)NHCH₂CH₂CH₂O—** | —CH₂—CH(OCH₂CH₂OH)— |
| P-24 | 50 | 45 | 5 | *—CH₂CH(OH)—CH₂O—** | —CH₂—CH(OCH₂-epoxide)— |

-continued $$-(CF_2-CF)_a-(CH_2-CH)_b-(A)_c-$$
$$\quad\quad\quad |\quad\quad\quad\quad |$$
$$\quad\quad CF_3\quad\quad O-L1-\overset{O}{\underset{\|}{C}}CH=CH_2$$

| | a | b | c | L1 | A |
|---|---|---|---|---|---|
| P-25 | 50 | 45 | 5 | *—CH$_2$CHO—** with CH$_2$OH branch | —CH$_2$—CH— with O—CH$_2$—(epoxide) |
| P-26 | 50 | 40 | 10 | *—CH$_2$CH$_2$O—** | —CH$_2$—CH— with OCH$_2$CH$_3$ |
| P-27 | 50 | 40 | 10 | *—CH$_2$CH$_2$O—** | —CH$_2$—CH— with O-cyclohexyl |
| P-28 | 50 | 40 | 10 | *—CH$_2$CH$_2$O—** | —CH(CH$_3$)—CH(COOH)— |

*shows the main chain side of the polymer and **shows the acryloyl group side thereof $$-(CF_2)_x-CF(CF_3)-(CH_2-CH)_y-(CH_2-CH)_{z1}-(B)_{z2}-$$
with side chains: $O-(CH_2)_n O\overset{O}{\underset{\|}{C}}C(X)=CH_2$ and $O-(CH_2)_n-OH$

| | x | y | z1 | z2 | n | X | B |
|---|---|---|---|---|---|---|---|
| P-29 | 50 | 40 | 5 | 5 | 2 | H | —CH$_2$—CH(O—CH$_2$CH$_3$)— |
| P-30 | 50 | 35 | 5 | 10 | 2 | H | —CH$_2$—CH(O—C(CH$_3$)$_3$)— |
| P-31 | 40 | 40 | 10 | 10 | 4 | CH$_3$ | —CH$_2$—CH(O-cyclohexyl)— |

$$-(CF_2-CF)_{50}-(Y)_a-(Z)_b-$$
$$\quad\quad |$$
$$\quad CF_3$$

| | a | b | Y | Z |
|---|---|---|---|---|
| P-32 | 45 | 5 | —CH(CH$_3$)—CH(CO$_2$CH$_2$CH(OH)CH$_2$O\overset{O}{\underset{\|}{C}}C(CH$_3$)=CH$_2$)— | —CH(CH$_3$)—CH(COOH)— |

-continued $$-(CF_2-CF)_{50}-(Y)_a-(Z)_b-$$
$$\phantom{-(CF_2-}|\phantom{)_{50}}$$
$$\phantom{-(CF_2-}CF_3$$

| | a | b | Y | Z |
|---|---|---|---|---|
| P-33 | 40 | 10 | —CH₂—CH— with CO₂H and CONHCH₂CH₂OC(=O)CH=CH₂ | —CH—CH— (succinic anhydride) |

$$-(CH_2-CH)_x-(CH_2-CH)_y-(CH_2-CH)_z-$$

with substituents: O=C—O—Rf ; O=C—O—L—O—CCH=CH₂ ; O=C—O—L—H

| | x | y | z | Rf | L |
|---|---|---|---|---|---|
| P-34 | 60 | 40 | 0 | —CH₂CH₂C₈H₁₇-n | —CH₂CH₂O— |
| P-35 | 60 | 30 | 10 | —CH₂CH₂C₄F₈H-n | —CH₂CH₂O— |
| P-36 | 40 | 60 | 0 | —CH₂CH₂C₆F₁₂H | —CH₂CH₂CH₂CH₂O— |

$$-(CH_2-CH)_x-(CH_2-CH)_y-(CH_2-CH)_z-$$

with substituents: O—Rf ; O—(CH₂)ₙ—OC(=O)CH=CH₂ ; O—(CH₂)ₙ—OH

| | x | y | z | n | Rf |
|---|---|---|---|---|---|
| P-37 | 50 | 50 | 0 | 2 | —CH₂C₄F₈H-n |
| P-38 | 40 | 55 | 5 | 2 | —CH₂C₄F₈H-n |
| P-39 | 30 | 70 | 0 | 4 | —CH₂C₈F₁₇-n |
| P-40 | 60 | 40 | 0 | 2 | —CH₂CH₂C₈F₁₆H-n |

$$-(CF_2CF)_x-\ -(CH_2CH)_y-\ -(CH_2CH)_{z1}-\ -(B)_{z2}-$$

with CF₃ ; O—(CH₂)ₘ—R ; O—(CH₂)ₙ—OH

| | x | y | m | R | z1 | n | z2 | B |
|---|---|---|---|---|---|---|---|---|
| P-41 | 50 | 10 | 2 | mAc | 40 | 0 | 0 | — |
| P-42 | 50 | 5 | 2 | CH₃ | 45 | 2 | 0 | — |
| P-43 | 50 | 15 | 2 | CH₃ | 30 | 2 | 3.8 | S-38 |
| P-44 | 45 | 21 | 2 | CH₃ | 25 | 2 | 3.8 | S-38 | mAc = O(C=O)C(—CH₃)=CH₂

The copolymer used in the present invention is able to be synthesized by a process mentioned in Japanese Patent Laid-Open No. 2004/045,462. Synthesis of the copolymer used in the present invention is also able to be carried out by various polymerization methods besides the above such as solution polymerization, precipitation polymerization, suspension polymerization, precipitation polymerization, bulk polymerization and emulsion polymerization followed by introducing a (meth)acryloyl group by the aforementioned polymer reaction into a precursor such as a hydroxyl-containing polymer synthesized as above. The polymerization reaction is able to be carried out by a known operation such as a batch system, a semi-continuous system and a conductive system.

In a method for initiating the polymerization, there are a method in which a radical initiator is used and a method in which ionizing radiation is irradiated. Those polymerization methods and initiating methods for polymerization are mentioned, for example, in "Kobunshi Gosei Hoho" (Synthetic Methods for Polymers" by Teiji Tsuruta, revised edition, published by Nikkan Kogyo Shinbunsha, 1971 and "Kobunshi Kagaku no Jikkenho" (Experimental Methods for Polymer Synthesis" by Takayuki Otsu and Masanobu Kinoshita, published by Kagaku Dojin, 1972, pages 124 to 154.

Among the aforementioned polymerization methods, a solution polymerization method using a radical initiator is particularly preferred. The solvent used for the solution polymerization method are organic solvents such as ethyl acetate, butyl acetate, acetone, methyl ethyl ketone (MEK), methyl isobutyl ketone (MIBK), cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol. Each of them may be used either as a sole organic solvent or as a mixture of two or more thereof or as a mixed solvent thereof with water.

It is necessary that the polymerization temperature is set in relation to molecular weight of the resulting polymer, type of the initiator, etc. and, although it is possible to be not higher than 0° C. or not lower than 100° C., it is preferred to conduct the polymerization within a range of 50 to 100° C.

Although the reaction pressure is able to be appropriately set, it is usually preferred to be about 1 to 100 kpa and, particularly, 1 to 30 kPa. Reaction time is about 5 to 30 hours.

With regard to a solvent for re-precipitation of the resulting polymer, isopropanol, hexane, methanol, etc. are preferred.

With regard to a polysiloxane-containing vinyl monomer used for the formation of low refractive layer in the present invention, that which is represented by the following formula I is preferred.

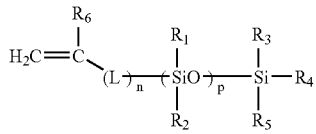

(Formula I)

In the formula I, $R_1$ and $R_2$ may be same or different and each is hydrogen atom, an alkyl group or an aryl group. P is an integer of 10 to 500. $R_3$, $R_4$ and $R_5$ may be same or different and each is hydrogen or a univalent organic group and $R_6$ is hydrogen atom or methyl group. L is a single bond or a divalent connecting group and n is 0 or 1.

In the formula I, $R^1$ and $R^2$ each is hydrogen atom or an optionally substituted alkyl or aryl group. $R^1$ and $R^2$ may be same or different. With regard to the alkyl group, that having 1 to 4 carbon(s) is preferred and its examples are methyl group, trifluoromethyl group and ethyl group. With regard to the aryl group, that having 6 to 20 carbons is preferred and its examples are phenyl group and naphthyl group. Among them, methyl group and phenyl group are preferred and methyl group is particularly preferred. With regard to a substituent which may be substituted in $R^1$ and $R^2$, its examples are an alkyl group having 1 to 6 carbon(s) (such as methyl and ethyl), an aryl group having 6 to 10 carbons (such as phenyl), an alkoxy having 1 to 6 carbon(s) (such as methoxy and ethoxy), an alkoxycarbonyl having 1 to 6 carbon(s) (such as methoxycarbonyl), cyano group, fluorine atom and chlorine atom.

p is an integer of 10 to 500, preferably 50 to 330 and, particularly preferably, 100 to 250.

$R^3$ to $R^5$ each is a substituted or unsubstituted univalent organic group or hydrogen atom, preferably an alkyl group having 1 to 10 carbon(s) (such as methyl group, ethyl group and octyl group), an alkoxy having 1 to 10 carbon(s) (such as methoxy group, ethoxy group and propyloxy group) and an aryl group having 6 to 20 carbons (such as phenyl group and naphthyl group), more preferably, phenyl group or an alkyl group having 1 to 5 carbon(s) and, particularly preferably, methyl group. $R^3$ to $R^5$ may be same or different. Preferred substituents which may be substituted in $R^3$ to $R^5$ are the same as those which are listed as substituents for $R^1$ and $R^2$. $R^6$ is hydrogen atom or methyl group. L is a single bond or a divalent connecting group. Preferably, it comprises 1 to 25 carbon(s) and, although there is no particular limitation therefor so far as it is able to connect to a polymerizable vinyl group, more preferred one has a structure represented by the following formula II or III. n is 0 or 1.

In the above formula II or III, L' is a substituted or unsubstituted and linear, branched or alicyclic alkylene group or a substituted or unsubstituted arylene group. Preferably it is an alkylene or arylene group having 1 to 25 carbon(s), more preferably a linear alkylene group having 1 to 25 carbon(s) and, particularly preferably, ethylene group or propylene group. With regard to a substituent for L', those which are listed as substituents for $R^1$ and $R^2$ are preferred.

As hereunder, preferred examples of a polymerization unit having polysiloxane moiety on the side chain useful in the present invention being derived from the polysiloxane-containing vinyl monomer are listed although the present invention is not limited thereto.

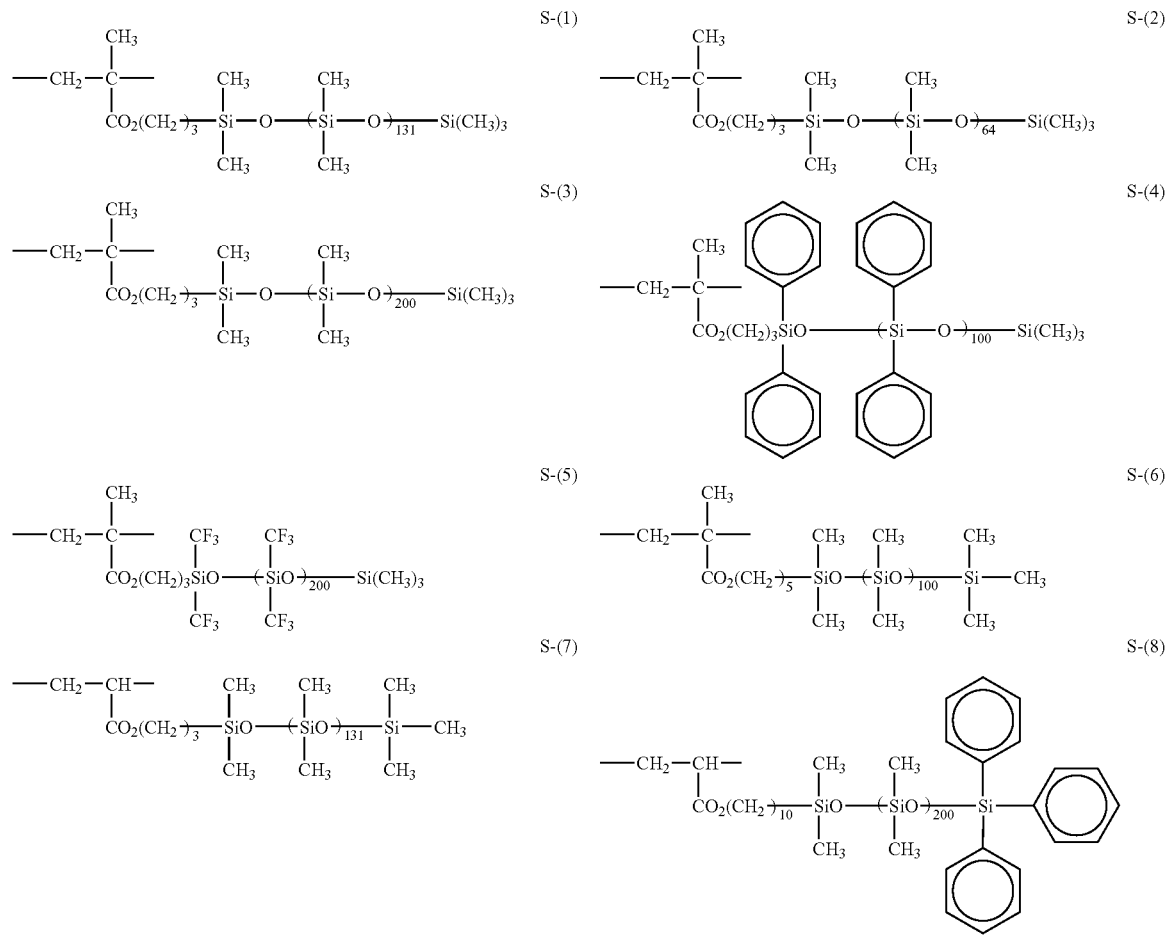

-continued
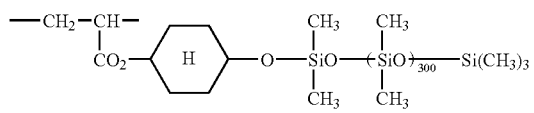 S-(9)
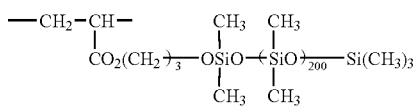 S-(10)
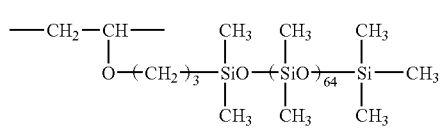 S-(11)
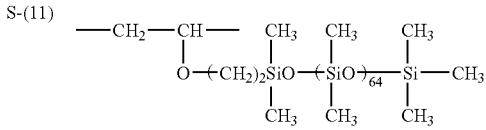 S-(12)
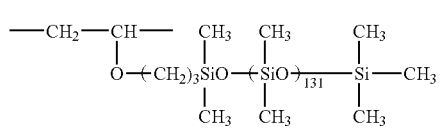 S-(13)
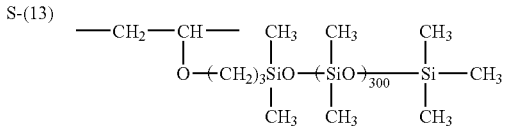 S-(14)
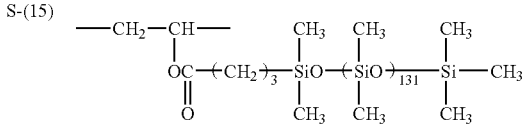 S-(16)
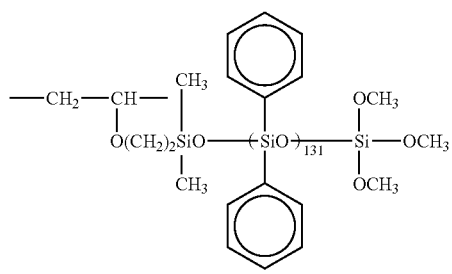 S-(15)
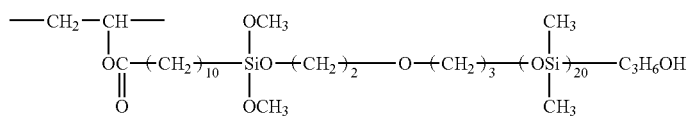 S-(17)
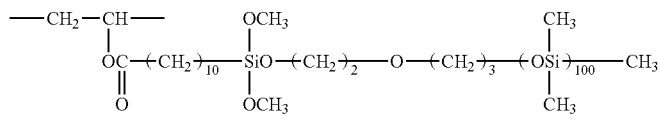 S-(18)
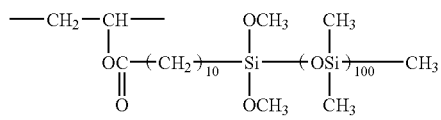 S-(19)
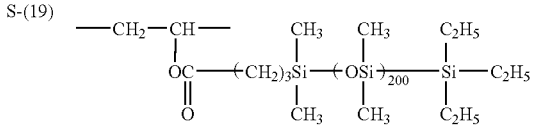 S-(20)
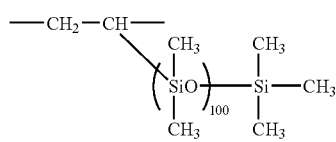 S-(21)
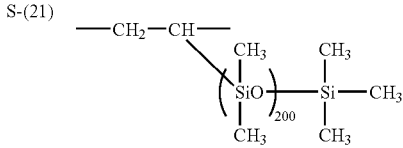 S-(22)
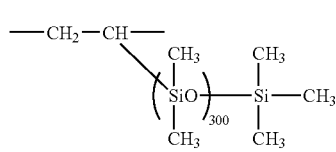 S-(23)
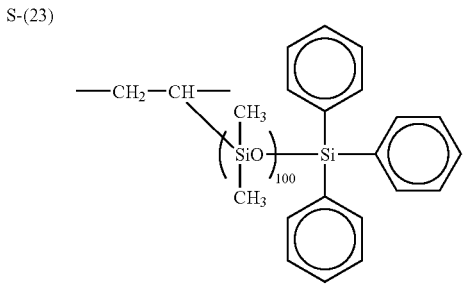 S-(24)

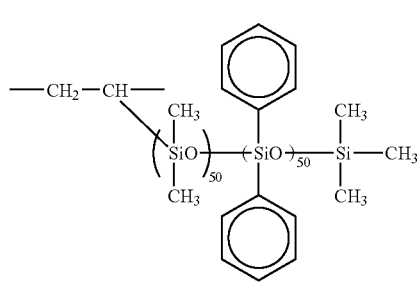
S-(25)

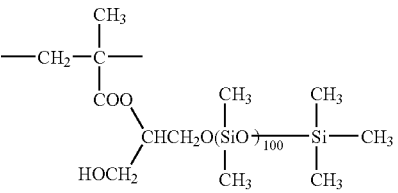
S-(26)

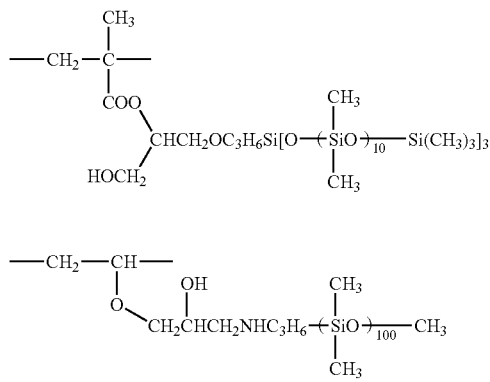
S-(27)

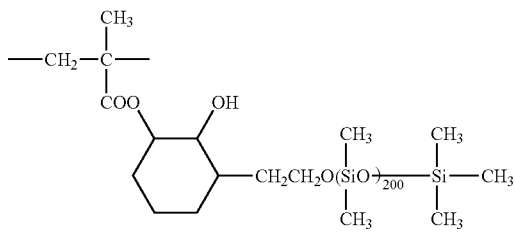
S-(28)

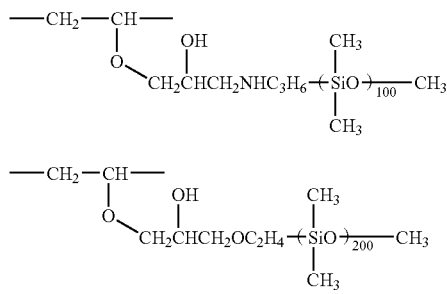
S-(29)

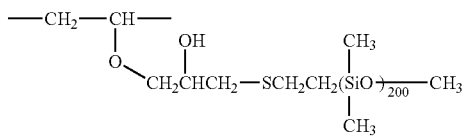
S-(30)

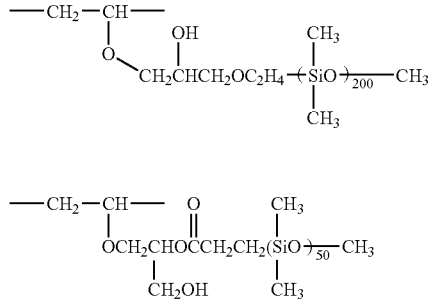
S-(31)

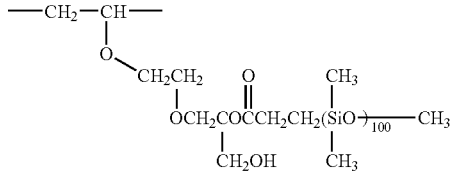
S-(32)

S-(33)

S-(34)

S-(35)

When the fluorine-containing polymer itself contains hydroxyl group, it is preferred to use a hardener having two or more functional groups which are able to react with the hydroxyl group in a molecule. There is no particular limitation for the hardener having two or more functional groups which are able to react with the hydroxyl group in a molecule and its examples are polyisocyanates, partial condensates of isocyanate compound, adducts to multimer, polyhydric alcohol, low-molecular polyester coat, block polyisocyanate compound where isocyanate group is blocked with a blocking agent such as phenol, aminoplasts, polybasic acids or anhydrides thereof. When the hardener as such is used, amount of the monomer unit containing hydroxyl group is preferably 2% to 80%, more preferably 10% to 50% and, most preferably, 25% to 50%.

Among the hardeners which react with hydroxyl group, aminoplasts which conduct a cross-linking reaction with a hydroxyl-containing compound under an acidic condition are preferred in the present invention in view of that both stability upon preservation and activity of cross-linking reaction are achieved and also in view of strength of the coat formed thereby. With regard to the aminoplasts, they are preferred to be compounds having amino group which is able to react with hydroxyl group existing in the fluorine-containing polymer or, in other words, hydroxyalkylamino group or alkoxyalkylamino group or compounds having carbon atom which is adjacent to nitrogen atom and substituted with alkoxy group. Specific examples thereof are melamine-type compounds, urea-type compounds and benzoguanamine-type compounds.

The aforementioned melamine-type compounds have been usually known as compounds having a skeleton where nitrogen atom is bonded to triazine ring and specific examples thereof are melamine, alkylated melamine, methylolmelamine and alkoxylated melamine. Preferred ones are methylolated melamine prepared by the reaction of melamine with formaldehyde under a basic condition, alkoxylated melamine and derivatives thereof and, in view of stability upon preservation, alkoxylated melamine is particularly preferred. There is no particular limitation for methylolated melamine and alkoxylated melamine and various kinds of resins prepared by a method mentioned, for example, in "Plastic Materials [8]—Urea Melamine Resins" (published by Nikkan Kogyo Shinbun) may be used as well.

With regard to the aforementioned urea compound, polymethylolurea and derivative thereof which is an alkoxylated methylurea and, further, compounds having glycolurea skeleton and 2-imidazolidinone skeleton which are cyclic urea structures are also preferred in addition to urea. With regard to the amino acids of the aforementioned urea derivatives, it is also possible to use various kinds of resins mentioned, for example, in the aforementioned "Urea Melamine Resin".

With regard to a compound which is advantageously used as a cross-linking agent in the present invention, a melamine compound or a glycol uryl compound is particularly preferred in view of compatibility to the fluorine-containing copolymer. Among the above, it is particularly preferred in view of reactivity that the cross-linking agent is a compound containing nitrogen atom in a molecule and also containing two or more carbon atoms substituted with an alkoxy group being adjacent to the nitrogen atom. Particularly preferred compounds are the compounds having the structures represented by the following H-1 and H-2 and partial condensates thereof. In the formulae, R is an alkyl group having 1 to 6 carbon(s) or hydroxyl group.

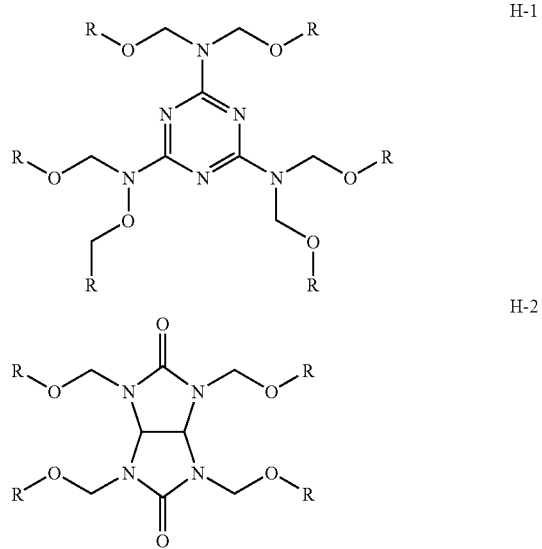

Adding amount of the aminoplast to the fluorine-containing polymer is 1 to 50 part(s) by mass, preferably 3 to 40 parts by mass and, still more preferably, 5 to 30 parts by mass to 100 parts by mass of the copolymer. When the amount is more than 1 part by mass or more, durability as a thin film which is the characteristic of the present invention is able to be fully achieved while, when it is 50 parts by mass or less, a low refractive index which is the characteristic of the low refractive layer of the present invention is able to be maintained and they are preferred. From the viewpoint that the refractive index is able to be kept low even when a hardener is added, a hardener where a rise in refractive index is low even if added is preferred and, in such a view, a compound having a skeleton represented by H-2 is more preferred among the aforementioned compounds.

Especially when an aminoplast-type hardener is added in the formation of the film of the present invention, it is preferred that the membrane is hardened by a cross-linking reaction of hydroxyl group of the fluorine-containing polymer with the aforementioned hardener together with heating and/or irradiation of light. Since hardening is accelerated by acid in such a system, it is preferred to add an acidic substance to the hardening resin composition but, when common acid is added thereto, a cross-linking reaction proceeds even during the application and that is a cause of troubles (such as unevenness and repelling) and, therefore, it is more preferred to add a compound which generates an acid by heating as a hardening catalyst.

The hardening catalyst is preferred to be a salt comprising an acid and an organic base. Examples of the acid are an organic acid such as sulfonic acid, phoshonic acid and carboxylic acid and an inorganic acid such as sulfuric acid and phosphoric acid and, in view of compatibility to the polymer, an organic acid is more preferred, sulfonic acid and phosphonic acid are still more preferred and sulfonic acid is most preferred. Preferred examples of the sulfonic acid are p-toluenesulfonic acid (PTS), benzenesulfonic acid (BS), p-dodecylbenzenesulfonic acid (DBS), p-chlorobenzenesulfonic acid (CBS), 1,4-naphthalenedisulfonic acid (NDS), methanesulfonic acid (MsOH) and nonafluorobutane-1-sulfonic acid (NFBS) and any of them may be used preferably (the names in ( ) are abbreviations).

A hardening catalyst greatly varies depending upon basicity and boiling point of the organic base which is combined with the acid. As hereunder, the hardening catalyst which is preferably used in the present invention in each of the views will be illustrated.

When basicity of the organic base is low, efficiency for generation of acid upon heating is high and that is preferred in view of the hardening activity but, when basicity is too low, stability upon preservation becomes insufficient. Accordingly it is preferred to use an organic base having an appropriate basicity. When pKa of a conjugated acid is used as an index of basicity, the pKa of the organic base used in the present invention is to be 5.0 to 10.5, more preferably 6.0 to 10.0 and, still more preferably, 6.5 to 10.0. pKa values of organic bases are mentioned in "Kagaku Binran—Kisohen" (Handbook of Chemistry—Fundamental Section) (revised fifth edition, edited by the Chemical Society of Japan, published by Maruzen, 2004; Volume 2-II, pages 334 to 340) and it is possible to select organic bases having appropriate pKa value therefrom. Even compounds which are not mentioned in that book but are estimated to have appropriate pKa values from the structures may also be used preferably. In the following table, compounds having appropriate pKa values mentioned in the book are shown although compounds which are able to be preferably used in the present invention are not limited thereto.

TABLE 1

|      |                              | pK   |
|------|------------------------------|------|
| b-1  | N,N-Dimethylaniline          | 5.1  |
| b-2  | Benzimidazole                | 5.5  |
| b-3  | Pyridine                     | 5.7  |
| b-4  | 3-Methylpyridine             | 5.8  |
| b-5  | 2,9-Dimethyl-1,10-phenanthroline | 5.9  |
| b-6  | 4,7-Dimethyl-1,10-phenanthroline | 5.9  |
| b-7  | 2-Methylpyridine             | 6.1  |
| b-8  | 4-Methylpyridine             | 6.1  |
| b-9  | 3-(N,N-Dimethylamino)pyridine | 6.5  |
| b-10 | 2,6-Dimethylpyridine         | 7.0  |
| b-11 | Imidazole                    | 7.0  |
| b-12 | 2-Methylimidazole            | 7.6  |
| b-13 | N-Ethylmorpholine            | 7.7  |
| b-14 | N-Methylmorpholine           | 7.8  |
| b-15 | Bis(2-methoxyethyl)amine     | 8.9  |
| b-16 | 2,2'-Iminodiethanol          | 9.1  |
| b-17 | N,N-Dimethyl-2-aminoethanol  | 9.5  |
| b-18 | Trimethylamine               | 9.9  |
| b-19 | Triethylamine                | 10.7 |

When boiling point of the organic base is lower, acid generation efficiency upon heating is high and that is preferred from the viewpoint of the hardening activity. Accordingly, it is preferred to use an organic base having an appropriate boiling point. With regard to the boiling point of the base, it is preferred to be not higher than 120° C., more preferred to be not higher than 115° C., still more preferred to be not higher than 80° C. and particularly preferred to be not higher than 70° C.

Examples of the organic base which is preferably used in the present invention are as follows although they are non-limitative. Numeral in the parentheses is boiling point.

b-3: pyridine (115° C.); b-14: 4-methylmorpholine (115° C.): b-20: diallylmethylamine (111° C.); b-19: triethylamine (88.8° C.); b-21: tert-butylmethylamine (67 to 69° C.); b-22: dimethylisopropylamine (66° C.); b-23: diethylmethylamine (63 to 65° C.); b-24: dimethylethylamine (36 to 38° C.).

Boiling point of the organic base of the present invention is 35° C. to 120° C. At the temperature higher than that, deterioration in resistance to scratch is resulted while, at the temperature lower than 35° C., an applying liquid becomes unstable. Boiling point is more preferably 35° C. to 120° C. and, most preferably, 40° C. to 115° C.

When an acidic catalyst of the present invention is used, a salt comprising the aforementioned acid and organic base may be isolated and used or acid and organic base are mixed to form a salt in a solution and such a solution may be used. For each acid and organic base, only one kind thereof may be used or plural kinds thereof may be mixed and used. When acid and organic base are mixed and used, it is preferred to mix the acid and the organic base so as to make their equivalent ratio 1:0.9 to 1.5, more preferably 1:0.95 to 1.3 and, most preferably, 1:1.0 to 1.1.

Amount of the acid catalyst used to 100 parts by mass of the fluorine-containing polymer in the aforementioned hardening resin composition is preferably 0.01 to 10 part(s) by mass, more preferably 0.1 to 5 part(s) by mass and, still more preferably, 0.2 to 3 part(s) by mass.

In the present invention, a compound which generates acid by irradiation of light or, in other words, a photosensitive acid generator may be further added thereto in addition to the aforementioned thermal acid generator. The photosensitive acid generator is a substance which provides photosensitivity to the coat of the hardening resin composition and makes the coat photosensitive by, for example, irradiation of radiation such as light. Examples of the photosensitive acid generator are (1) various kinds of onium salts such as iodonium salt, sulfonium salt, diazonium salt, ammonium salt and pyridinium salt; (2) sulfone compounds such as β-ketoester, β-sulfonylsulfone and α-diazonium compound thereof; (3) sulfonates such as alkyl sulfonate, haloalkyl sulfonate, aryl sulfonate and iminosulfonate; (4) sulfonamide compounds; (5) diazomethane compounds; (5) trihalomethyltriazines of the present invention; and others and they may be appropriately used.

The photosensitive acid generator may be used solely or two or more thereof may be used jointly. Further, it may be used together with the aforementioned thermal acid generator. Amount of the photosensitive acid generator used is preferably 0.01 to 20 part(s) by mass and, more preferably, 0.1 to 10 part(s) by mass to 100 parts by mass of the fluorine-containing polymer in the hardening resin composition. When the amount of the photosensitive acid generator is not more than the upper limit, strength of the resulting hardened coat is good and transparency is also good whereby that is preferred.

Examples of the aforementioned onium compound are diazonium salt, ammonium salt, iminium salt, phosphonium salt, iodonium salt, sulfonium salt, arsonium salt and selenonium salt and, among those, diazonium salt, iodonium salt, sulfonium salt and iminium salt are preferred in view of photosensitivity upon initiation of optical polymerization, material stability of the compound, etc. Examples thereof are the compounds mentioned in [0058] to [0059] of the specification of Japanese Patent Laid-Open No. 2000/029,162.

Amount of the photosensitive acid generator to 100 parts by mass of the hardening resin composition is preferably 0.01 to 20 part(s) by mass and, more preferably, 0.1 to 10 part(s) by mass.

With regard to specific compounds and method of use thereof besides the above, the description in, for example, Japanese Patent Laid-Open No. 2005/043,876 may be used.

The hardening composition for formation of the low refractive layer is preferred to contain (A) the aforementioned fluorine-containing polymer, (B) inorganic fine particles and (C) the organosilane compound which will be mentioned later.

<Inorganic Fine Particles for Low Refractive Layer>

Illustration will be now provided for inorganic fine particles which are able to be preferably used for the low refractive layer in the reflection preventing film of the present invention.

Applied amount of the inorganic fine particles is preferably 1 mg/m$^2$ to 100 mg/m$^2$, more preferably 5 mg/m$^2$ to 80 mm$^2$ and, still more preferably, 10 mg/m$^2$ to 60 mg/m$^2$. When the amount is too small, effect for improvement in resistance to scratch is reduced while, when it is too much, fine unevenness is formed on the surface of the low refractive layer and appearance such as firm blackness and integral reflective ratio are deteriorated.

Since the inorganic fine particles are contained in the low refractive layer, they are preferred to be in low refractive index and its examples are fine particles of magnesium fluoride, silica and hollow silica wherein fine particles of silica or hollow silica is preferred. An average particle size of the inorganic fine particles is preferably 30% to 150%, more preferably 30% to 100%, still more preferably 35% to 80% and, particularly preferably, 40% to 60% of the thickness of the low refractive layer. Thus, when thickness of the low refractive layer is 100 nm, particle size of the inorganic fine particles is preferably 30 nm to 150 nm, more preferably 30 nm to 100 nm, still more preferably 35 nm to 80 nm and, particularly preferably, 40 nm to 60 nm.

When the particle size of the inorganic fine particles is too small, effect for improvement in resistance to scratch is reduced while, when it is too large, fine unevenness is formed on the surface of the low refractive layer and the appearance such as firm blackness and integral reflective ratio is deteriorated. The inorganic fine particles may be either crystalline or amorphous and may be any of single-dispersed particles and aggregated particles provided that the particles satisfy the predetermined particle size. With regard to the shape, spherical form is preferred although there is no problem even in the case of amorphous form. Here, an average particle size of the inorganic fine particles is measured by a Coulter counter.

In order to lower the refractive index of the low refractive layer, it is preferred to use fine particles of hollow silica. Refractive index of the fine particles of hollow silica is preferably 1.17 to 1.40, more preferably 1.17 to 1.35 and, still more preferably, 1.17 to 1.30. The refractive index used here is a refractive index of the particle as a whole and does not mean a refractive index of the silica which is the outer shell forming the hollow silica particles. When diameter of the spore in the particle is a and diameter of outer shell of the particle is b in that case, the void fraction x is calculated by the following formula (I).

$$x=(4\pi a^3/3)/(4\pi b^3/3)\times 100 \qquad \text{(Formula I)}$$

The void fraction x is preferably 10 to 60%, more preferably 20 to 60% and, most preferably, 30 to 60%. When refractive index and void fraction of the hollow silica particles are to make lower and bigger, respectively, thickness of the outer shell becomes thin and strength of the particle becomes weak whereby, in view of resistance to scratch, particles having refractive index of as low as 1.17 or less are not acceptable.

Refractive index of the hollow silica particles as such was measured by an Abbe's refractometer (manufactured by Atago).

Method for the manufacture of hollow silica is mentioned, for example, in Japanese Patent Laid-Open Nos. 2001/233, 611 and 2002/079,616. Particles having hollow inside of the shell and pore of the shell is closed are particularly preferred. Refractive index of hollow silica particles as such is able to be calculated by a method mentioned in Japanese Patent Laid-Open No. 2002/079,616.

Refractive index of the layer when hollow particle is used is preferably 1.20 to 1.46, more preferably 1.25 to 1.41 and, most preferably, 1.30 to 1.39.

It is preferred that at least one kind of inorganic fine particles where an average particles size is less than 25% of the thickness of the low refractive layer (called "inorganic fine particles in small-sized particle size") is used together with the inorganic fine particles having the aforementioned particle size (called "inorganic fine particles in large-sized particle size").

The inorganic fine particles having a small particle size is able to be present in the voids among the inorganic fine particles in large-sized particle size and, therefore, they are able to contribute as a retaining agent for the inorganic fine particles in large-sized particle size.

When the low refractive layer is 100 nm, an average particle size of the inorganic fine particles in a small particle size is preferably 1 nm to 20 nm, more preferably 5 nm to 15 nm and, particularly preferably, 10 nm to 15 nm. The use of such inorganic fine particles is preferred in view of cost of the materials and effect of the retaining agent.

As mentioned above, with regard to the aforementioned inorganic fine particles, those comprising a hollow structure where the average particle size is 30 to 100% of the thickness of the low refractive layer as mentioned above and the refractive index is 1.17 to 1.40 as mentioned above are particularly preferably used.

The inorganic fine particles may be subjected to a physical surface treatment such as a plasma discharge treatment or a corona discharge treatment or to a chemical surface treatment with, for example, surfactant or coupling agent in order to achieve a dispersion stability or to enhance affinity and binding property to binder components in a dispersion or in an applied liquid. Among the above, the use of a coupling agent is particularly preferred. With regard to the coupling agent, alkoxymetal compounds (such as titanium coupling agent and silane coupling agent) are preferably used. Among them, treatment with a silane coupling agent is particularly effective.

Although the aforementioned coupling agent is used for previously conducting a surface treatment before preparation of the applying liquid for the layer as a surface treating agent of the inorganic fine particles of the low refractive layer, it is preferred that the agent is further added as an additive when the applying liquid for the layer is prepared so as to contain in the layer.

It is preferred in view of reduction of load of the surface treatment that the inorganic fine particles are previously dispersed in a medium before the surface treatment.

Now, an illustration will be done for (C) organosilane compound.

<Organosilane Compound for Low Refractive Layer>

It is preferred in view of resistance to scratch and particularly in view of the fact that both reflection preventing ability and resistance to scratch are available that a hydrolysate of the organosilane compound and/or a partial condensate thereof (hereinafter, the resulting reaction solution may be called "sol component") are/is contained in the aforementioned hardening composition.

The sol component functions as a binder for the low refractive layer when the aforementioned hardening composition is applied, dried and condensed during a heating step to form a hardened product. In addition, since there is the aforementioned fluorine-containing polymer in the present invention, a binder having a three dimensional structure is formed by irradiation of active ray.

With regard to the aforementioned organosilane compound, that which is represented by the following formula [A] is preferred.

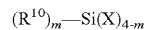

$(R^{10})_m\text{—Si}(X)_{4-m}$  Formula [A]

In the formula [A], $R^{10}$ is a substituted or unsubstituted alkyl group or a substituted or unsubstituted aryl group. Examples of the alkyl group are methyl, ethyl, propyl, isopropyl, hexyl, decyl and hexadecyl. With regard to the alkyl group, preferred one is that having 1 to 30 carbon(s), more preferred one is that having 1 to 16 carbon(s) and particularly preferred one is that having 1 to 6 carbon(s). Examples of the aryl group are phenyl and naphthyl and THE preferred one is phenyl group.

X is hydroxyl group or a hydrolysable group and its examples are preferably an alkoxy group (in which an alkoxy group having 1 to 5 carbon(s) such as methoxy group and ethoxy group is preferred), halogen atom (such as Cl, Br and I) and $R^2$COO (preferably, $R^2$ is hydrogen atom or an alkyl group having 1 to 5 carbon(s); thus, its examples are $CH_3COO$ and $C_2H_5COO$). Preferred one is an alkoxy group and particularly preferred one is methoxy group or ethoxy group.

m is an integer of 1 to 3, preferably 1 or 2 and, particularly preferably, 1.

When there are plural $R^{10}$ or X, each $R^{10}$ or each X as such may be same or different.

There is no particular limitation for a substituent contained in $R^{10}$ and its examples are halogen atom (such as fluorine, chlorine and bromine), hydroxyl group, mercapto group, carboxyl group, epoxy group, an alkyl group (such as methyl, ethyl, isopropyl, propyl and tert-butyl), an aryl group (such as phenyl and naphthyl), an aromatic heterocyclic group (such as furyl, pyrazolyl and pyridyl), an alkoxy group (such as methoxy, ethoxy, isopropoxy and hexyloxy), an aryloxy group (such as phenoxy), an alkylthio group (such as methylthio and ethylthio), an arylthio group (such as phenylthio), an alkenyl group (such as vinyl and 1-propenyl), an acyloxy group (such as acetoxy, acryloyloxy and methacryloyloxy), an alkoxycarbonyl (such as methoxycarbonyl and ethoxycarbonyl), an aryloxycarbonyl (such as phenoxycarbonyl), a carbamoyl group (such as carbamoyl, N-methylcarbamoyl, N,N-dimethylcarbamoyl and N-methyl-N-octylcarbamoyl) and an acylamino group (such as acetylamino, benzoylamino, acrylamino and methacrylamino) and the substituent as such may be further substituted.

When there are plural $R^{10}$, it is preferred that at least one of them is a substituted alkyl group or a substituted aryl group.

Among the organosilane compound represented by the aforementioned formula [A], an organosilane compound having a vinyl polymerizable substituent represented by the formula [B] is particularly preferred.

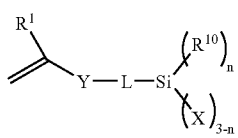

Formula [B]

In the formula [B], $R^1$ is hydrogen atom, methyl group, methoxy group, an alkoxycarbonyl group, cyano group, fluorine atom or chlorine atom. Examples of the alkoxycarbonyl group are methoxycarbonyl group and ethoxycarbonyl group. Preferred ones are hydrogen atom, methyl group, methoxy group, methoxycarbonyl group, cyano group, fluorine atom and chlorine atom; more preferred ones are hydrogen atom, methyl group, methoxycarbonyl group, fluorine atom and chlorine atom; and particularly preferred ones are hydrogen atom and methyl group.

Y is a single bond, *—COO—**, *—CONH—** or *—O—**. Preferred ones are single bond, *—COO—** and *—CONH—**; more preferred ones are single bond and *—COO—**; and particularly preferred one is *—COO—**. * shows a position bonding to =C($R^1$)— and ** shows a position bonding to L.

L is a divalent connecting chain. To be more specific, examples thereof are a substituted or unsubstituted alkylene group, a substituted or unsubstituted arylene group, a substituted or unsubstituted alkylene group having a connecting group inside (such as ether, ester or amide) and a substituted or unsubstituted arylene group having a connecting group inside; preferred ones are a substituted or unsubstituted alkylene group, a substituted or unsubstituted arylene group and an alkylene group having a connecting group inside; more preferred ones are an unsubstituted alkylene group, an unsubstituted arylene group and an alkylene group having ether or ester connecting group inside; and particularly preferred ones are an unsubstituted alkylene group and an alkylene group having ether or ester connecting group inside. Examples of the substituent are halogen, hydroxyl group, mercapto group, carboxyl group, epoxy group, an alkyl group and an aryl group and the substituent as such may be further substituted.

n is 0 or 1. When there are plural X, the plural X may be same or different. Preferred n is 0.

$R^{10}$ is the same as that in the formula [A]. Preferred ones are a substituted or unsubstituted alkyl group and an unsubstituted aryl group and more preferred ones are an unsubstituted alkyl group and an unsubstituted aryl group.

X is the same as that in the formula [A]. Preferred ones are halogen atom, hydroxyl group and an unsubstituted alkoxy group; more preferred ones are chorine atom, hydroxyl group and an unsubstituted alkoxy group having 1 to 6 carbon(s); still more preferred ones is an alkoxy group having 1 to 3 carbon(s); and particularly preferred one is methoxy group.

With regard to the compounds of the formula [A] and the formula [B], two kinds thereof may be used jointly. As hereunder, specific examples of the compound represented by the formula [A] and the formula [B] are listed although they are non-limitative.

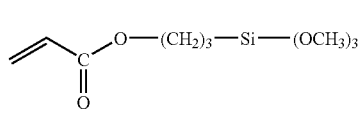

M-1

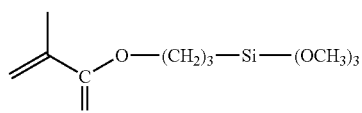

M-2

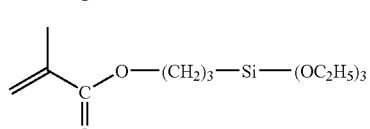

M-3

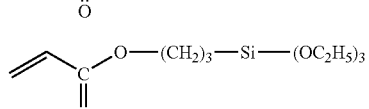

M-4

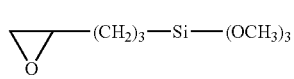

M-5

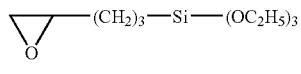

M-6

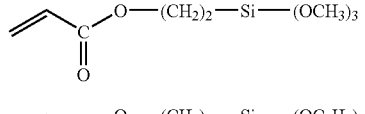

M-7

M-8

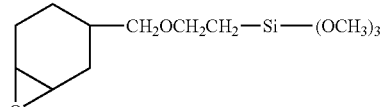

M-9

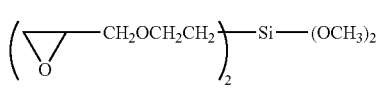

M-10

In the above compounds, (M-1), (M-2) and (M-5) are particularly preferred.

The aforementioned hydrolysate and/or partial condensate of the organosilane compound are/is usually produced by treating the aforementioned organosilane compound in the presence of a catalyst. Examples of the catalyst are inorganic acids such as hydrochloric acid, sulfuric acid and nitric acid; organic acids such as oxalic acid, acetic acid, formic acid, methanesulfonic acid and toluenesulfonic acid; inorganic bases such as triethylamine and pyridine; metal alkoxides such as triisopropoxy aluminum and tetrabutoxy zirconium; and metal chelate compounds where metal such as Zr, Ti or A is a center atom. In the present invention, it is preferred to use metal chelate compounds and acid catalysts such as inorganic acids and organic acids. In the inorganic acids, hydrochloric acid and sulfuric acid are preferred while, in the organic acids, those where acid dissociation constant in water (pKa value (25° C.)) is not more than 4.5 are preferred. More preferred ones are hydrochloric acid, sulfuric acid and organic acids where acid dissociation constant in water is not more than 3.0; particularly preferred ones are hydrochloric acid, sulfuric acid and organic acids where acid dissociation constant in water is not more than 2.5; and still more preferred ones are organic acids where dissociation constant in water is not more than 2.5. To be more specific, methanesulfonic acid, oxalic acid, phthalic acid and malonic acid are further preferred and oxalic acid is particularly preferred.

With regard to the metal chelate compound, anything may be advantageously used without particular limitation so far as it is a compound where an alcohol represented by the formula $R^3OH$ (in the formula, $R^3$ is an alkyl group having 1 to 10 carbon(s)) and a compound represented by the formula $R^4COCH_2COR^5$ (in the formula, $R^4$ is an alkyl group having 1 to 10 carbon(s) and $R^5$ is an alkyl group having 1 to 10 carbon(s) or an alkoxy group having 1 to 10 carbon(s)) are ligands and metal selected from Zr, Ti and Al is a center atom. Within such a category, two or more metal chelate compounds may be used together. With regard to the metal chelate compound used in the present invention, that which is selected from the compound group represented by $Zr(OR^3)_{p1}(R^4COCHCOR^5)_{p2}$, $Ti(OR^3)_{q1}(R^4COCHCOR^5)_{q2}$ and $Al(OR^3)_{r1}(R^4COCHCOR^5)_{r2}$ is preferred and it has an action of promoting the condensation of the aforementioned hydrolysate and/or partial condensate of the organosilane compound.

$R^3$ and $R^4$ in the metal chelate compound are same or different and each is an alkyl group having 1 to 10 carbon(s) and, to be more specific, ethyl group, n-propyl group, isopropyl group, n-butyl group, sec-butyl group, tert-butyl group, n-pentyl group, phenyl group, etc. $R^5$ is an alkyl group having 1 to 10 carbon(s) the same as above and, in addition, it is an alkoxy group having 1 to 10 carbon(s) such as methoxy group, ethoxy group, n-propoxy group, isopropoxy group, n-butoxy group, sec-butoxy group and tert-butoxy group. p1, p2, q1, q2, r1 and r2 each in the metal chelate compound is an integer which is determined so as to make p1+p2=4, q1+q2=4 and r1+r2=3.

Specific examples of such a metal chelate compound are zirconium chelate compounds such as tri-n-butoxyethyl acetoacetate zirconium, di-n-butoxybis(ethyl acetoacetate) zirconium, n-butoxytris(ethyl acetoacetate) zirconium, tetrakis(n-propyl acetoacetate) zirconium, tetrakis(acetyl acetoacetate) zirconium and tetrakis(ethyl acetoacetate) zirconium; titanium chelate compounds such as diisopropoxy bis(ethyl acetoacetate) titanium, diisopropoxy bis(acetyl acetate) titanium and diisopropoxy bis(acetylacetone) titanium; and aluminum chelate compounds such as diisopropoxy ethyl acetoacetate aluminum, diisopropoxy acetyl acetonate aluminum, isopropoxybis(ethyl acetoacetate) aluminum, isopropoxybis(acetyl acetonate) aluminum, tris (ethyl acetoacetate) aluminum, tris(acetyl acetonate) aluminum and monoacetyl acetonate bis(ethyl acetoacetate) aluminum.

Preferred ones among those metal chelate compounds are tri-n-butoxyethyl acetoacetate zirconium, diisopropoxybis (acetyl acetonate) titanium, diisopropoxyethyl acetoacetate aluminum and tris(ethyl acetoacetate) aluminum. Each of those metal chelate compounds may be used solely or two or more kinds thereof may be mixed and used. It is also possible to use a partial hydrolysate of such a metal chelate compound.

It is also preferred in the present invention that a β-diketone compound and/or a β-keto ester compound are/is further added to the aforementioned hardening composition. That will be further illustrated as hereunder.

The compound which is used in the present invention is a β-diketone compound and/or a β-keto ester compound represented by the formula $R^4COCH_2COR^5$ acting as a stabilization enhancer for the hardening composition used in the present invention. Here, $R^4$ is an alkyl group having 1 to 10 carbon(s) and $R^5$ is an alkyl group having 1 to 10 carbon(s) or an alkoxy group having 1 to 10 carbon(s). Thus it is likely that, when it is coordinated to the aforementioned metal chelate compound (zirconium, titanium and/or aluminum compound(s)), it suppresses a promoting action for condensation reaction of hydrolysate and/or partial condensate of the organosilane compound by such a metal chelate compound and enhances the stability upon preservation of the resulting composition. $R^4$ and $R^5$ which constitute the β-diketone compound and/or the β-keto ester compound are the same as $R^4$ and $R^5$ which constitute the aforementioned metal chelate compound.

Specific examples of the β-diketone compound and/or the β-keto ester compound as such are acetylacetone, methyl acetoacetate, ethyl acetoacetate, n-propyl acetoacetate, isopropyl acetoacetate, n-butyl acetoacetate, sec-butyl acetoacetate, tert-butyl acetoacetate, 2,4-hexanedione, 2,4-heptanedione, 3,5-heptanedione, 2,4-octanedione, 2,4-nonanedione and 5-methylhexanedione. Among them, ethyl acetoacetate and acetylacetone are preferred and acetylacetone is particularly preferred. Each of the β-diketone compound and/or the β-keto ester compound as such may be used solely or two or more kinds thereof may be mixed and used. In the present invention, the β-diketone compound and/or the β-keto ester compound is used preferably in an amount of not less than 2 mol or, more preferably, in an amount of 3 to 20 mol to one mol of the metal chelate compound. When the amount is less than 2 mol, there is a possibility that stability of the resulting composition upon preservation is inferior and that is not preferred.

Compounding amount of the aforementioned organosilane compound is preferably 0.1 to 50% by mass, more preferably 0.5 to 20% by mass and, most preferably, 1 to 10% by mass in the total solid of the low refractive layer.

Although the aforementioned organosilane compound may be directly added to the hardening composition (applying liquid for an antiglare layer and a low refractive layer), it is preferred that the aforementioned organosilane compound is previously treated in the presence of a catalyst to prepare the hydrolysate and/or partial condensate of the aforementioned organosilane compound and then the aforementioned composition is prepared using the resulting reaction solution (sol liquid) and, in the present invention, it is preferred that, firstly, a composition containing the hydrolysate and/or partial condensate of the aforementioned organosilane compound and the metal chelate compound is prepared, then the β-diketone compound and/or the β-ketoester compound are/is added thereto and the resulting liquid is made to contain in an applying liquid for at least one layer of the antiglare layer and the low refractive layer and is applied.

Amount used of the sol component of the organosilane to the fluorine-containing polymer in the low refractive layer is preferably 5 to 100% by mass, more preferably 5 to 40% by mass, still more preferably 8 to 35% by mass and, particularly preferably, 10 to 30% by mass. When the amount used is too small, advantages of the present invention are hardly achieved while, when it is too much, refractive index increases or shape and surface of the membrane become bad whereby that is not preferred.

In the present invention, it is preferred in view of enhancement of membrane strength that hydrolysate of organosilane and/or partial condensate thereof (sol) are/is added. Preferred adding amount of the sol to the inorganic oxide particles is preferably 2 to 200% by mass, more preferably 5 to 100% by mass and, most preferably, 10 to 50% by mass.

It is also possible that inorganic fine particles other than the aforementioned inorganic fine particles are added to the aforementioned hardening composition within such an adding amount that such an addition does not deteriorate the desired advantages of the present invention. Details of the inorganic fine particles will be mentioned later.

(Other Substances Contained in the Hardening Composition for the Low Refractive Layer)

The aforementioned hardening composition is prepared in such a manner that, to the aforementioned (A) fluorine-containing polymer, (B) inorganic fine particles and (C) an organosilane compound are added, if necessary, various kinds of additives and a radical polymerization initiator and a cationic polymerization initiator which will be mentioned later followed by dissolving in an appropriate solvent. In that case, concentration of the solid is appropriately selected depending upon the use and, usually, it is about 0.01 to 60% by mass, preferably about 0.5 to 50% by mass and, particularly preferably, about 1 to 20% by mass.

In view of close adhesion at the interface to the lower layer which directly contacts the low refractive layer, it is also possible to add a few amounts of a hardener such as a multifunctional (meth)acrylate compound, a multifunctional epoxy compound, an aminoplast, a multibasic acid or an anhydrate thereof. When it is added, it is preferably within a range of not more than 30% by mass, more preferably not more than 20% by mass and, particularly preferably, not more than 10% by mass to the total solid of the low refractive layer coat.

In the present invention, it is preferred in view of enhancement of stain-preventing property that surface free energy of the reflection preventing membrane is lowered. To be more specific, it is preferred to use a fluorine-containing compound or a silicone-type compound having a polysiloxane structure in the low refractive layer.

It is also possible to appropriately add known stain-preventing agent, slipping agent or the like which is a silicone-type compound or a fluorine-type compound thereto for an object of providing characteristics such as stain-preventing property, resistance to water, resistance to chemicals and slipping property. When such an additive is added, it is preferably added within a range of 0.01 to 20% by mass, more preferably within a range of 0.05 to 10% by mass and, particularly preferably, within a range of 0.1 to 5% by mass to the total solid of the low refractive layer.

Preferred examples of the silicone-type compound are those which have substituent(s) at the terminal of a compound chain containing plural dimethylsilyloxy units as a repeating unit and/or the side chain thereof. A compound chain containing dimethylsilyloxy as a repeating unit may also contain a structure unit which is other than dimethylsilyloxy. The substituents may be same or different and it is preferred that there are plural substituents. Examples of the preferred substituent are acryloyl group, methacryloyl group, vinyl group, an aryl group, cinnamoyl group, epoxy group, oxetanyl group, hydroxyl group, a fluoroalkyl group, a polyoxyalkylene group, carboxyl group and amino group. Although there is no particular limitation for its molecular weight, it is preferably not more than 100,000, particularly preferably not more than 50,000 and, particularly preferably, 3,000 to 30,000. Although there is no particular limitation for the amount of silicon atom contained therein, it is preferably not less than 18.0% by mass, particularly preferably 25.0 to 37.8% by mass and, most preferably, 30.0 to 37.0% by mass.

Examples of the preferred silicone-type compound are X-22-174DX, X-22-2426, X-22-164B, X-22-164C, X-22-170DX, X-22-176D and X-22-1821 (all are trade names) manufactured by Shinetsu Chemical, FM-0725, FM-7725, FM-4421, FM-5521, FM6621 and FM-1121 manufactured by Chisso and DMS-U22, RMS-033, RMS-083, UMS-182, DMS-H21, DMS-H31, HMS-301, FMS121, FMS123, FMS131, FMS141 and FMS221 (trade names) manufactured by Gelest although they are non-limitative. The silicone-type compounds mentioned in Tables 2 and 3 of Japanese Patent Laid-Open No. 2003/112,383 are preferably used as well. Those polysiloxanes are preferably added within a range of 0.1 to 10% by mass to the total solid of the low refractive layer and, particularly preferably, 1 to 5% by mass.

With regard to the fluorine-type compounds, those having a fluoroalkyl group are preferred. Preferably, the fluoroalkyl group has 1 to 20 carbon(s) and, more preferably, 1 to 10. It may be either a linear chain (such as —$CF_2CF_3$, —$CH_2(CF_2)_4H$, —$CH_2(CF_2)_8CF_3$ and —$CH_2CH_2(CF_2)_4H$), a branched structure (such as —$CH(CF_3)_2$, —$CH_2CF(CF_3)_2$, —$CH(CH_3)CF_2CF_3$ and —$CH(CH_3)(CF_2)_5CF_2H$) or an alicyclic structure (preferably, five- or six-membered ring such as perfluorocyclohexyl group, perfluorocyclopentyl group or an alkyl group substituted therewith) or it may have an ether bond (such as —$CH_2OCH_2CF_2CF_3$, —$CH_2CH_2OCH_2C_4F_8H$, —$CH_2CH_2OCH_2CH_2C_8F_{17}$ and —$CH_2CH_2OCF_2CF_2OCF_2CF_2H$). Plural fluoroalkyl groups may be contained in the same molecule.

It is preferred that the fluorine-type compound further has a substituent which contributes in formation of bond with the low refractive layer coat or in compatibility. The substituent may be same or different and it is preferred that there are plural substituents. Examples of the preferred substituent are acryloyl group, methacryloyl group, vinyl group, an aryl group, cinnamoyl group, epoxy group, oxetanyl group, hydroxyl group, polyoxyalkylene group, carboxyl group and amino group. The fluorine-type compound may be a polymer or an oligomer with a compound containing no fluorine atom. Although there is no particular limitation for the amount of the fluorine atom in the fluorine-type compound, it is preferably not less than 20% by mass, particularly preferably 30 to 70% by mass and, most preferably, 40 to 70% by mass. Examples of the preferred fluorine-type compound are R-2020, M-2020, R-3833 and M-3833 (trade names) manufactured by Daikin Kagaku and Megafac F-171, F-172, F-179 and Defensor MCF-300 (trade names) manufactured by Dainippon Ink & Chemicals) although they are non-limitative.

It is also possible for a purpose of providing characteristics such as dust-preventing property and antistatic property that a dust-preventing agent, an antistatic agent, etc. such as known cationic surfactant or polyoxyalkylene compound are appropriately added. Structure unit of the dust-preventing agent and antistatic agent as such may be contained in the aforementioned silicone-type compound or fluorine-type compound as a part of the function. When that is added as an additive, it is preferably contained within a range of 0.01 to 20% by mass, more preferably within a range of 0.05 to 10% by mass and, particularly preferably, within a range of 0.1 to 5% by mass of the total solid of the low refractive layer. Examples of the preferred compound are Megafax F-150 (trade name) manufactured by Dainippon Ink & Chemicals and SH-3748 (trade name) manufactured by Toray Dow Corning although they are non-limitative.

<Solvent for Low Refractive Layer>

With regard to a solvent used for an applying composition for formation of a low refractive layer according to the present invention, various kinds of solvents which are selected from the viewpoints that they are able to dissolve or disperse each component, they easily form a uniform surface in applying an drying steps, they are able to ensure the preserving ability of the liquid, they have an appropriate saturated vapor pressure, etc. may be used. From the viewpoint of drying load, it is preferred to mainly comprise a solvent where boiling point at room temperature under ordinary pressure is not higher than 100° C. and to contain small amount of solvent where boiling point is not lower than 100° C. for adjustment of the drying speed.

Examples of the solvent where boiling point is not higher than 100° C. are hydrocarbons such as hexane (boiling point: 68.7° C.), heptane (98.4° C.), cyclohexane (80.7° C.) and benzene (80.1° C.); halogenated hydrocarbons such as dichloromethane (68.7° C.), chloroform (61.2° C.), carbon tetrachloride (76.8° C.), 1,2-dichloroethane (83.5° C.) and trichloroethylene (87.2° C.); ethers such as diethyl ether (34.6° C.), diisopropyl ether (68.5° C.), dipropyl ether (90.5° C.) and tetrahydrofuran (66° C.); esters such as ethyl formate (54.2° C.), methyl acetate (57.8° C.), ethyl acetate (77.1° C.) and isopropyl acetate (89° C.); ketones such as acetone (56.1° C.) and 2-butanone (same as methyl ethyl ketone; 79.6° C.); alcohols such as methanol (64.5° C.), ethanol (78.3° C.), 2-propanol (82.4° C.) and 1-propanol (97.2° C.); cyano compounds such as acetonitrile (81.6° C.); and carbon disulfide (46.2° C.). Among them, ketones and esters are preferred and ketones are particularly preferred. Among the ketones, 2-butanone is particularly preferred.

Examples of the solvent where boiling point is not lower than 100° C. are octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (same as MIBK; 115.9° C.), 1-butanol (117.7° C.), N,N-dimethylformamide (153° C.), N,N-dimethylacetamide (166° C.) and dimethyl sulfoxide (189° C.). Preferred ones are cyclohexanone and 2-methyl-4-pentanone.

Polymerization of the aforementioned fluorine-containing polymer and/or polysiloxane-containing vinyl monomer is able to be carried out by irradiation of ionizing radiation or by heating in the presence of the aforementioned active halogen compound or other optical radical initiator or thermal radical initiator.

Therefore, a low refractive layer is able to be formed when an applying liquid containing the aforementioned fluorine-containing polymer and/or polysiloxane-containing monomer, the aforementioned active halogen compound, optical radical initiator or thermal radical initiator and inorganic fine particles is prepared, applied onto a support and hardened by ionizing radiation or by heating.

A low refractive layer by a sol-gel method (embodiment 2) will be illustrated.

With regard to a material for the low refractive layer, various kinds of sol-gel materials may be used. As to the sol-gel material as such, metal alcoholates (alcoholates of silane, titanium, aluminum, zirconium, etc.), organoalkoxy metal compounds and hydrolysates thereof may be used. Alkoxysilane, organoalkoxysilane and hydrolysate thereof are particularly preferred. Examples thereof are tetraalkoxysilanes (such as tetramethoxysilane and tetraethoxysilane), alkyl trialkoxysilanes (such as methyl trimethoxysilane and ethyl trimethoxysilane), aryl trialkoxysilanes (such as phenyl trimethoxysilane), dialkyl dialkoxysilanes and diaryl dialkoxysilane. It is also preferred to use organoalkoxysilanes having various kinds of functional groups (such as vinyl trialkoxysilane, methyl vinyl dialkoxysilane, γ-glycidyloxypropyl trialkoxysilane, γ-glycidyloxypropyl methyl dialkoxysilane, β-(3,4-epoxydicyclohexyl)ethyl trialkoxysilane, γ-methacryloyloxypropyl trialkoxysilane, γ-aminopropyl trialkoxysilane, γ-mercaptopropyl trialkoxysilane and γ-chloropropyl trialkoxysilane) and perfluoroalkyl-containing silane compound (such as (heptadecafluoro-1,1,2,2-tetradecyl)triethoxysilane and 3,3,3-trifluoropropyl trimethoxysilane). Use of fluorine-containing silane is particularly preferred in view of making the layer lowly refractive and in providing water-repelling and oil-repelling property.

It is also preferred as a low refractive layer to use a layer in which inorganic or organic fine particles are used for forming as microvoids among or in the fine particles. An average particle size of the fine particles are preferably 0.5 to 200 nm, more preferably within a range of 1 to 100 nm, still more preferably 3 to 70 nm and, most preferably, 5 to 40 nm. It is preferred that particle size of the fine particles is uniform (mono-dispersed) if at all possible.

With regard to the inorganic fine particles, they are preferred to be amorphous. The inorganic fine particles comprise preferably metal oxide, nitride, sulfide or halide, more preferably metal oxide or metal halide and, most preferably, metal oxide or metal fluoride. With regard to the metal atom, it is preferably Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb or Ni and, more preferably, Mg, Ca, B or Si. An inorganic compound containing two kinds of metals may be used as well. Particularly preferred inorganic compound is silicon dioxide or silica.

Microvoids in the inorganic fine particles are able to be formed, for example, by cross-linking of a silica molecule forming the particles. When a silica molecule is cross-linked, its volume decreases and the particles become porous. Inorganic fine particles having microvoids (porous) are able to be directly synthesized as a dispersion by a sol-gel method (refer to each of Japanese Patent Laid-Open No. 53/112,732 and Japanese Patent Publication No. 57/009,051) or a separation method (mentioned in *Applied Optics*, 27, page 3356 (1988)).

It is also possible that powder prepared by a drying-precipitating method is mechanically pulverized. Commercially available porous inorganic fine particles (such as silicon dioxide sol) may be used as well. It is preferred for the formation of a low refractive layer that inorganic fine particles having microvoids are used in a state of being dispersed in an appropriate medium. With regard to the dispersing medium, the preferred ones are water, alcohol (such as methanol, ethanol and isopropyl alcohol) and ketone (such as methyl ethyl ketone and methyl isobutyl ketone).

It is preferred that the organic fine particles are also amorphous. It is preferred that the organic fine particles are polymer fine particles synthesized by a polymerization reaction (such as emulsion polymerization reaction) of a monomer. Polymer of the organic fine particles are preferred to contain fluorine atom. Ratio of the fluorine atom in the polymer is preferably 35 to 80% by weight and, more preferably, 45 to 75% by weight. It is also preferred that a polymer which forms particles is cross-linked in the organic fine particles and volume is reduced so that microvoids are formed. In order to cross-linking the polymer which forms the particles, it is preferred that a multifunctional monomer is not less than 20 molar % of the monomer for formation of polymer. Rate of the multifunctional monomer is more preferably 30 to 80 molar % and, most preferably, 35 to 50 molar %. With regard to a monomer used for the synthesis of the aforementioned organic fine particles, examples of the fluorine-containing monomer used for the synthesis of the fluorine-containing polymer are fluoroolefins (such as fluoroethylene, vinylidene fluoride, tetrafluoroethylene, hexafluoropropylene and perfluoro-2,2-dimethyl-1,3 dioxole), fluorinated alkyl acrylates or methacrylates and fluorinated vinyl ethers. It is also possible to use a copolymer of a monomer containing fluorine atom with a monomer containing no fluorine atom. Examples of the monomer containing no fluorine atom are olefins (such as ethylene, propylene, isoprene, vinyl chloride and vinylene chloride), acrylates (such as methyl acrylate, ethyl acrylate and 2-ethylhexyl acrylate), methacrylates (such as methyl methacrylate, ethyl methacrylate and butyl methacrylate), styrenes (such as styrene, vinyltoluene and α-methylstyrene), vinyl ethers (such as methyl vinyl ether), vinyl esters (such as vinyl acetate and vinyl propionate), acrylamides (such as N-tert-butylacrylamide and N-cyclohexylacrylamide), methacrylamides and acrylnitriles. Examples of the multifunctional monomer are dienes (such as butadiene and pentadiene), esters of polyhydric alcohol with acrylic acid (such as ethylene glycol diacrylate, 1,4-cyclohexane diacrylate and dipentaerythritol hexaacrylate), esters of polyhydric alcohol with methacrylic acid (such as ethylene glycol dimethacrylate, 1,2,4-cyclohexane tetramethacrylate and pentaerythritol tetramethacrylate), divinyl compounds (such as divinylcyclohexane and 1,4-divinylbenzene), divinylsulfones, bisacrylamides (such as methylenebisacrylamide) and bismethacrlamides.

The microvoids between the particles are able to be formed by stacking at least two fine particles. If (fully-monodispersed) spherical fine particles having the same dismeter are closest packed, the microvoids between the inorganic fine particles having a void ratio of 26% by volume are formed. If the spherical fine particles having the same dismeter are simple cubic packed, the microvoids between the inorganic fine particles having a void ratio of 48% by volume are formed. In the real lowly refractive layer, the void ratio fairly varies from the theoretical value because of the presence of the particle size distribution of the fine particles and the presence microvoids in fine particles. If the void ratio is increased, the refraction index of the lowly referative layer is decreased. It is possible to easily control a size of the microvoids between the particles to a suitable value (in which light is not scattered, and the problem as for the strength of the lowly referative layer does not occur) by stacking the fine particles to form the microvoids and controlling the diameter of the fine particles. Further, it is possible to obtain an optically-heterogeneous lowly referative layer in which the microvoids between the particles have a uniform size by uniforming the diameters of the fine particles. Thus, the lowly referative layer can be a microvoids-including porous membrane microscopically and be a uniform membrane optically or macroscopically. Each of the microboids between the particles is preferably closed by the fine particles and polymers in the lowly refractive layer. It is advantageous that light scattering on the surface of the lowly refractive layer with the closed microvoids is lower than that on a surface of a lowly refractive layer having microvoids which is opened to the surface.

As a result of formation of microvoids, macroscopic refractive index of the low refractive layer is in a lower value than the sum of the refractive indexes of the components constituting the low refractive layer. Refractive index of the layer is the sum of the refractive indexes per volume of the constituting elements of the layer. Refractive index of constituting element of the low refractive layer such as fine particles and polymer is more than 1 while refractive index of air is 1.00. Accordingly, as a result of formation of microvoids, it is possible to prepare a low refractive layer in which refractive index is very low.

It is preferred that a low refractive layer contains 5 to 50% by weight of a polymer. The polymer has a function that fine particles are adhered to maintain the structure of the low refractive layer containing voids. Amount of the polymer used is adjusted in such a manner that strength of the low refractive layer is maintained without filling the voids. It is preferred that the amount of the polymer is 10 to 30% by weight of the total amount of the low refractive layer. In order to adhere the fine particles by a polymer, it is preferred that (1) polymer is bonded to a surface treating agent for the fine particles, (2) fine particles are used as a core and a polymer shell is formed therearound or (3) polymer is used as a binder among the fine particles. The polymer which is bonded to the surface treating agent in (1) is preferred to be same as the shell polymer of (2) or the binder polymer of (3). It is preferred that the polymer of (2) is formed by a polymerization reaction around the fine particles before preparation of the applying liquid for the low refractive layer. It is preferred that the polymer of (3) is formed in such a manner that a monomer is added to an applying liquid for the low refractive layer and the polymer is formed by polymerization reaction together with the application of the low refractive layer or after that. It is preferred that two of all of the aforementioned (1) to (3) are carried out together and it is particularly preferred to carry out that by a combination of (1) with (3) or by a combination of all of (1) to (3). (1) Surface treatment, (2) shell and (3) binder will be successively illustrated.

(1) Surface Treatment

It is preferred that the fine particles (particularly, inorganic fine particles) are subjected to a surface treatment to improve their affinity to the polymer. The surface treatment is able to be classified into a physical surface treatment such as plasma discharge treatment and corona discharge treatment and a chemical surface treatment using a coupling agent. It is preferred to conduct the chemical treatment only or to conduct in a combination of the physical surface treatment with the chemical surface treatment. With regard to a coupling agent, organoalkoxy metal compounds (such as titanium coupling agent and silane coupling agent) are preferably used. When the fine particles comprise silicon dioxide, a surface treatment using a silane coupling agent is able to be carried out particularly effectively. Specific examples of the silane coupling agent are methyl trimethoxysilane, methyl triethoxysilane, methyl trimethoxyethoxysilane, methyl triacetoxysilane, methyl tributoxysilane, ethyl trimethoxysilane, ethyl triethoxysilane, vinyl trimethoxysilane, vinyl triethoxysilane, vinyl triacetoxysilane, vinyl trimethoxyethoxysilane, phenyl trimethoxysilane, phenyl triethoxysilane, phenyl triacetoxysilane, γ-chloropropyl trimethoxysilane, γ-chloropropyl triethoxysilane, γ-chloropropyl triacetoxysilane, 3,3,3-trifluoropropyl trimethoxysilane, γ-glycidyloxypropyl trimethoxysilane, γ-glycidyloxypropyl triethoxysilane, γ-(β-glycidyloxyethoxy)propyl trimethoxysilane, β-(3,4-epoxycyclohexyl)ethyl trimethoxysilane, β-(3,4-epoxycyclohexyl) ethyl triethoxysilane, γ-acryloyloxypropyl trimethoxysilane, γ-methacryloyloxypropyl trimethoxysilane, γ-aminopropyl trimethoxysilane, γ-aminopropyl triethoxysilane, γ-mercaptopropyl trimethoxysilane, γ-mercaptopropyl triethoxysilane, N-β-(aminoethyl)-γ-aminopropyl trimethoxysilane and β-cyanoethyl triethoxysilane.

Examples of a silane coupling agent having di-substituted alkyl groups to silicon are dimethyl dimethoxysilane, phenyl methyl dimethoxysilane, dimethyl diethoxysilane, phenyl methyl diethoxysilane, γ-glycidyloxypropyl methyl diethoxysilane, γ-glycidyloxypropyl methyl dimethoxysilane, γ-glycidyloxypropyl phenyl diethoxysilane, γ-chloropropyl methyl diethoxysilane, dimethyl diacetoxysilane, γ-acryloyloxypropyl methyl dimethoxysilane, γ-acryloyloxypropyl methyl diethoxysilane, γ-methacryloyloxypropyl methyl diethoxysilane, γ-methacryloyloxypropyl methyl dimethoxysilane, γ-methacryloyloxypropyl methyl diethoxysilane, γ-mercaptopropyl methyl dimethoxysilane, γ-mercaptopropyl methyl diethoxysilane, γ-aminopropyl methyl dimethoxysilane, γ-aminopropyl methyl diethoxysilane, methyl vinyl dimethoxysilane and methyl vinyl diethoxysilane.

Among them, preferred ones are those having a double bond in a molecule such as vinyl trimethoxysilane, vinyl triacetoxysilane, vinyl trimethoxyethoxysilane, γ-acryloyloxypropyl trimethoxysilane and γ-methacryloyloxypropyl trimethoxysilane; and those having disubstituted alkyl groups to silicon such as γ-acryloyloxypropyl methyl dimethoxysilane, γ-acryloyloxypropyl methyl diethoxysilane, γ-methacryloyloxypropyl methyl dimethoxysilane, γ-methacryloyloxypropyl methyl diethoxysilane, methyl vinyl dimethoxysilane and methyl vinyl diethoxysilane. Particularly preferred ones are γ-acryloyloxypropyl trimethoxysilane, γ-methacryloyloxypropyl trimethoxysilane, γ-acryloyloxypropyl methyl dimethoxysilane, γ-acryloyloxypropylo methyl diethoxysilane, γ-methacryloyloxypropyl methyl dimethoxysilane and γ-methacryloyloxypropyl methyl diethoxysilane.

Two or more kinds of coupling agents may be used together. In addition to the aforementioned silane coupling agents, other silane coupling agent may be used as well. Examples of other coupling agent as such are alkyl esters of orthosilicic acid (such as methyl orthosilicate, ethyl orthosilicate, n-propyl orthosilicate, isopropyl orthosilicate, n-butyl orthosilicate, sec-butyl orthosilicate, and tert-butyl orthosilicate) and hydrolysates thereof. The surface treatment using a coupling agent is able to be carried out in such a manner that a coupling agent is added to a dispersion of fine particles and the dispersion is allowed to stand from several hours to ten days. In order to promote the surface treatment reaction, inorganic acids (such as sulfuric acid, hydrochloric acid, nitric acid, chromic acid, hypochlorous acid, boric acid, orthosilicic acid, phosphoric acid and carbonic acid), organic acids (such as acetic acid, polyacrylic acid, benzenesulfonic acid, phenol and polyglutamic acid) or salts thereof (such as metal salt and ammonium salt) may also be added to a dispersion.

(2) Shell

A polymer which forms shell is preferably a polymer having a saturated hydrocarbon as a main chain. A polymer containing a fluorine atom in a main chain or a side chain is preferable and a polymer containing a fluorine atom in a side chain is more preferable. An ester of polyacrylic acid or an ester of polymethacrylic acid is preferable. An ester of a fluorine-substituted alcohol and polyacrylic acid or polymethacrylic acid is most preferable. A refractive index of a shell polymer is decreased more, as the content of fluorine atom in the polymer is increased more. In order to decrease the refractive index of a low refractive index layer, the shell polymer contains a fluorine atom in the range of preferably from 35 to 80% by weight and, more preferably, from 45 to 75% by weight. The polymer containing a fluorine atom is preferably synthesized by a polymerization reaction of an ethylenic unsaturated monomer containing a fluorine atom. Examples of such ethylenic unsaturated monomers each containing a fluorine atom include fluoroolefins (for example, fluoroethylene, vinylidene fluoride, tetrafluoroethylene, hexafluoropropylene, and perfluoro-2,2-dimethyl-1,3-dioxol), fluorinated vinyl ether, and an ester of a fluorine-substituted alcohol and acrylic acid or methacrylic acid.

The polymer which forms shell may be a copolymer having a repeating unit containing a fluorine atom, and a repeating unit containing no fluorine atom. The repeating unit containing no fluorine atom is preferably obtained by polymerization reaction of the ethylenic unsaturated monomer containing no fluorine atom. Examples of such ethylenic unsaturated monomers each containing no fluorine atom include olefins (for example, ethylene, propylene, isoprene, vinyl chloride, and vinylidene chloride), acrylic esters (for example, methyl acrylate, ethyl acrylate, and 2-ethylhexyl acrylate), methacrylic esters (for example, methyl methacrylate, ethyl methacrylate, butyl methacrylate, and ethyleneglycol dimethacrylate), styrene and derivatives thereof (for example, styrene, divinyl benzene, vinyl toluene, and α-methylstyrene), vinyl ethers (for example, methyl vinyl ether), vinyl esters (for example, vinyl acetate, vinyl propionate, and vinyl cinnamate), acrylamides (for example, N-tert-butyl acrylamide, and N-cyclohexyl acrylamide), methacrylamides and acrylonitrile.

In a case in which a binder polymer in (3) to be described below is simultaneously used, a cross-linkable functional group is introduced into a shell polymer and, then, the shell polymer and the binder polymer may chemically be cross-linked with each other. The shell polymer may be crystalline. When a glass transition temperature (Tg) of the shell polymer is higher than a temperature at which the low refractive index layer is formed, it becomes easy to maintain microvoids within the low refractive index layer. However, when Tg is higher than the temperature at which the low refractive index layer is formed, fine particles are not fuse-bonded and, then, there is a case in which the low refractive index layer is not formed as a continuous layer (as a result, strength is reduced). In the case, it is desirable that the binder polymer in (3) to be described below is simultaneously used and, then, the low refractive index layer is formed as a continuous layer by using the binder polymer. A core/shell fine particle is obtained by forming the polymer shell around the fine particle. A core having an inorganic fine particle is contained in an amount of, preferably, from 5 to 90% by volume within the core/shell fine particle and, more preferably, from 15 to 80% by volume. Two types or more of core/shell fine particles may simultaneously be used. Further, inorganic fine particles containing no shell and a core/shell particle may simultaneously be used.

(3) Binder

A binder polymer is preferably a polymer having a saturated hydrocarbon or a polyether as a main chain. The binder polymer is more preferably a polymer having a saturated hydrocarbon as a main chain. The binder polymer is preferably cross-linked. The polymer having a saturated hydrocarbon as a main chain is preferably obtained by a polymerization reaction of an ethylenic unsaturated monomer. In order to obtain the binder polymer which is cross-linked, it is preferable to use a monomer having two or more ethlenically unsaturated groups. Examples of such monomers each having two or more ethylenic unsaturated groups include esters of polyhydric alcohols and (meth)acrylic acid such as ethylene glycol di(meth)acrylate, 1,4-dicyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate, and polyester polyacrylate; vinylbenzene and derivatives thereof such as 1,4-divinylbenzene, 2-acryloylethyl 4-vinybenzoate, and 1,4-divinylcyclohexanone; vinylsulfones such as divinylsulfone; acrylamides such as methylenebisacrylamide; and methacrylamides. Binder polymers each having a polyether as a main chain are preferably synthesized by a ring-opening polymerization reaction.

A cross-linked structure may be introduced into the binder polymer by a reaction of a cross-linkable group in place of, or in addition to, the monomer having two or more ethylenic unsaturated group. Examples of cross-linkable functional groups include an isocyanate group, an epoxy group, an aziridine group, an oxazoline group, an aldehyde group, a carbonyl group, a hydrazine group, a carboxyl group, a methylol group, and an active methylene group. Vinylsulfonic acids, acid anhydrides, cyanoacrylate derivatives, melamine, etherified methylol compounds, esters, and urethanes are also each useful as a monomer for introducing a cross-linked structure. A functional group which develops cross-linkability after decomposition, such as a blocked isocyanate group, is usable as well. That is, the cross-linkable groups according to the invention are not limited to those as described above and may be those which show reactivity as a result of decomposition of the above-described functional groups and, then, can be used for polymerization reaction and cross-linking reaction of the binder polymer.

A polymerization initiator can use a thermal polymerization initiator or a photopolymerization initiator. The photopolymerization initiator is preferred. Examples of photopolymerization initiators include acetophenones, benzoins, benzophenones, phosphine oxides, ketals, anthraquinones, thioxanthones, azo compounds, peroxides, 2,3-dialkyldione compounds, disulfide compounds, fluoroamine compounds, and aromatic sulphoniums. Examples of the acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophenone, and 2-benzyl-2-dimethylamino-1-(4-morpholinophenyl)-butanone. Examples of the benzoins include benzoin methyl ether, benzoin ethyl ether, and benzoin isopropyl ether. Examples of the benzophenones include benzophenone, 2,4-dichlorobenzophenone, 4,4-dichlorobenzophenone, and p-chlorobenzophenone. Examples of the phosphine oxides include 2,4,6-trimethylbenzoyl diphenylphospline oxide.

Further, active halogen compounds used in the hard coat layer or the anti-glare layer can favorably be used.

The binder polymer is preferably formed by firstly adding a monomer to an applying liquid for the low refractive index layer and, then, conducting polymerization (and crosslinking reaction, if desired) simultaneously or after the low-refractive-index layer is coated. Further, to the applying liquid for the low refractive index layer, a small amount of polymer such as polyvinyl alcohol, polyoxyethylene, polymethylmethacrylate, polymethylacrylate, diacetyl cellulose, triacetyl cellulose, nitro cellulose, polyester, or an alkyd resin may be added.

A refractive index of the low refractive index layer is, preferably, in the range of from 1.20 to 1.46, more preferably from 1.25 to 1.46 and, particularly preferably from 1.30 to 1.46.

Thickness of the low refractive index layer is preferably in the range of from 50 nm to 200 nm and, more preferably, in the range of from 70 nm to 100 nm. Haze of the low refractive index layer is preferably 3% or less, more preferably 2% or less and, most preferably, 1% or less. Specific mechanical strength of the low refractive index layer is preferably H or more, more preferably 2H or more and, most preferably, 3H or more, in terms of the pencil hardness test under a load of 500 g.

Further, in order to improve a stain-proofing property of the antireflection film, a contact angle against water of a surface thereof is preferably 90° or more, more preferably 95° or more and, particularly preferably, 100° or more.

[High (Medium) Refractive Index Layer]

In order to impart a more favorable antireflection performance to the antireflection film according to the invention, it is preferable to provide a high refractive index layer and/or medium refractive index layer thereto. A refractive index of the high refractive index layer in the antireflection film according to the invention is preferably in the range of from 1.60 to 2.40 and, more preferably, from 1.70 to 2.20. A refractive index of the medium refractive index layer is adjusted to be of a value between that of the refractive index of the low refractive index layer and that of the refractive index of the high refractive index layer. The refractive index of the medium refractive index layer is preferably in the range of from 1.55 to 1.80. Haze values of the high refractive index layer and the medium refractive index layer are each preferably 3% or less. The refractive index can appropriately be adjusted by adjusting an amount of inorganic fine particles or the binder to be employed or the like.

In order to increase the refractive index of the high (medium) refractive index layer, the layer preferably contains an inorganic filler made of an oxide of at least one metal selected from among titanium, zirconium, aluminum, indium, zinc, tin and antimony and having an average particle size of 0.2 μm or less, preferably 0.1 μm or less and, more preferably, 0.06 μm or less.

Further, in order to increase a difference of refractive index from a matt particle contained in the high (medium) refractive index layer, for the purpose of holding the refractive index of the layer to a lower side, it is preferable to add an oxide of silicon to the high (medium) refractive index layer. A preferable particle diameter thereof is same as that of the inorganic filler in the hard coat layer.

Specific examples of such inorganic fillers include $TiO_2$, $ZrO_2$, $Al_2O_3$, $In_2O_3$, $ZnO$, $SnO_2$, $Sb_2O_3$, ITO, and $SiO_2$. Among these oxides, $TiO_2$ and $ZrO_2$ are particularly preferred from the standpoint of realizing a higher refractive index. A surface of the inorganic filler is preferably subjected to a silane coupling treatment or a titanium coupling treatment and, on this occasion, a surface treating agent having a functional group capable of reacting with a binder species is preferably used on the filler surface.

An amount of the inorganic filler is adjustable in accordance with a required refractive index and, in a case of the high refractive index layer, is in the range, based on the entire weight of the high refractive index layer, of, preferably, from 10 to 90%, more preferably from 20 to 80% and, particularly preferably, from 30 to 70%.

The filler has a particle size sufficiently smaller than the wavelength of light and, therefore, causes no light scattering and a dispersion obtained by dispersing the filler in a binder polymer behaves as an optically uniform substance.

The high (medium) refractive index layer according to the invention is preferably formed such that the inorganic filler is dispersed in a dispersion medium to form a dispersion and, then, to the thus-formed dispersion a binder precursor necessary for forming a matrix (such as a monomer having two or more ethylenic unsaturated groups as described in the hard coat layer), the above-described active halogenated compound and the like to obtain an applying composition for forming the high refractive index layer and, thereafter, the thus-obtained applying composition for forming the high refractive index layer is coated on a support and cured through crosslinking reaction or polymerization reaction of the ionizing radiation curable compound (such as a polyfunctional monomer and a polyfunctional oligomer).

The polymerization reaction of the photopolymerizable polyfunctional monomer is preferably performed by using a photopolymerization initiator. Preferred examples of such photopolymerization initiators include a photoradical polymerization initiator and a photocationic polymerization initiator. Particularly preferred among these photopolymerization initiators, is the photoradical polymerization initiator. As for the photoradical polymerization initiator, those as used in the above-described low refractive index layer or similar ones can be used.

The high (medium) refractive index layer may contain a resin, a surface active agent, an antistatic agent, a coupling agent, a thickening agent, a coloring inhibitor, a coloring material (pigment, dye), an anti-glare imparting agent, an anti-foaming agent, a leveling agent, a fire retardant, an ultraviolet ray absorbing agent, an infrared ray absorbing agent, a tackifying agent, a polymerization inhibitor, an oxidation inhibitor, a surface modifier, electrically-conductive metal fine particles, and the like.

Thickness of the high (medium) refractive index layer can appropriately be designed depending on applications. In a case in which the high (medium) refractive index layer is used as an optical interference layer, the thickness of the high (medium) refractive index layer is preferably in the range or from 30 to 200 nm, more preferably from 50 to 170 nm and, particularly preferably, from 60 to 150 nm.

[Antistatic Layer]

In order to impart a transparent film according to the invention with an effect of no generation of electrostatics, prevention of attachment of dirt or no electrostatic hazard from outside at the time it is incorporated in a liquid crystal display or the like, an antistatic layer may be provided thereto as needed. As for performance of the antistatic layer at this occasion, surface resistance thereof after the transparent film is formed is preferably $10^{12}\Omega$/square or less. Even when it is more than $10^{12}\Omega$/square, dust attracting property can be reduced compared with the transparent film provided with no antistatic layer.

Examples of antistatic agents to be contained in an antistatic resin composition include various types of surfactant-based antistatic agents such as various types of cationic antistatic agents each having a cationic group such as a quaternary ammonium salt, a pyridinium salt, or any one of primary to tertiary amino groups; an anionic antistatic agent having an anionic group such as a sulfonate group, a sulfuric acid ester salt group, phosphoric acid ester salt group, or a phosphonate group; an amphoteric antistatic agent such as that of an amino acid type, or an amino sulfuric acid ester type; a nonionic antistatic agent such as that of an amino alcohol type, a glycerin type, or a polyethylene glycol type; an organometallic compound such as an alkoxide of tin, or titanium; a metallic chelating compound such as an acetyl acetonate salt of such organometallic compound, and, further, a polymer-based antistatic agent in which any one of the above-described surfactants is allowed to have a higher molecular weight. Still further, an ionizing radiation-polymerizable monomer or oligomer having a tertiary ammonium group, a quaternary ammonium group, or a metallic chelating group fluorine-containing compound, and a polymerizable antistatic agent such as an organometallic compound such as a coupling agent having an ionizing radiation-polymerizable functional group can also be used.

As for other antistatic agents to be contained in the antistatic resin composition than those described above, an ultrafine particle having a particle size of 100 nm or less, for example, tin oxide, tin-doped indium oxide (ITO), antimony-doped tin oxide (ATO), indium-doped zinc oxide (AZO), antimony oxide, or indium oxide can be used. Particularly, by allowing the particle diameter to be less than 100 nm which is a wavelength of a visible light ray, they become transparent when a film is made and do not impair transparency of the transparent film, which is preferable.

By mixing any one of the above-described antistatic agents in a coating material which forms the hard coat layer or antiglare layer, a coating film which simultaneously improves two performances of an antistatic performance and a hard coat performance, as well as two performances of the antistatic performance and the antiglare performance can be obtained.

[Support]

The support of the transparent film according to the invention is preferably transparent and preferably uses a plastic film. Examples of polymers for forming the plastic film include cellulose acylate (for example, cellulose triacetate, cellulose diacetate, cellulose acetate propionate, and cellulose acetate butyrate and, representatively, TAC-TD80U and -TD80UF (trade name) produced by Fuji Photo Film Co., Ltd.), polyamide, polycarbonate, polyesters (for example, polyethylene terephthalate, and polyethylene naphthalate), polystyrene, polyolefin, a norbornene-base resin (ARTON: trade name; produced by JSR) and an amorphous polyolefin (ZEONEX: trade name; produced by Nippon Zeon). Among these polymers, triacetyl cellulose, polyethylene terephthalate, and polyethylene naphthalate are preferred and, among these polymers, tryacetyl cellulose is particularly preferred. Further, a cellulose acylate film which does not substantially contain a halogenated hydrocarbon such as dichloromethane and a production method therefore are disclosed in Technical Disclosure Bulletin 2001-1745, Hatsumei Kyokai (Japan Institute of Invention and Innovation), (Mar. 15, 2001). Cellulose acylate described therein can preferably be used in the invention.

[Coating Film Forming Method]

The transparent film according to the invention, particularly antireflection film, can be prepared in a method as described below; however, the invention is not limited thereto.

[Formation of Antireflection Film]

Each layer constituting the antireflection layer having a multi-layer constitution can be formed by a dip coat method, an air knife coat method, a curtain coat method, a roller coat method, a die coat method, a wire bar coat method, a gravure coat method, and an extrusion coat method (see U.S. Pat. No. 2,681,294); however, the die coat method is preferable and a new die coat method to be described below is more preferred. Two or more layers can simultaneously be applied. For such simultaneous application, references can be made to U.S. Pat. Nos. 2,761,791, 2,941,898, 3,508,947, and 3,526,528 and Yuji Harasaki, Coating Kogaku, p. 253, Asakura Shoten (1973).

In order to continuously produce the antireflection film according to the invention, steps of: continuously delivering a base material film in roll form; coat-drying an applying liquid; curing coated film; and taking up the base material film having a cured layer are performed.

The base material film is continuously delivered from the base material film in roll form to a clean room and, then, in the clean room, electrostatic charged on the base material film is removed by an electrostatic removing apparatus and, thereafter, a foreign material attached on the base material film is removed by a dust removing apparatus. Subsequently, the applying liquid is applied on the base material film in a coating portion provided in the clean room and, then, the resultant coated base material film is delivered to a drying chamber and dried therein.

The base material film having the thus-dried coated layer is delivered from the drying chamber to a radiation-curing chamber and, then, subjected to radiation therein to allow a monomer contained in the coated layer to be polymerized and, as a result, the coated layer is cured. Further, optionally, the base material film having the coated layer thus-cured by the radiation is delivered to a thermocuring portion and, then, heated to attain a complete curing and, subsequently, the base material film having a completely cured layer is taken up in roll form.

Figure 5:
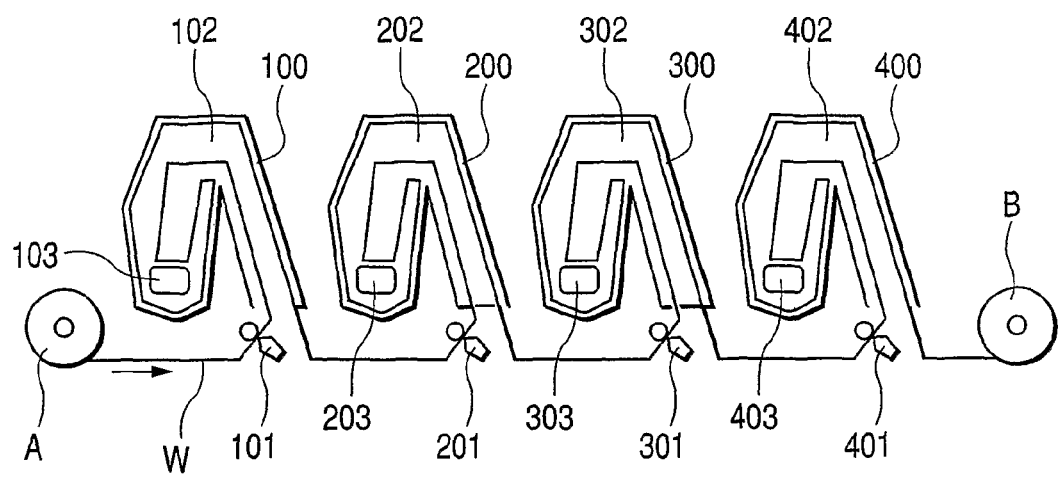
FIG. 5 is a diagram showing an example of an apparatus which performs applying and curing an antireflection layer of an antireflection film according to the invention.

The above-described steps may be performed either individually by the formation of each layer or continuously all through the formations of layers by providing a plurality of chambers in series, namely, from the coating portion to the drying chamber to the radiation-curable portion-thermocuring chamber and, from the standpoint of production efficiency, it is preferable to continuously form (apply) each layer. FIG. 5 shows an illustrative constitution of an apparatus which continuously performs formation of each layer. In the apparatus, a required number of film making units 100, 200, 300, and 400 are appropriately provided between a step 1 of continuously delivering the base material film in roll form and a step 2 of taking up the base material film in roll form. The apparatus as shown in FIG. 5 is an illustrative constitution for continuously coating 4 layers without taking up each layer. It goes without saying that the number of film making units can be changed in accordance with layer constitutions. The film making unit 100 is constituted by a step 101 of applying the applying liquid, a step 102 of drying the resultant coated film, and a step 103 of curing the coated film.

It is preferable form the standpoint of productivity that the base material film in roll form provided with the above-described hard coat layer is continuously delivered by using an apparatus in which 3 film making units are provided to allow a medium refractive index layer, a high refractive index layer and a low refractive index layer to be provided thereon in respective film making units in order and, then, taken up, and it is more preferable from the point of substantially reducing a coating coat that the base material film in roll form is continuously delivered by using an apparatus in which 4 film making units are provided as shown in FIG. 5 to allow a hard coat layer, a medium refractive index layer, a high refractive index layer and a low refractive index layer to be provided thereon in respective film making units in order and, then, taken up. As another preferable aspect, an apparatus constitution can optionally be arranged in which the number of coating stations is reduced to be two and, then, only 2 layers, namely, the medium refractive index layer and the high refractive index layer, are formed by one step and, after face condition, film thickness and the like are examined, the results are fed back to improve yield.

According to the invention, from the standpoint of a higher production speed, as a coating method, a die coat method is favorably used. The die coat method is favorably used, since it simultaneously attains productivity and a surface condition having no coating unevenness at a high order.

As for a method for producing an antireflection film, a coating method utilizing the die coat method is preferred.

Namely, the method is a method which has a coating step in which a land of a front end lip of a slot die is allowed to be adjacent to a surface of a continuously-running web which is supported by a backup roll and, then, an applying liquid is applied from a slot of the front end lip. According to the invention, it is preferable to coat by using a coating apparatus having the slot die in which the land length in a web running direction of the front end lip at the web proceeding direction side of the slot die is set to be from 30 μm to 100 μm and, when the slot die is set at a coating position, the front end lip at the side opposite to the web proceeding direction and the web are arranged such that a gap therebetween is allowed to be larger than that between the front end lip at the web proceeding direction side and the web by 30 μm to 120 μm (hereinafter, this numerical limitation is referred to as "overbite length").

Particularly, a die coater which can favorable be used in the production method according to the invention will be described in detail with reference to accompanying drawings. The die coater can be used in a case in which a wet coating amount is small (20 ml/m² or less) and is preferred.

<Constitution of Die Coater>

Figure 6:
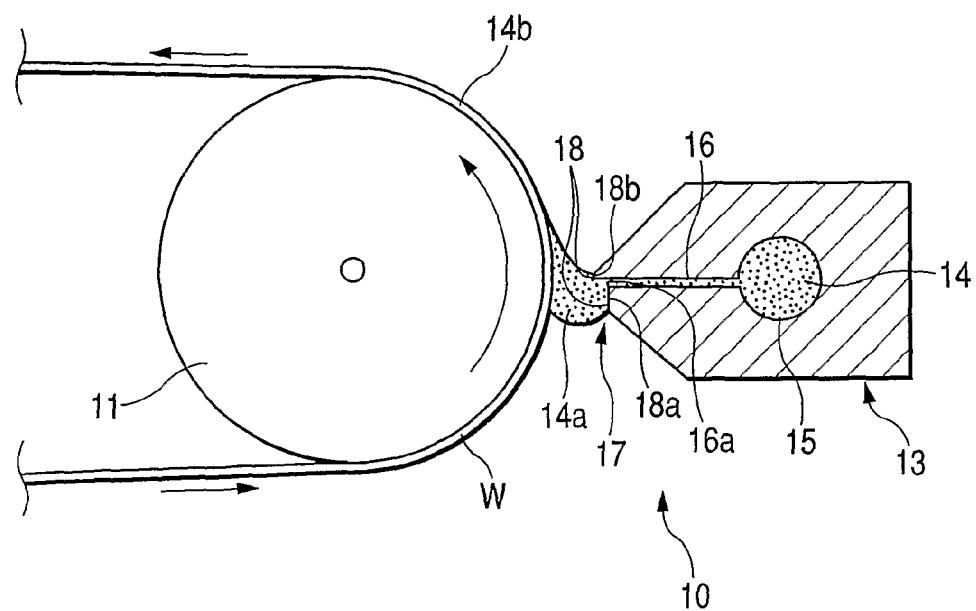
FIG. 6 is a schematic cross-sectional diagram showing an embodiment of a die coater preferably used in the invention.

FIG. 6 is a cross-sectional diagram of a coater (coating apparatus) using a slot die which can favorably embody the invention.

The coater 10 contains a backup roll 11 and a slot die 13. An applying liquid 14 is ejected in a bead shape 14a from the slot die 13 to a continuously-running web W supported by a backup roll 11 and applied thereon, to thereby form a coated film 14b on the web W.

Inside the slot die 13, a pocket 15, and a slot 16 are formed. A cross-section of the pocket 15 is constituted with a curved line and a direct line and may be an approximate circle or a semi-circle. The pocket 15 is a liquid reservoir space for an applying liquid which is, in terms of a cross-sectional shape, extended in a width direction of the slot die 13 (on this occasion, the width direction of the slot die 13 denotes a direction toward a front side or toward a rear side) and length of effective extension thereof is ordinarily similar to or a little longer than a coating width. Supply of the applying liquid 14 to the pocket 15 is performed from a side face of the slot die 13 or from a center of a face at the side opposite to a slot opening 16a. Further, in the pocket 15, a stopper (not shown) for preventing the applying liquid 14 from leaking is provided.

The slot 16 denotes a passage of the applying liquid 14 from the pocket 15 to the web W and has a cross-sectional shape thereof in a width direction of the slot die 13 in a same manner as in the pocket 15 and, then, an opening 16a positioned at the side of the web is adjusted by ordinarily using such an article as a width regulating plate such that the length comes to be approximately same as coating width. An angle formed by a tangent line of the backup roll 11 in the web W running direction at a slot front end of the slot 16 is preferably in the range of from 30° to 90°.

A front end lip 17 of the slot die 13 in which the opening 16a of the slot 16 is situated is formed in a tapered shape and a front end is a flat portion 18 denoted as a land. Te land 18, which is at the upstream side from the slot 16 in the proceeding direction of the web W (opposite to a proceeding direction, namely, a direction marked with an arrow in FIG. 6) is denoted as an upstream lip land 18a while that, which is at the downstream side (proceeding direction side) is denoted as a downstream lip land 18b.

The front end lip 17 has a shape more extended at the downstream side than at the upstream side (overbite shape); therefore, a gap between the upstream lip land 18a and the web W is larger than that between the downstream lip land 18b and the web W by such extended portion and, further, length of the downstream lip land 18b is within the above-described range.

Portions relevant to the above-described numerical limitations are now described with reference to FIG. 7A. The land length at the web proceeding direction side (downstream side) of the web is a portion represented by $I_{LO}$ in FIG. 7A and the overbite length is a portion represented by LO in FIG. 7A.

Figure 7A:
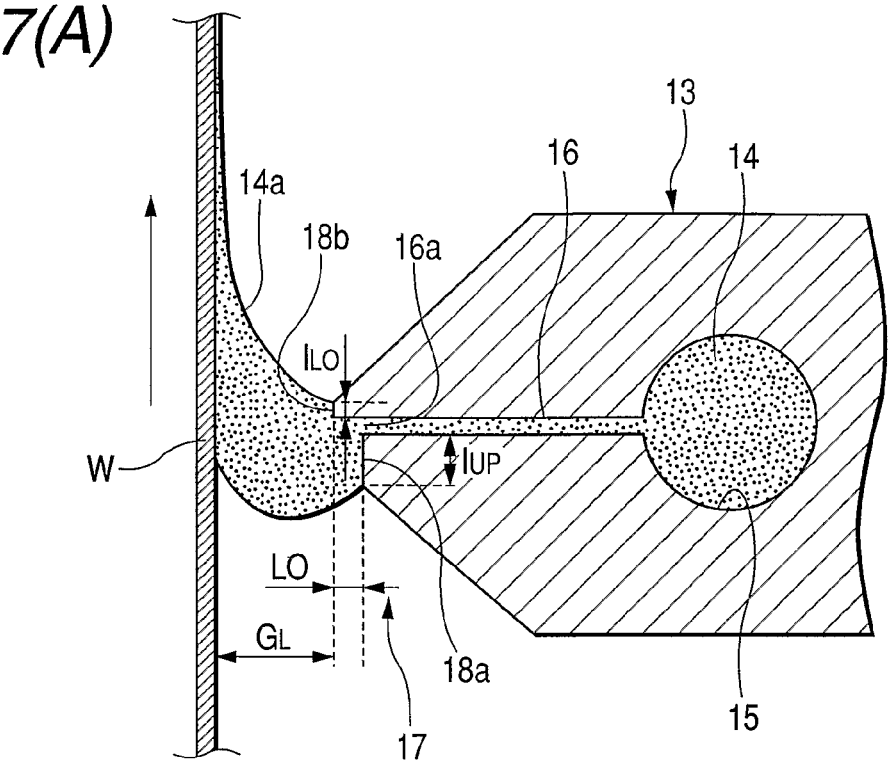
FIGS. 7A and 7B: 7A is an enlarged view of the die coater in FIG. 6; and 7B is a schematic cross-sectional view showing a known slot die in the art.
Figure 7B:
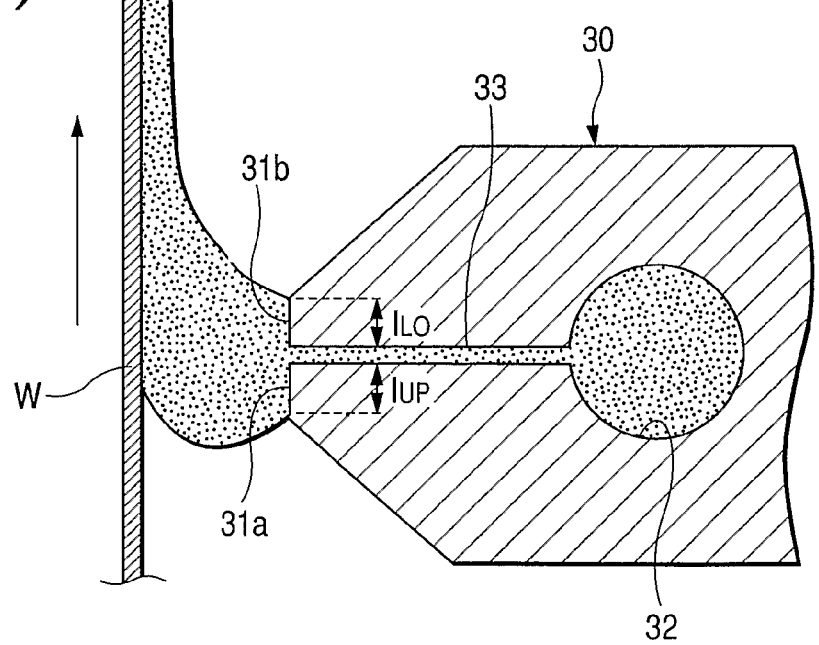

Next, a coating apparatus which can favorably be used in an embodiment of the production method for the antireflection film according to the invention is described in comparison with a conventional coating apparatus with reference to FIGS. 7A and 7B. FIGS. 7A and 7B show a cross-sectional configuration of the slot die 13 according to the invention in comparison with a conventional one, in which FIG. 7A shows the slot die 13 favorably used in an embodiment of the invention while FIG. 7B shows the conventional slot die 30.

In the conventional slot die 30, a distance between the upstream lip land 31a and the web and a distance between the downstream lip land 31b and the web are same with each other. On the other hand, in the slot die 13 favorably used in an embodiment of the invention, the downstream lip land length $I_{LO}$ is set to be shorter and, by such setting, coating with a wet film thickness of 20 µm or less can be performed with a good accuracy.

The land length $I_{UP}$ of the upstream lip land 18a is not particularly limited and is, preferably, in the range of from 500 µm to 1 mm. The land length $I_{LO}$ of the downstream lip land 18b is not particularly limited and is, preferably, in the range of from 30 µm to 100 µm, more preferably from 30 µm to 80 µm and, most preferably, from 30 µm to 60 µm. In a case in which the land length $I_{LO}$ of the downstream lip is 30 µm or more, an edge or the land of the front end lip is hardly damaged and, then, a streak is hardly generated on a coated film; therefore, the case is preferred. In this case, it is also easy to set a wet line position at the downstream side and, further, it is possible to suppress the applying liquid at the downstream side from spreading out; therefore, from these conditions, the case is preferred. Spreading of the applying liquid by wetting at the downstream side means that a wet line becomes uneven to cause a problem of inviting an unfavorable condition such as a streak on an applied face. On the other hand, in a case in which the land length $I_{LO}$ of the downstream lip is 100 µm or less, a bead 14a can be formed. By allowing the applying liquid to be formed in the bead 14a, a thin-layer application can be performed.

Further, the downstream lip land 18b has an overbite shape such that it is positioned closer to the web W than the upstream lip land 18a and, for this account, a degree of pressure reduction can be lowered to allow the bead 14a appropriate for the thin-film application to be formed. The difference between the distance between the downstream lip land 18b and the web W and the distance between the upstream lip land 18a and the web W (hereinafter, referred to also as "overbite length LO") is preferably in the range of from 30 µm to 120 µm, more preferably from 30 µm to 100 µm and, most preferably, from 30 µm to 80 µm. When the slot die 13 takes the overbite shape, a gap $G_1$ between the front end lip 17 and the web W denotes a gap between the downstream lip land 18b and the web W.

Next, an overall condition of the above-described application step will be described in detail with reference to FIG. 8.

Figure 8:
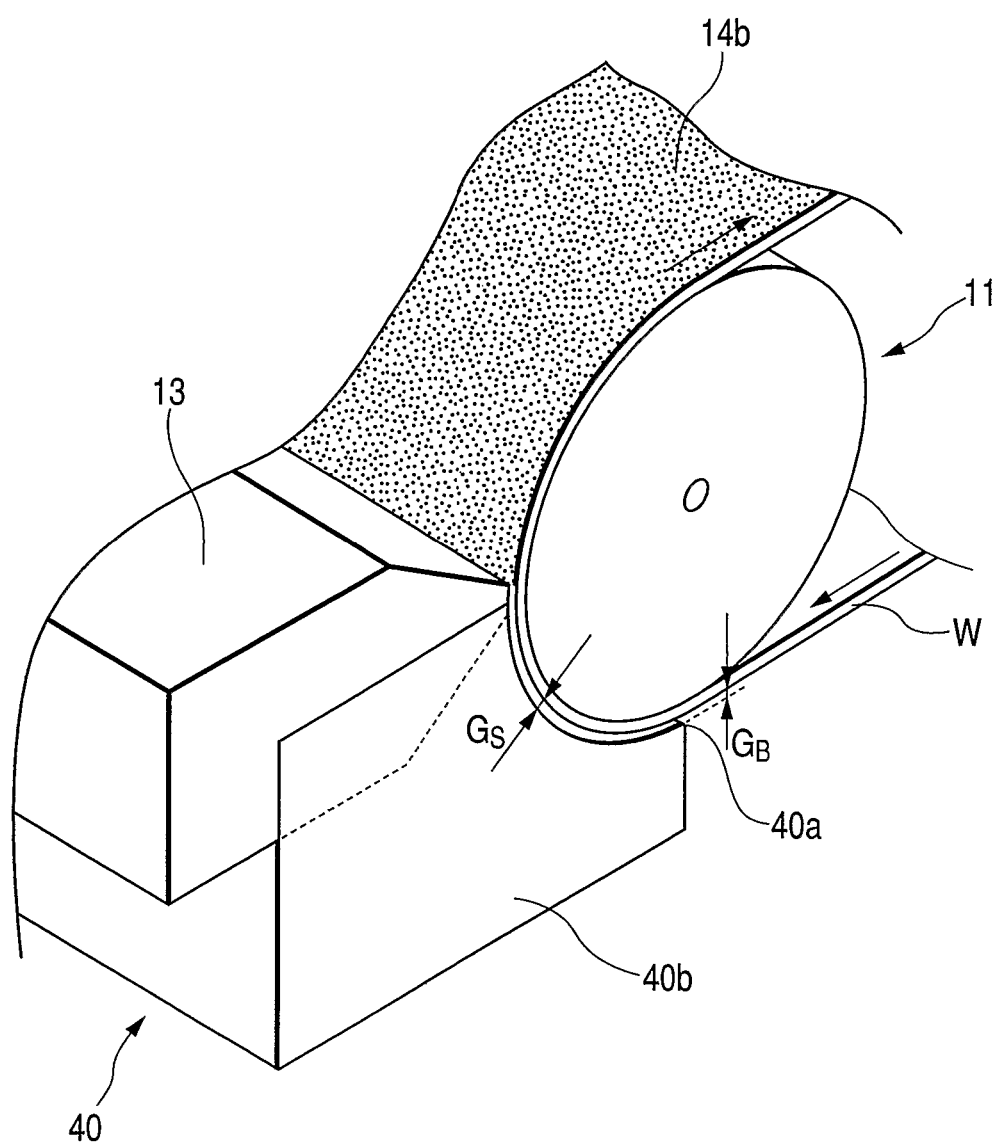
FIG. 8 is a perspective diagram showing a slot die for use in an applying step in a preferred embodiment according to the invention and the vicinity thereof.

FIG. 8 is a perspective view showing the slot die 13 and the vicinity thereof in the application step in a preferred embodiment of the invention. A pressure-reduced chamber 40 is arranged at a side opposite to the web W proceeding direction side from the slot die 13 (namely, at the upstream side from the bead 14a) and at a position at which it can perform a sufficient adjustment of pressure reduction against the bead 14a without contacting the beads 14a. The pressure-reduced chamber 40 contains a back plate 40a and a side plate 40b for maintaining an operation efficiency thereof, and there exist a gap $G_B$ between the back plate 40a and the web W and a gap $G_S$ between the side plate 40b and the web W.

Figure 9:
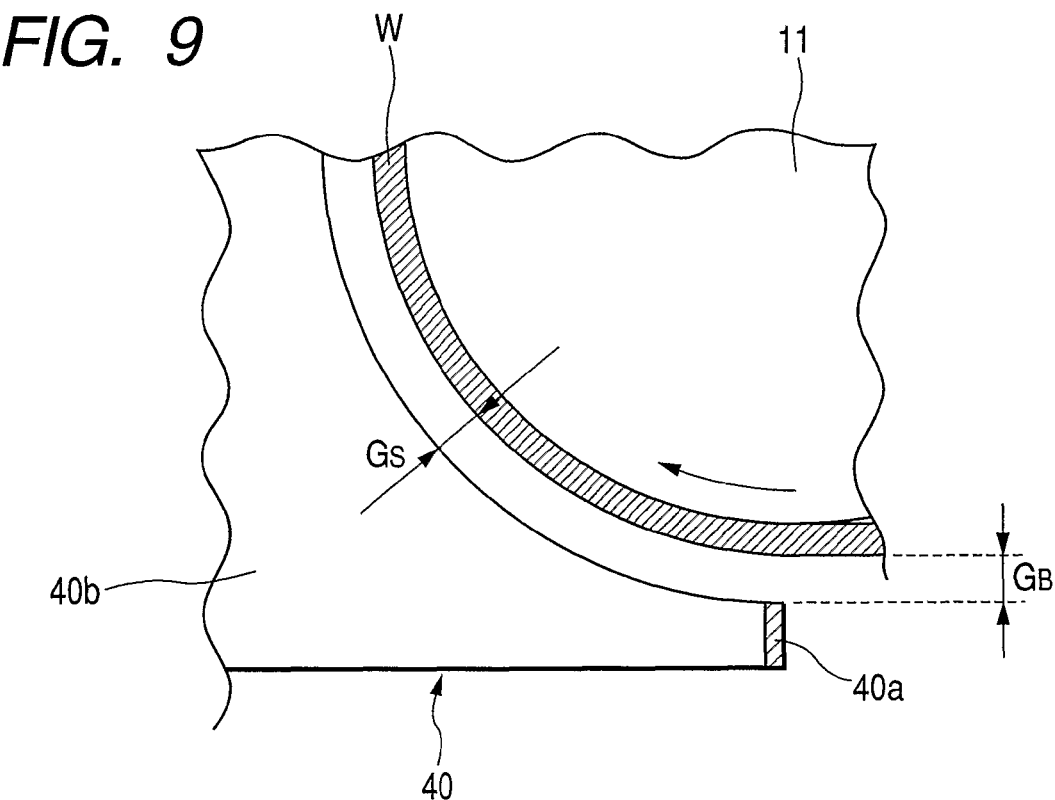
FIG. 9 is a cross-sectional diagram schematically showing a relation between a pressure-reducing chamber in FIG. 8 and a web.
Figure 10:
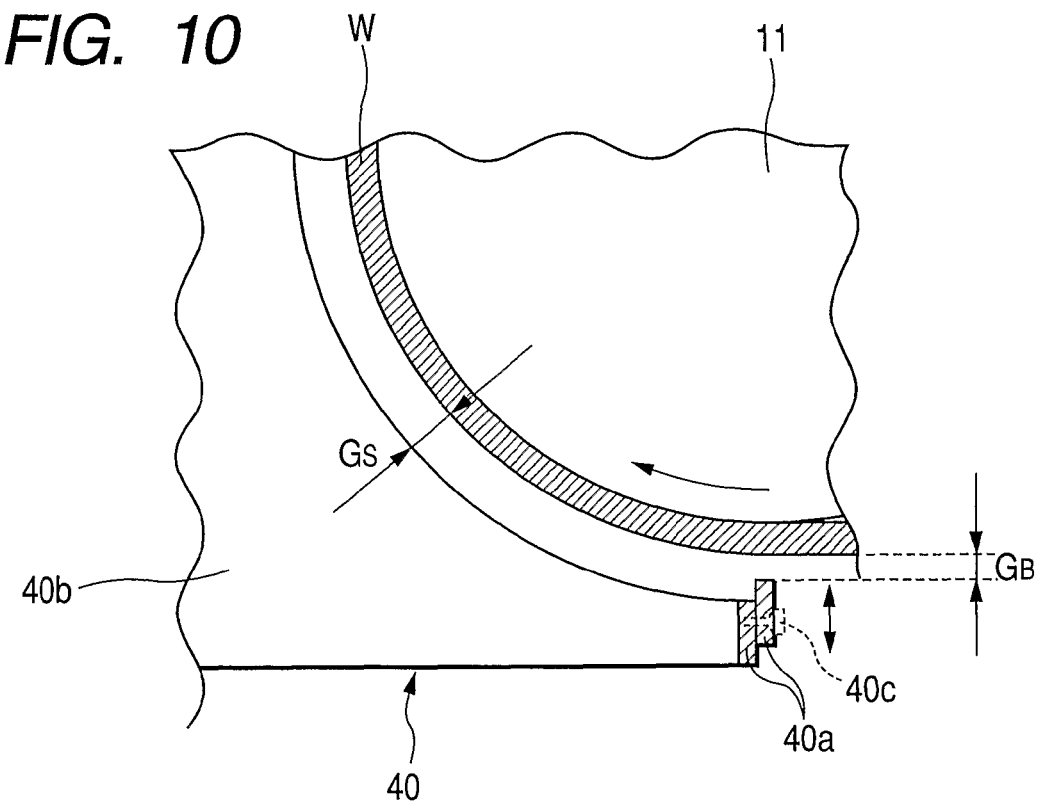
FIG. 10 is a cross-sectional diagram schematically showing a relation between the pressure-reducing chamber in FIG. 8 and a web.

Relationships between the pressure-reduced chamber 40 and the web W are described in detail with reference to FIGS. 9 and 10. FIGS. 9 and 10 each show a cross-sectional diagram showing the pressure-reduced chamber 40 and the web W which are positioned close to each other.

The side plate 40b and the back plate 40a may be integrated with a main body of the chamber 40 to form a unity as shown in FIG. 9. Further, for example, as shown in FIG. 10, a constitution the back plate is screwed on the chamber 40 by a screw 40c or the like such that the gap $G_B$ can appropriately be changed is permissible. In any constitution, spaces which are actually open between the back plate 40a and the web W and between the side plate 40b and the web W are defined as $G_B$ and $G_S$, respectively. The gap $G_B$ between the back plate 40a of the pressure-reduced chamber 40 µm and the web W denotes a gap extending from the uppermost end of the back plate 40a to the web W, on condition that, as shown in FIG. 8, the pressure-reduced chamber 40 is arranged downward from the web W and the slot die 13.

It is preferable to set the gap $G_B$ between the back plate 40a and the web W to be larger than a gap $G_L$ (see FIG. 7A) between the front end lip 17 of the slot die 13 and the web W and, in this manner, a change of a degree of pressure reduction, in the vicinity of the bead, caused by eccentricity of the backup roll 11 can be suppressed. For example, when the gap GL between the front end lip 17 of the slot die 13 and the web W is from 30 µm to 100 µm, the gap $G_B$ between the back plate 40a and the web W is preferably from 100 µm to 500 µm.

<Material, Accuracy>

Length, along the web running direction, of a front end lip at the web proceeding direction (lip land length $I_{LO}$ at downstream side in FIG. 7A) is preferably in the above-described range and, further, a fluctuation width, in the slot die width direction, of $I_{LO}$ is preferably 20 µm or less. So long as they are each in the above-described range, the bead does not come to be unstable even with an exterior disturbance, which is preferred.

As for a material of the front end lip of the slot die, when a material such as stainless steel is used, it becomes dull at the time of die machining, which is not preferred. When the material such as stainless steel is used, it is difficult to satisfy accuracy of the front end lip, although the downstream lip land length $I_{LO}$ is set in the above-described range of from 30 to 100 μm. In order to maintain a high machining accuracy, it is preferable to use an ultra hard material as described in Japanese Patent No. 2817053. Specifically, it is preferable to allow at least the front end lip of the slot die to be made of cemented carbide bound with carbide crystal having an average particle diameter of 5 μm or less. As for the cemented carbide, a carbide crystal particle such as tungsten carbide (hereinafter, referred to also as "WC") bound with a binder metal such as cobalt carbide is mentioned. As for such binder metals, further, titanium, tantalum, niobium and mixed metals having any one of these metals may be used. As for the average particle diameter of WC crystal, the particle diameter of 3 μm or less is more preferred.

In order to realize application of high accuracy, the above-described downstream lip land length $I_{LO}$ is important and, further, it is desirable to control the fluctuation width, in the slot die width direction, of the gap $G_L$. The above-described backup roll 11 and the above-described front end lip 17 desirably realize straightness within a range which can control the fluctuation width, in the slot die width direction, of the gap $G_L$. Preferably, the straightness of each of the front end lip 17 and the backup roll 11 is set such that the fluctuation width, in the slot die width direction, of the gap $G_L$ comes to be 5 μm or less.

In a case in which the antireflection film is allowed to have a laminate structure, when foreign materials such as dirt and dust are exist, a luminescent spot defect comes to be conspicuous. The term "luminescent spot defect" as used herein denotes a defect which can visually be recognized by a reflection on an applied film as described above and can visually be detected by an operation such as painting a reverse face of the antireflection film after coating black. The luminescent spot defect which can visually be recognized is ordinarily 50 μm or more. When the number of the luminescent spot defects is large, yield at the time of the production is decreased and, then, the antireflection film having a large surface area can not be produced.

The antireflection film according to the invention is set such that the number of the luminescent spot defects is $20/m^2$ or less, preferably $10/m^2$ and, particularly preferably, $1/m^2$ or less.

In order to form the antireflection film having a small number of the luminescent spot defects, accurate control of a degree of dispersion of ultra-fine particles of high refractive index and a microfiltration operation of the applying liquid are mentioned. At the same time, in each sub-layer constituting the antireflection layer, an applying step in the above-described applying portion and a drying step in the drying chamber are performed in an atmosphere of air having a high purity and, further, it is preferable that, before the application is performed, dirt and dust on the film are sufficiently removed. the degree of purity of the air in the applying step and the drying step is, based on specifications on the degree of purity of the air defined by U.S. FED. STD. 209E, preferably class 10 (353 particles of 0.5 μm or more/$m^3$ or less) or more and, more preferably, class 1 (35.5 particles of 0.5 μm or more/$m^3$ or less) or more. Further, it is preferable that the degree of purity of the air in other portions than the applying and drying steps, such as a taking-up portion is high.

As for a dust removing method which is performed in a dust removing step as a previous step of application, a dry-type dust removing method such as a method of pressing a non-woven fabric or a blade against a film surface as described in JP-A No. 59-150571; a method of blowing air having a high degree of purity, removing an attachment from a film surface and, then, sucking it by an adjacent suction opening as described in JP-A No. 10-309553; or a method of blowing compressed air in supersonic vibration, removing an attachment and, then, sucking it as described in JP-A No. 7-333613 (using a new ultra-cleaner; available from Shinko Co. Ltd.) can be mentioned.

Further, a wet-type dust removing method such as a method for introducing a film in a cleaning vessel and, then, removing an attachment by supersonic vibration; particularly, a method of supplying a cleaning liquid to a film, blowing a high-speed air and, then, sucking it as described in JP-A No. 49-13020; or a method of continuously rubbing a web with a roll which is wet with a liquid, and spraying a liquid on the thus-rubbed face to perform cleaning as described in JP-A No. 2001-38306. Among these dust removing methods, a method for removing dust by using the supersonic vibration or the wet-type dust removing method is particularly preferred from the point of the dust removing effect.

Further, it is particularly preferable, from the standpoint of enhancing a dust removing effect and suppressing attachment of dirt, to remove static electricity on a base material film before any one of these dust removing steps is performed. As for methods for removing static electricity, an ionizer of a corona discharge type or another ionizer of light irradiation type utilizing UV, soft X-ray or the like can be used. A charged potential of the base material film before and after the dust removal and application is preferably 1000 V or less, more preferably 300 V or less and, particularly preferably, 100 V or less.

<Dispersion Solvent for Application>

Dispersion solvents for application are not particularly limited and can be used either each individually or in combinations thereof. Examples of preferable solvents include aromatic hydrocarbons such as toluene, xylene, and styrene; chlorinated aromatic hydrocarbons such as chlorobenzene, and ortho-dichlorobenzene; chlorinated aliphatic hydrocarbons including methane derivatives such as monochloromethane; ethane derivatives such as monochloroethane, alcohols such as methanol, isopropyl alcohol, and isobutyl alcohol; esters such as methyl acetate and ethyl acetate; ethers such as ethyl ether, and 1,4-dioxane; ketones such as acetone, methyl ethyl ketone, methyl isobutyl, ketone, and cyclohexanone; glycol ethers such as ethylene glycol monomethyl ether; cyclic hydrocarbons such as cyclohexane; aliphatic hydrocarbons such as n-hexane; and mixtures of aliphatic hydrocarbons or aromatic hydrocarbons. Among these solvents, the dispersion solvent for application to be prepared by using ketones either each individual or mixtures thereof is particularly preferred.

<Adjustment of Applying Liquid>

Firstly, an applying liquid containing components for forming each layer is prepared. On this occasion, by suppressing evaporation of solvent to minimum, increase of water content in the applying liquid can be suppressed. The water content in the applying liquid is, preferably, 5% by mass or less and, more preferably, 2% by mass or less. Suppression of evaporation amount of the solvent can be attained by enhancing sealing property at the time of stirring after each material is loaded in a tank, minimizing an area of the applying liquid to be in contact with the air at the time of liquid-transferring operation and the like. Further, a device for reducing the water content during application or before or after the application may be provided.

<Filtration>

The applying liquid to be used in application is preferably filtered before being applied. It is preferable to use a filter for filtration having a pore diameter being as small as possible so long as it does not remove components. For the filtration, a filter having an absolute filtration accuracy of from 0.1 to 10 μm is used. Further, the filter having an absolute filtration accuracy of from 0.1 to 5 μm is favorably used. Thickness of the filter is, preferably, from 0.1 to 10 mm and, more preferably, from 0.2 to 2 mm. On this occasion, filtration is performed under a filtration pressure of preferably 1.5 MPa or less, more preferably 1.0 MPa or less and, still more preferably, 0.2 MPA or less.

A filtration filter member is not particularly limited so long as it does not affect the applying liquid. Specifically, same material as the filter member in the wet-type dispersion of the above-described inorganic compounds can be mentioned.

It is preferable that the applying liquid subjected to the filtration is further subjected to supersonic dispersion just before it is applied, to thereby remove foams, or help maintain a dispersion state of the dispersion.

Particularly, in the applying liquid for forming an antiglare layer, it is preferable to perform filtration capable of removing almost all (denoting 90% or more) foreign materials corresponding to a dry film thickness (approximately from 50 nm to 120 nm) of a low refractive index layer to be formed directly thereon. Since light-transmissible fine particles for imparting antiglare properties has a film thickness same as or larger than that of the low refractive index layer, it is preferable that the filtration is performed on an intermediate applying liquid in which all materials except the light-transmissible fine particles are added. Further, in a case in which such filter which can remove foreign materials having such a small particle diameter as described above can not be obtained, it is preferable to perform the filtration capable of removing almost all foreign materials corresponding to a wet film thickness (approximately from 1 to 10 μm) of a layer to be at least formed directly on thereon. In such manner as described above, it is possible to reduce spot defects of the layer to be directly formed thereon.

<Physical Properties of Applying Liquid>

In the applying method by the above-described die coat method, since a maximum speed capable of performing application is influenced by physical properties of the liquid to a great extent, the physical properties of the liquid at the very time of application, particularly, a viscosity and a surface tension are required to be controlled.

The viscosity is preferably 2.0 [mPa·s] or less, more preferably 1.5 [mPa·s] or less and, most preferably, 1.0 [mPa·s] or less. Since, depending on types of applying liquids, the viscosity varies in accordance with a shear rate, the above-described values show those of viscosities at the shear rate at the very time of application. When a thixotropic property-imparting agent is added to the applying liquid such that the applying liquid comes to show a low viscosity at the time of being applied with a high shear and a high viscosity at the time of being dried with almost no shear, unevenness comes to be hardly generated, which is preferred.

Further, though not physical properties of the liquid, an amount of the applying liquid to be applied on the web gives an influence on the maximum speed capable of performing application. The amount of the applying liquid to be applied on the web is preferably from 2.0 to 5.0 [ml/m$^2$]. When the amount of the applying liquid to be applied on the web is increased, the maximum speed capable of performing application is also increased, which is preferred. However, when the amount of the applying liquid to be applied on the web is unduly increased, a load to be put on drying comes to be large. Therefore, it is preferable to determine the optimum amount of the applying liquid to be applied on the web in accordance with liquid prescriptions and step conditions.

The surface tension is preferably in the range of from 15 to 36 [mN/m]. It is preferable to add a leveling agent or the like and decrease the surface tension, since unevenness to be generated at the time of drying can be suppressed. On the other hand, when the surface tension is unduly decreased, the maximum speed capable of performing application is also decreased; therefore, the surface tension is preferably in the range of from 17 [mN/m] to 32 [mN/m] and, more preferably, in the range of from 19 [mN/m] to 26 [mN/m].

<Wet Applying Amount>

At the time of forming the antiglare layer, it is preferable to apply the above-described applying liquid in the range of from 6 to 30 μm as a wet applying film thickness on the base material film either directly or via another layer. From the standpoint of preventing a drying unevenness, it is, more preferably, in the range of from 3 to 20 μm. When the low refractive index layer is formed, it is preferable to apply an applying composition in the range of from 1 to 10 μm in the range of as a wet applying film thickness on the antiglare layer either directly or via another layer. The applying composition is, more preferably, applied in the range of from 2 to 5 μm.

<Application Speed>

The production method using the die coat method as described above has a high stability of a film thickness at the time of high speed application and adopts a pre-measurement system and, accordingly, it is easy to secure a stable film thickness even at the high speed application. As described above, when a wet applying amount is small (20 ml/m$^2$ or less), against the applying liquid of small applying amount, the applying method can apply with a favorable stability of the film thickness at a high speed. In the production method for the antireflection film according to the invention, an applying method using such die coat method is preferred. In the dip coat method, since applying liquid vibration in a liquid receiving vessel is inevitable, a step-like unevenness tends to be generated, while, in the reverse roll coat method, the step-like unevenness tends to be generated due to an eccentricity or droop of the roll relevant to the application and, further, since these application methods adopt a post-measurement system, it is difficult to secure a stable film thickness and, therefore, it is preferable to use the applying method by the above-described die coat method which has a high stability of the film thickness and adopts the pre-measurement system. It is preferable, from a standpoint of productivity, to perform application at a rate of 25 m/min. or more by using the applying method by the above-described die coat method.

[Drying]

After the antiglare layer and the low refractive index layer are applied on the base material film either directly or via another layer, they are transported to a heated zone by means of a web for drying the solvent. A temperature in the drying zone at that time is preferably from 25° C. to 140° C., and it is preferable that the temperature in a first half of the drying zone is relatively low while the temperature in the second half of the drying zone is relatively high. However, it is preferable that any one of these temperatures is lower than that at which other components than the solvent contained in the applying composition of each layer start to be evaporated. For example, in some of commercially available photoradical generating agents to be used simultaneously with an ultraviolet ray curable resin, about 10% thereof is evaporated in a few minutes in a hot wind of 120° C. and, in some of monofunctional or difunctional acrylate monomers, evaporation proceeds in a hot wind of 100° C. In each of the above-described cases, it is preferable that the temperature is less than the temperature at which another components than the solvent contained in each layer start to be evaporated.

Further, as for the drying wind to be applied after applying composition of each layer is applied on the base material film, it is preferable that, so long as the solid content of the applying composition is in the range of from 1 to 50% by mass, a wind velocity on a surface of a applied film is in the range of from 0.1 to 2 m/second for preventing drying unevenness.

Still further, after the applying composition of each layer is applied on the base material film, when a difference of temperatures between a transporting roll which is in contact with a face reverse to an applied face and the base material film is in the range of from 0° C. to 20° C., the drying unevenness to be caused by heat transmission unevenness on the transporting roll can be prevented, which is preferred.

[Curing]

After the drying zone for the solvent, the resultant base material film having each layer thereon is allowed to pass through a zone by means of a web for curing each applied film by ionizing radiation, to thereby cure the applied film. For example, the applied film is ultraviolet ray curable, it is preferable to irradiate an ultraviolet ray with an irradiation amount of from 10 $mJ/cm^2$ to 1000 $mJ/cm^2$ by an ultraviolet ray lamp on each layer and to cure it. On this occasion, an irradiation amount distribution in a web width direction is, based on the maximum irradiation amount in the center, preferably from 50 to 100% inclusive all up to both side edges and, more preferably, from 80 to 100%. Further, when an oxygen concentration is required to be reduced by purging a nitrogen gas or the like for the purpose of promoting a surface curing, the oxygen concentration is preferably from 0.01% by volume to 5% by volume and, the width direction distribution is, in terms of oxygen concentration, preferably 2% by volume or less.

Still further, the term "ionizing radiation" as used herein means as ordinarily means in the art and denotes a radiation which causes an excitation or ionization when it passes through a material, namely, a corpuscular ray or an electromagnetic wave which is simply referred to as radiation and, specifically, denotes an α ray, a β ray, a γ ray, a high energy particle, a neutron radiation, an electron ray, a light ray (for example, ultraviolet ray, visible light ray) and the like. Particularly, preferable ionizing radiation according to the invention is the ultraviolet ray and the visible light ray.

Further, in a case in which a curing rate (100-remaining functional group content) of the antiglare layer turns to be less than 100%, when a low refractive index layer according to the invention is provided thereon and, then, the low refractive index layer is cured by the ionizing radiation and/or heat, the curing rate of the antiglare layer as an under-layer comes to be higher than that before the low refractive index layer is provided and adhesion between the antiglare layer and the low refractive index layer is improved; the case is preferred.

[Properties of Transparent Film]

As for the transparent film according to the invention, properties thereof as described below are preferred.

<Surface Profile>

As for a surface profile, it is preferable to design the surface profile such that a center-line average roughness Ra is preferably from 0 to 0.5 μm and, most preferably, from 0.01 to 0.4 μm; a 10-point average roughness Rz is 10 times the value of Ra or less; an average mountain-valley distance Sm is from 1 to 100 μm; a standard deviation of height of a convex from a convex-concave deepest portion is 0.5 μm or less; a standard deviation of an average mountain-valley distance Sm is 20 μm or less; and a face having a inclined angle of from 0 to 5° occupies 10% or more, since such designing as described above can attain a sufficient antiglare property and uniform visual matt feeling. When Ra is less than 0.08, a sufficient antiglare property can not be obtained, while, when it is more than 0.30, problems such as glittering, and whitening of a surface at the time an outside light is reflected thereon are generated.

The center-line average roughness Ra, the 10-point average roughness Rz, and the mountain-valley average distance Sm can be measured by using a commercially available surface roughness meter.

<Optical Property>

Further, a tint of color of the reflected light in a CIE 1976 L*a*b* color space under a C light source comes to be neutral by allowing a ratio of the minimum value of reflectance to the maximum value thereof to be from 0.5 to 0.99 in the range of from 380 nm to 780 nm while the color of the reflected light has a* and b* values in the ranges of from −2 to 2 and from −3 to 3, respectively, which is preferred. Further, when the b* value of the transmitted light under the C light source is from 0 to 3, a yellowish tinge of white representation in an applications to a display device is reduced, which is preferred.

Further, as for the transparent film according to the invention, a haze thereof which is caused by internally scattering the optical property (hereinafter, referred to also as "inner haze") is preferably from 5% to 20% and, more preferably, from 5% to 15%. When the inner haze is less than 5%, a combination of usable materials is limited and, then, it becomes difficult to allow antiglare property and other properties to be compatible with each other and, further, a cost is increased. When the inner scattering is more than 20%, a dark room contrast is deteriorated to a great extent.

Haze which is caused by a surface scattering (hereinafter, referred to also as "surface haze") is, preferably, from 0% to 40% and, more preferably, from 0% to 20%. In a case in which the definition of the transmitted image at a comb width of 0.5 mm is allowed to be from 5% to 30%, a sufficient antiglare property, and improvement of image blur and dark room contrast decrease can simultaneously attained; therefore, the case is preferred. When the surface haze is less than 4%, the antiglare property becomes insufficient, while, when it is more than 20%, at the time the outside light is reflected, problems such as whitening of the surface are generated. Further, it is preferable from the reasons that reflection of the outside light can be suppressed and visibility is enhanced to allow the specular reflectivity to be 2.5% or less, and the transmittance to be 90% or more.

The haze (cloud value) can be measured by using HR-100 (trade name; available from MURAKAMI COLOR RESEARCH LABORATORY CO., Ltd.) in accordance with JIS K7105.

The transparent film according to the invention produced in a manner as described above can be provided with a known adhesive and, then, used as a surface film for any one of various types of known display materials, or a polarizing plate is produced by using it and, then, the thus-produced polarizing plate can be used in a liquid crystal display device. On this occasion, an adhesive layer is provided on one face thereof and, then, arranged on an outermost surface of the display. When the transparent film according to the invention is used as a polarizing plate, it is preferably used as at least one of two protective films which sandwich a polarizing film from both sides in the polarizing plate.

By allowing the above-described film according to the invention to simultaneously serve as the protective film, a production cost for the polarizing plate can be reduced. Further, particularly, by using the antireflection film according to the invention as an outermost layer of the image display device, the polarizing plate which prevents mirroring the outside light thereon and, also, is excellent in scratch resistance, brittleness, and anti-fouling property can be prepared.

When the polarizing plate is formed by using the transparent film according to the invention as at least one of two protective films for the polarizing film, it is preferable to improve an adhesion property at an adhesive face, by allowing a face opposite to a side having a functional layer of the transparent support in each film, namely, a face at the side to which the hydrophilic polarizing film is laminated to be made hydrophilic.

[Saponification Treatment]

When the transparent film according to the invention is used in the liquid crystal display device, an adhesive layer is provided on one face of the transparent film and, then, arranged on an outermost surface of the display. Further, the transparent film according to the invention may be used in combination with the polarizing plate. When the transparent base material is made of triacetyl cellulose, since triacetyl cellulose is used as a protective film which protects the polarizing layer, of the polarizing plate, it is preferable from the standpoint of cost to use the antireflection film according to the invention as the protective film as it is.

[Saponification Processing]

(1) Method of Dipping in Alkaline Liquid

It is a technique of dipping the transparent film according in an alkaline liquid under appropriate conditions and, then, subjecting all faces having reactivity with an alkali out of an entire surface of the film to an alkaline treatment. Since no special equipment is needed, it is advantageous from the standpoint of cost. The alkaline liquid is preferably sodium hydroxide. A concentration thereof is, preferably, from 0.5 to 3 mol/L and, particularly preferably, from 1 to 2 mol/L. A temperature of the alkaline liquid is, preferably, from 30 to 70° C. and, particularly preferably, from 40 to 60° C.

Combinations of the above-described saponification conditions are, preferably, made up with relatively mild conditions and set in accordance with raw materials and the constitution of the transparent film, and a targeted contact angle.

After the film is dipped in the alkaline liquid, it is preferable that the film is thoroughly rinsed with a sufficient amount of water such that an alkaline content does not remain in the film or the film is dipped in a diluted acid to be neutralized.

By subjecting the film to the saponification treatment, the antiglare layer of the transparent support or a surface opposite to the surface having the antireflection layer is made to be hydrophilic. The protective film for the polarizing plate uses the surface thus made to be hydrophilic after being bonded with the polarizing film.

The surface made to be hydrophilic is effective in improving the adhesion property with an adhesive layer containing polyvinyl alcohol as a main component.

As a contact angle against water on a surface of the transparent support at the side opposite to the side having the antiglare layer or the low refractive index layer is lower, the saponification treatment is more favorable from the standpoint of the adhesion property with the polarizing film. On the other hand, in the dipping method, since an alkaline damage is imparted to from a surface having the antiglare layer or the low refractive index layer into an inside portion, it is necessary to limit reaction conditions to be requisite minimum. When the contact angle against water on the transparent support on the surface of the opposite side is used as an indication of the alkaline damage to be put on each layer, particularly in a case in which the transparent support is made of triacetyl cellulose, the contact angle comes to be, preferably, from 10° to 50°, more preferably from 30° to 50° and, still more preferably, from 40° to 50°. In a case in which the contact angle is more than 50°, a problem is generated in the adhesion property with the polarizing film; therefore, the case is not preferred. On the other hand, in a case in which the contact angle is less than 10°, the damage to be put on the antireflection film comes to be unduly large to impair physical strength; therefore, the case is not preferred.

(2) Method of Applying Alkaline Liquid

As a countermeasure for evading the damage to each layer in the above-described dipping method, an alkaline liquid applying method in which the alkaline liquid is applied to only a surface opposite to a surface having the antiglare layer or the antireflection layer under an appropriate condition and, then, rinsed with water and, thereafter, dried is favorably used. Further, the term "applying" as used on this occasion is intended to mean allowing an alkaline liquid or the like to be in contact with only a face which is subjected to the saponification treatment and includes, in addition to such application, spraying, and contacting with a belt impregnated with the liquid. By adopting any one of these methods, since an apparatus for applying the alkaline liquid and the step for such performance are separately needed, this method in (2) is inferior to the dipping method described in (1). On one hand, since the alkaline liquid comes in contact only with the face which is subjected to the saponification treatment, a layer having a material vulnerable to the alkaline liquid can be provided on the face on the opposite side. For example, since a vapor deposition film or a sol-gel film is apt to receive various types of influences such as corrosion, dissolution, and peeling-off by the alkaline liquid, it is not desirous to provide any one of these layers in the dipping method, but any one of these layers can be used without any problem in this method, since it is not in contact with the alkaline liquid.

Since any one of the saponification methods described in (1) and (2) can be performed after each layer is formed while undoing the support in roll form, it can be added in the last of the above-described various types of film production steps and may be conducted in a series of operation. Further, a step of laminating with the polarizing plate made of the support which is undone can simultaneously be performed in a series of operation and, in such manner as described above, the polarizing plate can more efficiently be produced than performing similar operation on a sheet basis.

(3) Method of Protecting Antireflection Layer with Laminate Film and, then, Performing Saponification In a same manner as in the above-described (2), in a case in which the antiglare layer and/or the low refractive index layer has insufficient resistance against the alkaline liquid, after layers are formed up to the last layer, a laminate film is attached to the face in which the last layer is formed and, then, dipped in the alkaline liquid and, in such manner, only the face made of triacetyl cellulose which is at a side opposite to the face on which the last layer is formed is changed into hydrophilic and, thereafter, the laminate film can be peeled off. Also in this method, the hydrophilic treatment with such an extent as necessary as the protective film for the polarizing plate can be performed only on the face made of triacetyl cellulose opposite to the face on which the last layer is formed without giving any damage to the antiglare layer, and the low refractive index layer. When this method is compared with the method in (2), there is a disadvantage in that the laminate film becomes a waste, but there is an advantage in that a special apparatus for applying the alkaline liquid is not needed.

(4) Method of Dipping in Alkaline Liquid After Layers are Formed up to Antiglare Layer In a case in which layers up to the antiglare layer have resistance against the alkaline liquid but the low refractive index layer has insufficient resistance against the alkaline liquid, layers up to the antiglare layer are formed and, then, dipped in the alkaline liquid to subject both faces to the hydrophilic treatment and, thereafter, the low refractive index layer can be formed on the antiglare layer. Although the production process becomes complicated, when the low refractive index layer particularly contains a hydrophilic group, for example, as is in a fluorine-containing sol-gel film, there is an advantage in that an interlayer adhesion property between the antiglare layer and the low refractive index layer is improved.

(5) Method of Forming Antiglare Layer or Low Refractive Index Layer on Previously-Saponified Triacetyl Cellulose Film The triacetyl cellulose film is previously saponified by, for example, dipping it in the alkaline liquid and, then, the antiglare layer or the low refractive index layer may be formed on any one of the faces thereof directly or via another layer. When it is dipped in the alkaline liquid and saponified, there is a case in which an interlayer adhesion property between the antiglare layer or another layer and the triacetyl cellulose face which is made hydrophilic by being saponified is deteriorated. In order to cope with such a case as described above, after the saponification treatment is performed, a corona discharge, a glow discharge or the like is performed only on the face of the triacetyl cellulose film on which the antiglare layer or another layer is formed to remove the face which is made hydrophilic and, then, the antiglare layer or another layer is formed. Further, in a case in which the antiglare layer or another layer has a hydrophilic group, the interlayer adhesion property is sometimes favorable.

[Polarizing Plate]

The polarizing plate is constituted mainly with two protective films which sandwich the polarizing film from both sides. The transparent film according to the present invention is preferably used as at least one of two protective films (protective film for polarizing plate) which sandwich the polarizing film from both sides. The protective film for the polarizing plate is preferably has a contact angle in the range of from 10° to 50° against water on the surface of the transparent support at the side opposite to the side having the antiglare layer or the antireflection layer as described above, namely, on the surface thereof at the side to which the polarizing film is laminated.

By allowing the transparent film according to the invention to simultaneously serve as the protective film, a production cost of the polarizing plate can be reduced. Further, particularly, by using the antireflection film according to the invention in the outermost layer, for example, mirroring of the outside light on the display can be prevented, to thereby allow the polarizing plate to be excellent in, for example, the scratch resistance, and the anti-fouling property.

[Optical Compensation Layer]

An optical compensation film is a film containing an optical compensation layer having an optical anisotropy on a transparent support. The transparent support can utilize that used in the above-described transparent film or the like.

By providing the optical compensation layer (phase difference layer) in the polarizing plate, a visual angle property of the liquid crystal display screen can be improved.

As for the optical compensation layer, a known article in the art can be used but, from the standpoint of widening the visual angle, the optical compensation layer, containing a layer having an optical anisotropy containing a compound having a discotic structure unit, which is characterized in that an angle formed between such discotic compound and the transparent support changes with the distance from the transparent support is preferred.

The angle is preferably increases with the increase of the distance from the side of the transparent support face of the optical anisotropy layer containing the discotic compound.

When the optical compensation layer is used as the protective film for the polarizing plate, it is preferable that a surface at the side to which the polarizing film of the optical compensation film is laminated is subjected to the saponification treatment and, further, the saponification treatment is performed in accordance with the above-described saponification treatment.

[Polarizing Film]

As for the polarizing film, a known polarizing film, or a polarizing film cut out from a lengthy polarizing film in which an absorption axis of the polarizing film is neither parallel nor perpendicular to a longitudinal direction may be used. The lengthy polarizing film in which absorption axis of the polarizing film is neither parallel nor perpendicular to the absorption axis of the polarizing film can be prepared as described below.

Namely, the polarizing film in which a continuously supplied optical polymer film is stretched by imparting tension thereto while holding both edges thereof by holding devices can be produced by a stretching method, which contains (i) stretching the film at least in a width direction thereof at a stretch ratio of 1.1 to 20.0, (ii) adjusting the difference in longitudinal advancing speed between the holding devices on both edges of the film to be within 3%, and (iii) bending the advancing direction of the film in the state that both edges thereof are held such that the advancing direction of the film at an outlet of the step of holding both edges of the film is inclined at an angle of 20 to 70° to a substantial stretching direction of the film. Particularly, from the standpoint of productivity, that inclined at an angle of 45° is favorably used.

The stretching method of the polymer film is described in detail in JP-A No. 2002-86554, paragraphs [0020] to [0030].

<Liquid Crystal Display Device>

The transparent film according to the invention can be applied to an image displaying apparatus, such as a liquid crystal display (LCD) device, a plasma display panel (PDP), an electro-luminescence display (ELD) and a cathode ray tube (CRT) display device. Since the transparent film according to the invention has a transparent support, it is used by allowing the transparent support side to adhere to the image display surface of the image displaying apparatus.

In the case in which the transparent film according to the invention is used on one side of surface protective films of a polarizing plate, it can favorably be used in a transmission, reflective or semi-transmission liquid crystal display device of such a mode as twisted nematic (TN), super twisted nematic (STN), vertical alignment (VA), in-plane switching (IPS) and optically compensated bend (OCB) cell. Particularly, for an application of a large-sized liquid crystal television set or the like, it can favorably be used in modes of VA, IPS, OCB and the like. For an application of a medium-, or small-sized display device having a low fineness, it can favorably be used in modes of TN, STN and the like. For an application of a large-sized liquid crystal television set or the like, it can particularly favorably be used in a mode having a display screen having a diagonal width of 20 inches or more and a fineness of xGA or less (1024×768 or less in display device having aspect ratio of 3:4).

The transparent film according to the invention is preferably free from an inner haze and, on this occasion, when it is used for the display screen is of 20 inches and has a fineness of more than XGA (1024×768 or less in display device having aspect ratio of 3:4), glittering is more than a tolerance and, accordingly, when glittering is seriously taken into consideration, it is not favorably used. Further, since extent of the glittering is based on a relation between largeness of pixel and surface unevenness profile of the transparent film, when the size of the display device comes to be 30 inches, fineness thereof can favorably used up to a level of UXGA (1600× 1200 in display device having aspect ratio of 3:4) or less and, when the size of the display device comes to be 40 inches, fineness thereof can favorably used up to a level of QXGA (2048×1536 in display device having aspect ratio of 3:4) or less.

Examples of the liquid crystal cell of the VA mode include (1) a VA mode liquid crystal cell in a strict meaning, in which rod-like liquid crystal molecules are substantially aligned vertically upon applying no voltage and are substantially aligned horizontally upon applying a voltage (as described in JP-A NO. 2-176625) and, further, include (2) a liquid crystal cell with multidomain of VA mode (MVA mode) for enhancing the viewing angle (as described in SID97, Digest of Tech. Papers (preprints), vol. 28, p. 845 (1997)), (3) a liquid crystal cell of such a mode that rod-like liquid crystal molecules are substantially aligned vertically upon applying no voltage and are aligned in twisted multidomain (n-ASM mode) (as described in preprints of Symposium on Liquid Crystals, Japan, pp. 58 to 59 (1998)), and (4) a liquid crystal cell of SURVAIVAL mode (as announces in LCD International 98).

For the liquid crystal cell of VA mode, a polarizing plate prepared by a combination of a biaxially-stretched triacetyl cellulose film and the antireflection film according to the invention is favorably be used. As for the method for producing the biaxially-stretched triacetyl cellulose film, methods as described in JP-A Nos. 2001-2492223, 2003-170492 and the like can favorably be employed.

The liquid crystal cell of the OCB mode is a liquid crystal display apparatus using a liquid crystal cell of bend orientation mode, in which rod-like liquid crystal molecules are aligned in opposite directions (symmetrically) in an upper part and a lower part of the liquid crystal cell, and disclosed in U.S. Pat. Nos. 4,583,825 and 5,410,422. The liquid crystal cell of bend orientation mode has an optically self-compensation function owing to the rod-like liquid crystal molecules being symmetrically aligned in an upper part and a lower part of the liquid crystal cell. Therefore, the liquid crystal mode is referred to as an OCB (optically compensatory bend) liquid crystal mode. The liquid crystal display apparatus of the bend orientation mode advantageously has a high response speed.

In the TN mode liquid crystal cell, rod-like liquid crystal molecules are substantially aligned horizontally upon applying no voltage, which is most frequently utilized in a color TFT liquid crystal display apparatus and disclosed in many literatures. For example, it is disclosed in "EL, PDP and LCD Displays" published by Toray Research Center Co., Ltd. (2001).

In a liquid crystal display apparatus of the TN mode or the IPS mode, it is particularly preferred that, among two protective films on both surfaces, an optical compensating film having a viewing angle enhancing effect is used as one of the protective films opposite to the transparent film according to the invention, in which by such a polarizing plate can be obtained that simultaneously has the antireflection effect and the viewing angle enhancing effect with the thickness of only one polarizing plate.

In the ECB mode liquid crystal cell, rod-like liquid crystal molecules are substantially aligned horizontally upon applying no voltage, which is most frequently utilized in a color TFT liquid crystal display apparatus and disclosed in many literatures. For example, it is disclosed in "EL, PDP and LCD Displays" published by Toray Research Center Co., Ltd. (2001).

EXAMPLES

Example 1

Hereinafter, the present invention will be further described in the following examples, but the scope of the present invention should not be interpreted only by these examples.

(Preparation of Applying Liquid for Hard Coat Layer)

Compositions as described below was filled in a mixing tank and, then, stirred, to thereby prepare an applying liquid for a hard coat layer.

750.0 parts by weight of trimethylolpropane triacrylate (Viscoat 295: trade name; produced by Osaka Organic Chemical Industry Ltd.), 270.0 parts by mass of polyglycidyl methacrylate (mass average molecular weight: 15,000), 730.0 parts by mass of methyl ethyl ketone, 500.0 parts by mass of cyclohexanone, and 50.0 parts by mass of a photopolymerization initiator (Irgacure 184, produced by Ciba Specialty Chemicals, Ltd.) were mixed, stirred and, then, filtrated with a filter made of polypropylene and having pores of 0.4 μm in diameter, to prepare an applying liquid for the hard coat layer. Polyglycidyl methacrylate was obtained by firstly dissolving glycidyl methacrylate (Tokyo Kasei Kogyo Co., Ltd.) in methyl ethyl ketone (MEK) and, then, allowing the resultant mixture to react with heat polymerization initiator V-65 (trade name; available from Wako Pure Chemical Industries, Ltd.) while the latter was added dropwise at 80° C. for 2 hours and, thereafter, adding the resultant reaction solution in hexane dropwise to generate a precipitation which is, then, obtained by vacuum drying.

(Preparation of Titanium Dioxide Fine Particles Dispersion)

As for titanium dioxide fine particles, titanium dioxide fine particles containing cobalt and subjected to a surface treatment using aluminum hydroxide and zirconium hydroxide (MPT-129: trade name; produced by ISHIARA SANGYO KAISHA, LTD.; $TiO_2:Co_3O_4:Al_2O_3:ZrO_2=90.5:3.0:4.0:0.5$ in terms of weight ratio) was used. To 257.1 parts by mass of the aforementioned fine particles, were added 41.1 parts by mass of the dispersant described below, and 701.8 parts by mass of cyclohexanone. The resultant mixture was, then, subjected to dispersion using a dynomill, to thereby prepare a dispersion of titanium dioxide having a weight average diameter of 70 nm.

Dispersant

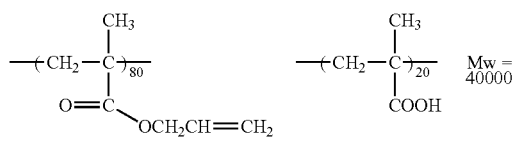

(Preparation of Applying Liquid for Medium Refractive Index Layer)

To 99.1 parts by mass of the aforementioned titanium dioxide dispersion, were added 68.0 parts by mass of a mixture of dipentaerythritol pentaacrylate and dipentaerythritol hexaacrylate (DPHA; produced by Nippon Kayaku Co., Ltd.), 3.6 parts by mass of a photopolymerization initiator (Irgacure 907: trade name; produced by Ciba Specialty Chemicals, Limited), 1.2 part by mass of a photosensitizer (Kayacure DETX: trade name; manufactured by Nippon Kayaku Co., Ltd.), 279.6 parts by mass of methyl ethyl ketone, and 1049.0 parts by mass of cyclohexanone. The resultant mixture was stirred and, then, after being thoroughly stirred, filtered through a filter made of polypropylene having pores of 0.4 μm in diameter, to thereby prepare an applying liquid for a medium refractive index layer.

(Preparation of Applying Liquid for High Refractive Index Layer)

To 469.8 parts by mass of the aforementioned titanium dioxide dispersion, were added 40.0 parts by mass of a mixture of dipentaerythritol pentaacrylate and dipentaerythritol hexaacrylate (DPHA; produced by Nippon Kayaku Co., Ltd.), 3.3 parts by mass of a photopolymerization initiator (Irgacure 907: trade name; produced by Ciba Specialty Chemicals, Limited), 1.1 part by mass of a photosensitizer (Kayacure DETX: trade name; manufactured by Nippon Kayaku Co., Ltd.), 526.2 parts by mass of methyl ethyl ketone, and 459.6 parts by mass of cyclohexanone. The resultant mixture was stirred and, then, filtered through a filter made of polypropylene having pores of 0.4 μm in diameter, to thereby prepare an applying liquid for a high refractive index layer.

(Preparation of Applying Liquid for Low Refractive Index Layer)

A copolymer P-3, described herein, according to the invention was dissolved in methyl isobutyl ketone such that a resultant mixture has a concentration of 7% by mass and, then, 3%, based on the solid content of the mixture, of terminal methacrylate group-containing silicone resin X-22-164C (trade name; produced by Shin-Etsu Chemical Co., Ltd.) and 5% by mass (however, 10% by mass only in Sample No. 112), based on the solid content of the mixture, of the aforementioned photoradical generator Irgacure 907 (trade name) were added to the mixture, to thereby prepare an applying liquid for a low refractive index layer.

(Preparation of Antireflection Film 101)

The aforementioned applying liquid for hard coat layer was applied to a triacetyl cellulose film having a film thickness of 80μ (trade name: TD80U; manufactured by Fuji Photo Film Co Ltd.) by using a gravure coater and dried at 100° C. and, then, while performing a nitrogen purging such that an oxygen concentration in the atmosphere came to be 1.0% by volume, an ultraviolet ray was then applied to the coating layer at an illuminance of 400 mW/cm$^2$ and an irradiation dose of 300 mJ/cm$^2$ by using a 160 W/cm air-cooled metal halide lamp (manufactured by Eye Graphics Co., Ltd.) to cure the coating layer, to thereby form a hard coat layer having a thickness of 8 μm.

On the hard coat layer, an applying liquid for a medium refractive index layer, an applying liquid for a high refractive index layer, and an applying liquid for a low refractive index layer were continuously applied by using a gravure coater having 3 applying stations at an applying speed of 5 to 100 m/minute.

Drying conditions of the medium refractive index layer were set to be 90° C. for 30 seconds. Ultraviolet ray curing conditions were set that, while performing a nitrogen gas purging such that an oxygen concentration in the atmosphere came to 1.0% by volume, irradiation was performed at an illuminance of 200 mW/cm$^2$ and an irradiation dose of 200 mJ/cm$^2$ by using a 180 W/cm air-cooled metal halide lamp (manufactured by Eye Graphics Co., Ltd.). The medium refractive index layer after curing had a refractive index of 1.630 and a film thickness of 67 nm.

Drying conditions of the high refractive index layer were set to be 90° C. for 30 seconds. Ultraviolet ray curing conditions were set that, while performing a nitrogen gas purging such that an oxygen concentration in the atmosphere came to 1.0% by volume, irradiation was performed at an illuminance of 600 mW/cm$^2$ and an irradiation dose of 400 mJ/cm$^2$ by using a 240 W/cm air-cooled metal halide lamp (manufactured by Eye Graphics Co., Ltd.). The high refractive index layer after curing had a refractive index of 1.905 and a film thickness of 107 nm.

Drying conditions of the low refractive index layer were set to be 90° C. for 30 seconds. Ultraviolet ray curing conditions were set that, while performing a nitrogen gas purging (using nitrogen gas at 1.40 m$^3$/minute in a reaction chamber of 0.2 m$^3$) such that an oxygen concentration in the reaction chamber came to 0.1% by volume, irradiation was performed at an illuminance of 200 mW/cm$^2$ and an irradiation dose of 200 mJ/cm$^2$ by using a 240 W/cm air-cooled metal halide lamp (manufactured by Eye Graphics Co., Ltd.). The low refractive index layer after curing had a refractive index of 1.440 and a film thickness of 85 nm. In such a manner as described above, the antireflection film 101 was prepared.

Samples 102 to 117 were prepared by changing types of initiators and curing conditions for the low refractive index into those shown in Table 2. An amount of the initiator was replaced in terms of weight equivalent. Blowing of the nitrogen gas was performed such that a connected preceding chamber is provided in front of the UV irradiation chamber (the reaction chamber) and, then, a position of a nozzle was adjusted such that the inert gas directly hit a film face. Further, discharge of the gas from the UV irradiation chamber and the preceding chamber were adjusted such that the inert gas can be blown off from a web entrance of the preceding chamber. A gap between the web entrance and a surface of applying layer of the web was set to be 4 mm. Further, an irradiation dose of the ultraviolet ray was arranged to be constant by changing the illuminance even when the applying speed was changed.

TABLE 2

| Sample No. | Initiator species | Presence or absence of preceding room and N₂ gas blow | N₂ gas blowing amount (m³/min) | N₂ gas amount for purging reaction chamber (m³/min) | Oxygen concentration at the time of UV irradiation (%) | Time for holding oxygen at low level from start of UV irradiation (sec) | Remarks |
|---|---|---|---|---|---|---|---|
| 101 | Irgacure 907 | Absent | 0 | 1.40 | 0.1 | 0.5 | Comparative Example |
| 102 | Irgacure 907 | Present | 0.2 | 1.40 | 0.08 | 0.5 | Comparative Example |
| 103 | Irgacure 907 | Present | 0.2 | 1.40 | 0.08 | 1 | Comparative Example |
| 104 | Irgacure 907 | Present | 0.5 | 1.40 | 0.07 | 1 | Comparative Example |
| 105 | Illustrative compound 6 | Absent | 0 | 1.40 | 0.1 | 0.5 | Example |
| 106 | Illustrative compound 6 | Present | 0.2 | 1.40 | 0.08 | 0.5 | Example |
| 107 | Illustrative compound 6 | Present | 0.2 | 1.40 | 0.08 | 1 | Example |
| 108 | Illustrative compound 6 | Present | 0.5 | 1.40 | 0.07 | 1 | Example |
| 109 | Illustrative compound 6 | Absent | 0 | 1.40 | 0.15 | 1 | Example |
| 110 | Illustrative compound 6 | Present | 0.2 | 1.0 | 1 | 1 | Example |
| 111 | Illustrative compound 6 | Present | 0.2 | 0.7 | 2 | 1 | Example |
| 112 | Illustrative compound 6 | Present | 0.2 | 1.40 | 0.08 | 1 | Example |
|  | (usage: 10% by mass) |  |  |  |  |  |  |
| 113 | Illustrative compound 8 | Present | 0.2 | 1.40 | 0.08 | 1 | Example |
| 114 | Illustrative compound 10 | Present | 0.2 | 1.40 | 0.08 | 1 | Example |
| 115 | Illustrative compound 29 | Present | 0.2 | 1.40 | 0.08 | 1 | Example |
| 116 | Illustrative compound 35 | Present | 0.2 | 1.40 | 0.08 | 1 | Example |
| 117 | Illustrative compound 36 | Present | 0.2 | 1.40 | 0.08 | 1 | Example |

Further, the above-described illustrative compound 6 has already been described herein. Particularly, the illustrative compound 6 is shown below again.

(Illustrative Compound 6)

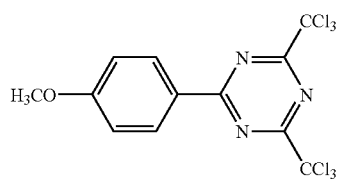

The obtained films were evaluated on items described below. The results are shown in Table 3.

[Specular Reflectivity]

A specular reflectivity at an outgoing angle of light of −5° against an incidence angle of 5° in a wavelength region of 380 to 780 nm was measured with a spectrophotometer V-550 (from JASCO Corp.) equipped with an adapter ARV-474. An average reflectivity in a range of from 450 to 650 nm was calculated to evaluate antireflection performance.

[Pencil Hardness]

A pencil hardness evaluation as described in JIS K 5400 was performed. The antireflection film was subjected to humidity conditioning at a temperature of 25° C. and a humidity of 60% RH for 2 hours, tested under a load of 500 g using H to 5H test pencils as defined by JIS S6006, and then evaluated according to the following criterion under the condition that highest hardness which came to be "OK" was set to be evaluation value:

in the evaluation of n=5: no scratch to one scratch: OK
in the evaluation of n=5: 3 scratches or more: NG
1.96 N/cm² of load was put on #0000 steel wool and, then, subjected to 30 reciprocations. Extent of scratches were observed and was evaluated by the following 5 steps:

double circles: scratch was not observed at all
small-circle: almost unvisible scratches were slightly observed;
triangle: distinct scratches were observed;
cross: distinct scratches were remarkable; and
double crosses: peeling-off of film was generated.

TABLE 3

| Sample No. | Reflectivity (%) | Pencil hardness | Steel wool resistance | Remarks |
|---|---|---|---|---|
| 101 | 0.32 | 2 H | XX | Comparative Example |
| 102 | 0.32 | 2 H | XX | Comparative Example |
| 103 | 0.32 | 2 H | X | Comparative Example |
| 104 | 0.32 | 2 H | X | Comparative Example |
| 105 | 0.32 | 3 H | ○ | Example |
| 106 | 0.32 | 3 H | ○○ | Example |
| 107 | 0.32 | 3 H~4 H | ○~○○ | Example |
| 108 | 0.32 | 4 H | ○○ | Example |
| 109 | 0.32 | 3 H | ○ | Example |
| 110 | 0.32 | 2 H~3 H | Δ~○ | Example |
| 111 | 0.32 | 3 H | ○○ | Example |
| 112 | 0.32 | 4 H | ○○ | Example |
| 113 | 0.32 | 3 H | ○ | Example |
| 114 | 0.32 | 3 H | ○ | Example |
| 115 | 0.32 | 3 H | ○ | Example |
| 116 | 0.32 | 3 H | ○ | Example |
| 117 | 0.32 | 3 H | ○ | Example |

It is found that, by using an active halogen compound and, further, by performing curing under the curing conditions according to the invention, the antireflection film is excellent in scratch resistance although having a sufficient antireflection performance. By performing nitrogen-blowing, even when the oxygen concentration in the reaction chamber is same, the scratch resistance is excellent.

Example 2

Samples Nos. 118 to 126 were prepared by a same production method as in Samples Nos. 103, 107, and 112 in Example 1 except that the web temperature at the time of irradiating the ultraviolet ray was raised and evaluated.

The temperature of the applying surface of the web was adjusted by changing the temperature of a metal plate in contact with a reverse face of the web.

TABLE 4

| Sample No. | Temperature at the time of ultraviolet irradiation | Reflectivity (%) | Pencil hardness | Steel wool resistance | Remarks |
|---|---|---|---|---|---|
| 103 | No heating | 0.32 | 2 H | X | Comparative Example |
| 118 | 40° C. | 0.32 | 2 H | X | Comparative Example |
| 119 | 60° C. | 0.32 | 2 H~3 H | X | Comparative Example |
| 120 | 80° C. | 0.32 | 3 H | X~Δ | Comparative Example |
| 107 | No heating | 0.32 | 3 H~4 H | ○~○○ | Example |
| 121 | 40° C. | 0.32 | 3 H~4 H | ○~○○ | Example |
| 122 | 60° C. | 0.32 | 3 H~4 H | ○○ | Example |
| 123 | 80° C. | 0.32 | 4 H | ○○ | Example |
| 112 | No heating | 0.32 | 3 H~4 H | ○○ | Example |
| 124 | 40° C. | 0.32 | 4 H | ○○ | Example |
| 125 | 60° C. | 0.32 | 4 H | ○○ | Example |
| 126 | 80° C. | 0.32 | 4 H | ○○ | Example |

According to the invention, by raising the temperature at the time of UV irradiation to 60° C. or more, a further favorable scratch resistance was obtained. Further, in Sample No. 112, by allowing the usage of the polymerization initiator to be 10% by weight, an excellent scratch resistance was obtained at a temperature as low as 40° C. without heating.

Example 3

Sample Nos. 127 to 130 as shown in Table 5 were prepared in a same manner as in Sample No. 10 in Example 1 except that divided number of ultraviolet irradiation, time period of ultraviolet irradiation and presence-absence of nitrogen replacement were changed. These Samples were evaluated in a same manner as in Example 1.

Further, in the division of the ultraviolet irradiation, illuminance was adjusted such that an entire irradiation dose came to be constant. The results are shown in Table 6.

It is found that, even when the ultraviolet irradiation was divided and illuminance per one irradiation was decreased, by allowing the oxygen concentration during the period of ultraviolet irradiation to be 3% by volume or less, deterioration of the scratch resistance was no more observed and there was a high-speed aptitude.

TABLE 5

| Sample No. | Division number of ultraviolet irradiation | Presence-absence of nitrogen purge during a period of ultraviolet irradiation | Oxygen concentration during a period of ultraviolet irradiation (%) | Remarks |
|---|---|---|---|---|
| 107 | One time | — | — | Example |
| 127 | Twice | Absent | 21% | Example |
| 128 | Twice | Present | 10 | Example |
| 129 | Twice | Present | 1% | Example |
| 130 | Twice | Present | 0.1% | Example |

TABLE 6

| Sample No. | Reflectivity (%) | Pencil hardness | Steel wool resistance | Remarks |
|---|---|---|---|---|
| 107 | 0.32 | 3 H~4 H | ○~○○ | Example |
| 127 | 0.32 | 3 H | Δ~○ | Example |
| 128 | 0.32 | 3 H | Δ~○ | Example |
| 129 | 0.32 | 3 H~4 H | ○~○○ | Example |
| 130 | 0.32 | 3 H~4 H | ○~○○ | Example |

Example 4

Sample Nos. 131 to 134 were produced by a same production method in Sample No. 112 except that the gap between the entrance of the preceding chamber and the web surface, and the flow of the nitrogen gas at the side of the entrance were changed and, further, the amount of the nitrogen gas for purging was adjusted such that the oxygen amount in the ultraviolet irradiation chamber came to be constant at 0.08% and, thereafter, evaluated in a same manner as in Example 1.

It is found that, by narrowing the gap and adjusting the discharged gas such that the nitrogen gas at the side of web entrance of the web was somewhat blown off, it became possible to maintain the concentration of oxygen at a low level with a small amount of the nitrogen gas.

TABLE 7

| Sample No. | Gap width | Direction of flow of gas at web entrance | $N_2$ gas amount for purging reaction chamber ($m^3$/minute) | Reflectivity (%) | Pencil hardness | Steel wool resistance | Remarks |
|---|---|---|---|---|---|---|---|
| 112 | 4 mm | Blowing out | 1.40 | 0.32 | 3 H~4 H | ○~○○ | Example |
| 131 | 10 mm | Blowing out | 1.70 | 0.32 | 3 H~4 H | ○~○○ | Example |
| 132 | 20 mm | Blowing out | 2.50 | 0.32 | 3 H~4 H | ○~○○ | Example |
| 133 | 4 mm | No flow | 1.50 | 0.32 | 3 H~4 H | ○~○○ | Example |
| 134 | 4 mm | Blowing in | 1.90 | 0.32 | 3 H~4 H | ○~○○ | Example |

Example 5

The fluorine-containing polymer used in the low refractive index layer in each of Examples 1 to 4 was replaced with P-1 or P-2 herein referred to (replaced at an equal mass) and evaluated in a same manner as in Examples 1 to 4, to thereby obtain a same effect as in Examples 1 to 4.

Example 6

Preparation of Applying Liquid for Hard Coat Layer

A composition as described below was filled in a mixing tank and stirred to prepare an applying liquid for a hard coat layer.

| Composition of applying liquid for hard coat layer | |
|---|---|
| DESOLITE KZ-7869 (zirconium fine particle-containing hard coat composition liquid: solid content: 60 wt %; zirconium fine particle content: 70 wt %; average particle diameter: about 20 nm; solvent composition: MIBK:MEK = 9:1; produced by JSR Corporation) | 100 parts by mass |
| DPHA (UV-curable resin; manufactured by Nippon Kayaku Co., Ltd.) | 31 parts by mass |
| KBM-5103 (silane coupling agent; produced by Shin-Etsu Chemical Co. Ltd.) | 10 parts by mass |
| KE-P150 (1.5 μm silica particles; produced by Nippon Shokubai Co., Ltd.) | 8.9 parts by mass |
| MXS-300 (3 μm cross-linked PMMA particles; produced by Soken Chemical & Engineering Co., Ltd.) | 3.4 parts by mass |
| Methyl ethyl ketone (MEK) | 29 parts by mass |
| Methyl isobutyl ketone (MIBK) | 13 parts by mass |

(Preparation of Applying Liquid for Low Refractive Index Layer)

An applying liquid for a low refractive index layer was prepared in a same manner as in Example 1.

(Preparation of Antireflection Film 601)

A transparent base material triacetyl cellulose film (trade name: TD80U; manufactured by Fuji Photo Film Co Ltd.) in roll form was undone, applied with the above-described applying liquid for the hard coat layer by using a microgravure roll having a diameter of 50 mm and having a gravure pattern having a line number of 135 lines/inch and a depth of 60 μm and a doctor blade under the condition of a transporting speed of 10 m/minute and, then, dried at 60° C. for 150 seconds and, thereafter, ultraviolet rays were applied to the coating layer at an illuminance of 400 mW/cm² and an irradiation dose of 250 mJ/cm² by using a 160 W/cm air-cooled metal halide lamp (manufactured by Eye Graphics Co., Ltd.) under nitrogen gas purging to cure the coating layer to form a hard coat layer which is, then, taken up. A rotation number of the gravure roll was adjusted such that the hard coat layer after curing had a thickness of 3.6 μm.

The transparent base material applied with the above-described hard coat layer in roll form was again undone, applied with the aforementioned applying liquid for the low refractive index layer by using a microgravure roll having a diameter of 50 mm and having a gravure pattern having a line number of 200 lines/inch and a depth of 30 μm and a doctor blade under the condition of a transporting speed of 10 m/minute and, then, dried at 90° C. for 30 seconds and, thereafter, ultraviolet rays were applied to the coating layer at an illuminance of 600 mW/cm² and an irradiation dose of 400 mJ/cm² by using a 240 W/cm air-cooled metal halide lamp (manufactured by Eye Graphics Co., Ltd.) to cure the coating layer to form a low refractive index layer which is, then, taken up. A rotation number of the gravure roll was adjusted such that the hard coat layer after curing had a thickness of 100 nm.

Sample Nos. 601 to 617 were obtained by replacing the curing conditions of the low refractive index layer by those described in Table 8.

TABLE 8

| Sample No. | Initiator species | Presence or absence of preceding room and N₂ gas blow | N₂ gas blowing amount (m³/min) | N₂ gas amount for purging reaction chamber (m³/min) | Oxygen concentration at the time of UV irradiation (%) | Time for holding oxygen at low level from start of UV irradiation (sec) | Remarks |
|---|---|---|---|---|---|---|---|
| 601 | Irgacure 907 | Absent | 0 | 1.40 | 0.1 | 0.5 | Comparative Example |
| 602 | Irgacure 907 | Present | 0.2 | 1.40 | 0.08 | 0.5 | Comparative Example |
| 603 | Irgacure 907 | Present | 0.2 | 1.40 | 0.08 | 1 | Comparative Example |
| 604 | Irgacure 907 | Present | 0.5 | 1.40 | 0.07 | 1 | Comparative Example |
| 605 | Illustrative compound 6 | Absent | 0 | 1.40 | 0.1 | 0.5 | Example |
| 606 | Illustrative compound 6 | Present | 0.2 | 1.40 | 0.08 | 0.5 | Example |
| 607 | Illustrative compound 6 | Present | 0.2 | 1.40 | 0.08 | 1 | Example |
| 608 | Illustrative compound 6 | Present | 0.5 | 1.40 | 0.07 | 1 | Example |
| 609 | Illustrative compound 6 | Absent | 0 | 1.40 | 0.15 | 1 | Example |
| 610 | Illustrative compound 6 | Present | 0.2 | 1.0 | 1 | 1 | Example |
| 611 | Illustrative compound 6 | Present | 0.2 | 0.7 | 2 | 1 | Example |
| 612 | Illustrative compound 6 (usage: 10% by mass) | Present | 0.2 | 1.40 | 0.08 | 1 | Example |
| 613 | Illustrative compound 8 | Present | 0.2 | 1.40 | 0.08 | 1 | Example |
| 614 | Illustrative compound 10 | Present | 0.2 | 1.40 | 0.08 | 1 | Example |
| 615 | Illustrative compound 29 | Present | 0.2 | 1.40 | 0.08 | 1 | Example |
| 616 | Illustrative compound 35 | Present | 0.2 | 1.40 | 0.08 | 1 | Example |
| 617 | Illustrative compound 36 | Present | 0.2 | 1.40 | 0.08 | 1 | Example |

These Samples were evaluated in a same manner as in Example 1 and the results are shown in Table 9.

It is found that, by the curing method according to the invention, an excellent scratch resistance was able to be obtained, while maintaining the antireflection property.

TABLE 9

| Sample No. | Reflectivity (%) | Pencil hardness | Steel wool resistance | Remarks |
|---|---|---|---|---|
| 601 | 1.50 | 2 H | XX | Comparative Example |
| 602 | 1.50 | 2 H | XX | Comparative Example |
| 603 | 1.50 | 2 H | X | Comparative Example |
| 604 | 1.50 | 2 H | X | Comparative Example |
| 605 | 1.50 | 3 H | ◯ | Example |
| 606 | 1.50 | 3 H | ◯◯◯ | Example |
| 607 | 1.50 | 3 H~4 H | ◯~◯◯ | Example |
| 608 | 1.50 | 4 H | ◯ | Example |
| 609 | 1.50 | 3 H | ◯ | Example |
| 610 | 1.50 | 2 H~3 H | Δ~◯ | Example |
| 611 | 1.50 | 3 H | ◯◯ | Example |
| 612 | 1.50 | 4 H | ◯◯ | Example |
| 613 | 1.50 | 3 H | ◯ | Example |
| 614 | 1.50 | 3 H | ◯ | Example |
| 615 | 1.50 | 3 H | ◯ | Example |
| 616 | 1.50 | 3 H | ◯ | Example |
| 617 | 1.50 | 3 H | ◯ | Example |

Example 7

The low refractive index layers of Examples 1 to 6 were replaced with the low refractive index layers A and B as described below and evaluated and, then, confirmed to have same effects according to the invention.

By using hollow silica particles, it was able to prepare an antireflective film having a low reflectivity which is further favorable in scratch resistance.

(Preparation of Sol Liquid a)

120 parts of methyl ethyl ketone, 100 parts of acryloyloxypropyl trimethoxysilane (KBM-5103: trade name; produced by Shin-Etsu Chemical Co., Ltd.), and 3 parts of diisopropoxyaluminum ethyl acetoacetate (Chelope EP-12: trade name; produced by Hope Chemical Co., Ltd.) were filled in a reactor equipped with a stirrer and a reflux condenser and mixed and, thereafter, added with 30 parts of ion-exchanged water and, then, allowed to react for 4 hours at 60° C. and, thereafter, cooled to room temperature, to thereby obtain a sol liquid a. The sol liquid a had a mass average molecular weight of 1600. Among components of oligomers or higher, components having a molecular weight of 1000 to 20000 were 100%. Further, from an analysis by gas chromatography, it is found that raw material acryloyloxypropyl trimethoxysilane did not remain at all therein.

(Preparation of Hollow Silica Fine Particle Dispersion)

500 parts of hollow silica fine particle sol (particle size: from about 40 μm to about 50 μm; shell thickness: from 6 to 8 nm; refractive index: 1.31; solid content: 20%; main solvent: isopropyl alcohol; prepared by changing the particle size in accordance with Preparation Example 4 described in JP-A No. 2002-79616) was added with 30 parts of acryloyloxypropyl trimethoxysilane (KBM-5103: trade name; produced by Shin-Etsu Chemical Co., Ltd.) and 1.5 part of diisopropoxyaluminum ethyl acetoacetate (Chelope EP-12: trade name; produced by Hope Chemical Co., Ltd.) and, then, mixed with one another and, thereafter, added with 9 parts of ion-exchanged water and, then, allowed to react for 8 hours at 60° C. and, thereafter, cooled to room temperature and, then, added with 1.8 part of acetyl acetone, to thereby obtain a hollow silica dispersion.

As for the thus-obtained hollow silica dispersion, the solid content was 18% by mass; the refractive index after the solvent was evaporated was 1.31.

(Preparation of Applying Liquid A for Low Refractive Index Layer)

| | |
|---|---|
| DPHA | 3.3 g |
| Hollow silica fine particle dispersion | 40.0 g |
| RMS-033 | 0.7 g |
| Illustrative compound 21 | 0.2 g |
| Sol liquid a | 6.2 g |
| Methyl ethyl ketone | 290.6 g |
| Cyclohexanone | 9.0 g |

(Preparation of Applying Liquid B for Low Refractive Index Layer)

| | |
|---|---|
| DPHA | 1.4 g |
| Copolymer P-3 | 5.6 g |
| Hollow silica fine particle dispersion | 20.0 g |
| RMS-033 | 0.7 g |
| Illustrative compound 21 | 0.2 g |
| Sol liquid a | 6.2 g |
| Methyl ethyl ketone | 306.9 g |
| Cyclohexanone | 9.0 g |

Compounds thus used are as follows:

KBM-5103: silane coupling agent (produced by Shin-Etsu Chemical Co. Ltd.);

DPHA: a mixture of dipentaerythritol pentaacrylate and dipentaerythritol hexaacrylate (manufactured by Nippon Kayaku Co., Ltd.); and RMS-033: reactive silicone (manufactured by Gelest).

Example 8

The low refractive index layers in Examples 1 to 7 were replaced by the low refractive index layers C and D and evaluated and confirmed to have same effects according to the invention. Further, OPSTAR JN7228A of the low refractive index layer C was replaced by JTA113 (JSR Corporation) which has a higher degree of cross-linking than the former one on a same weight basis and evaluated and confirmed to have same effects.

(Preparation of Sol Liquid a)

120 parts of methyl ethyl ketone, 100 parts of acryloyloxypropyl trimethoxysilane (KBM-5103: trade name; produced by Shin-Etsu Chemical Co., Ltd.), and 3 parts of diisopropoxyaluminum ethyl acetoacetate (Chelope EP-12: trade name; produced by Hope Chemical Co., Ltd.) were filled in a reactor equipped with a stirrer and a reflux condenser and mixed and, thereafter, added with 30 parts of ion-exchanged water and, then, allowed to react for 4 hours at 60° C. and, thereafter, cooled to room temperature, to thereby obtain a sol liquid a. The sol liquid a had a mass average molecular weight of 1800. Among components of oligomers or higher, components having a molecular weight of 1000 to 20000 were 100%. Further, from an analysis by gas chromatography, it is found that raw material acryloyloxypropyl trimethoxysilane did not remain at all therein.

(Preparation of Applying Liquid C for Low Refractive Index Layer)

| | |
|---|---|
| Thermally cross-linkable fluorine-containing JN-7228 for thermocuring + ionizing radiation curing system (6%-methyl ethyl ketone (MEK)) | 50.9 g |
| MEK-ST-L (30.0%/MEK) | 5.4 g |
| Sol liquid a (29%/MEK) | 2.5 g |
| Initiator: illustrative compound 21 (2.0%/MEK) | 2.8 g |
| Methyl ethyl ketone | 38.4 g |
| Cyclohexanone | 2.8 g |

By an addition of the above-described composition, an applying liquid for a low refractive index layer was prepared.

(Preparation of Applying Liquid D for Low Refractive Index Layer)

| | |
|---|---|
| Copolymer P-43 for thermocuring + ionizing radiation curing system (30%/MEK) | 20.1 g |
| MEK-ST-L (30.0%/MEK) | 5.4 g |
| Sol liquid a (29%/MEK) | 2.5 g |
| Cymel 303 (10.0%/MEK) | 5.3 g |
| Catalyst 4050 (1.0%/MEK) | 5.1 g |
| Initiator: illustrative compound 21 (2.0%/MEK) | 2.8 g |
| Methyl ethyl ketone | 54.6 g |
| Cyclohexanone | 2.8 g |

By an addition of the above-described composition, an applying liquid for a low refractive index layer was prepared.

JN-7228: thermally cross-linkable fluorine-containing polymer (refractive index: 1.42; solid content: 6%; produced by JSR Corporation)

JTA-113: thermally cross-linkable fluorine-containing polymer (refractive index: 1.44; solid content: 6%; produced by JSR Corporation)

MEK-ST-L: silica sol (silica, similar to MEK-ST but having a different particle size: average particle diameter: 45 nm; solid content: 30%; produced by Nissan Chemical Industries, Ltd.)

Cymel 303: methylol-modified melamine (produced by Nihon Cytec Industries, Ltd.)

Catalyst 4050: trimethyl ammonium salt of p-toluene sulfonic acid (produced by Nihon Cytec Industries, Ltd.)

The above-described applying liquids C and D for low refractive index layers were each applied by using a microgravure roll having a diameter of 50 mm and having a gravure pattern having a line number of 200 lines/inch and a depth of 30 μm and a doctor blade under the condition of a transporting speed of 10 m/minute and, then, dried at 120° C. for 150 seconds and, thereafter, ultraviolet rays were applied to the coating layer at an illuminance of 400 mW/cm$^2$ and an irradiation dose of 450 mJ/cm$^2$ by using a 160 W/cm air-cooled metal halide lamp (manufactured by Eye Graphics Co., Ltd.) under nitrogen gas purging to cure the coating layer to form a low refractive index layer which is, then, taken up. A rotation number of the gravure roll was adjusted such that the low refractive index layer after curing had a thickness of 100 nm.

Example 9

Preparation of Protective Film for Polarizing Plate

A saponification liquid in which a 1.5 mol/L aqueous solution of sodium hydroxide was heated at 50° C. was prepared. Further, a 0.005 mol/L aqueous solution of diluted sulfuric acid was prepared.

A surface of the transparent base material at a side reverse to a side having a low refractive index layer in each of the antireflection films according to the invention prepared in Examples 1 to 8 was subjected to a saponification treatment.

After the aqueous sodium hydroxide solution on the surface of the resultant transparent base material was thoroughly rinsed off with water, the surface was rinsed with the above-described diluted aqueous solution of sulfuric acid and, then, sufficiently dried at 100° C.

When a contact angle of the surface of the transparent base material subjected to the saponification treatment at the side reverse to the side having the low refractive index layer of the antireflection film against water is evaluated, it was 40° or less. In such manner as described above, the protective film for the polarizing plate was prepared.

(Preparation of Polarizing Plate)

A polyvinyl alcohol film having a film thickness of 75 μm (produced by Kuraray Co., Ltd.) was dipped in an aqueous solution containing 1000 parts by mass of water, 7 parts by mass of iodine and 105 parts by mass of potassium iodide for 5 minutes to allow it to adsorb iodine.

Next, after the resultant film was monoaxially stretched in a vertical direction by 4.4 times in a 4% by mass aqueous solution of boric acid, the film was dried while being extended, to thereby prepare a polarizing film.

By using a polyvinyl alcohol type adhesive, the triacetyl cellulose face subjected to the saponification treatment of the antireflection film (protective film for polarizing plate) according to the invention was laminated on one face of the polarizing film and, further, by using the same polyvinyl alcohol type adhesive, the triacetyl cellulose film subjected to the saponification treatment similarly to the above was laminated on the other face of the polarizing film.

(Evaluation of Image Display Device)

Liquid crystal display device of transmission type, reflection type or a semi-transmission type of TN, STN, IPS, VA, or OCB mode in which the resultant polarizing plate according to the invention was provided such that the antireflection film came to be on the outermost surface thereof had a remarkable effects.

Example 10

Preparation of Polarizing Plate

In the optical compensation film having the optical compensation layer (Wideview film SA 12B; available from Fuji Photo Film Co., Ltd.), a surface at the side opposite to the side having the optical compensation layer was subjected to the saponification treatment in a same manner as in Example 9.

By using a polyvinyl alcohol type adhesive, the triacetyl cellulose face subjected to the saponification treatment of any one of the antireflection films (protective film for polarizing plate) according to the invention prepared in Examples 1 to 7 was laminated on one face of the polarizing film prepared in Example 9 and, further, by using the same polyvinyl alcohol type adhesive, the triacetyl cellulose film of the optical compensation film subjected to the saponification treatment similarly to the above was laminated on the other face of the polarizing film.

(Evaluation of Image Display Device)

Liquid crystal display device of transmission type, reflection type or a semi-transmission type of TN, STN, IPS, VA, or OCB mode in which the resultant polarizing plate according to the invention was provided such that the antireflection film came to be on the outermost surface thereof had a better contrast in a bright room than the liquid crystal display device provide with the polarizing plate having no optical compensation film and had a wider viewing angle in up and down, and right and left directions and, further, was excellent in the antireflection property and, still further, excellent in visibility and display quality. Particularly, such effects and excellence were conspicuous in VA mode thereof.

Example 11

In the preparation method of the antireflection film in Example 1, the composition of applying liquid for the low refractive index layer was replaced by that as described below and was applied at a applying speed of 25 m/min by using the die coater as described below and, then, dried at 90° C. for 30 seconds. The coated layer was cured by irradiating with an ultraviolet ray while the atmosphere is purged with a nitrogen gas such that an oxygen concentration in the atmosphere came to be 0.1% by volume or less by using an air-cooled metallic halide lamp of 240 W/cm (produced by Eye graphics Co., Ltd.) at an illuminance of 600 mW/cm$^2$ with an irradiation dose of 400 mJ/cm$^2$, to thereby form a low refractive index layer (refractive index: 1.45; film thickness: 83 nm). In the above-described manner, the antireflection film (11-1) was prepared.

Further, by replacing the applying liquid for the low refractive layer with LL-62 to 65, antireflection films (11-2) to (11-5) were prepared.

(Constitution of Die Coater)

The slot die 13 in which the upstream lip land length $I_{UP}$ is 0.5 mm, and the downstream lip land length $I_{LO}$ is 50 μm, the length in a web running direction of the opening of the slot is 150 μm, and the length of the slot 16 is 50 mm was used. The gap between the upstream side lip land 18a and the web 12 is allowed to be longer than the gap between the downstream side lip land 18b and the web 12 by 50 μm (hereinafter, referred to also as "overbite"), and the gap $G_L$ between the downstream lip land 18b and the web 12 was set to be 50 μm. Further, the gap $G_S$ between the side plate 40b of the reduced pressure chamber 40 and the web 12 and the gap $G_B$ between the backplate 40a and the web 12 were each set to be 200 μm.

(Preparation of Applying Liquid (L1-61) for Low Refractive Index Layer)

152.4 parts by mass of solution in which the fluorine-containing copolymer described below was dissolved in methyl ethyl ketone such that the resultant solution came to have a concentration of 23.7% by mass, 1.1 part by mass of terminal methacrylate group-containing silicone resin X-22-164C (produced by Shin-Etsu Chemical Co., Ltd.), 1.8 part by mass of active halogen compound (illustrative compound 6), 815.9 parts by mass of methyl ethyl ketone, and 28.8 parts by mass of cyclohexanone were mixed. The resultant mixture was, then, filtered through a filter made of PTFE having pores of 0.45 μm in diameter, to thereby prepare an applying liquid (LL-61) for a low refractive index layer. A viscosity of the applying liquid was 0.61 [mPa·sec] and a surface tension thereof was 24 [mN/m] and an amount of the applying liquid to be applied on the transparent support was 2.8 [ml/m$^2$].

Further, the viscosity of the applying liquid was measured in an atmosphere in which the temperature was 25° C.±° C. by using a small-sized vibration type viscometer (CJV5000: trade name; produced by A & Day Co., Ltd.). Further, the surface tension was measured in an atmosphere in which the temperature was 25° C. by using a surface tensiometer "KYOWA CBVP SURFACE TENSIOMETER A3" (trade name; available from Kyowa Interface Science Co., Ltd.).

Fluorine-Containing Copolymer

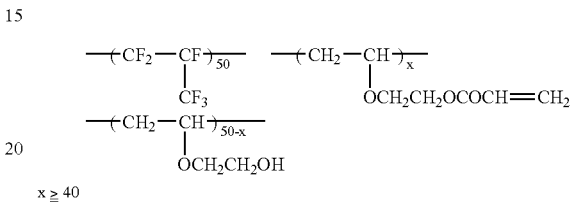

$x \geq 40$ (Preparation of Applying Liquid (LL-62) for Low Refractive Index Layer)

426.6 parts by mass of solution in which the above-described fluorine-containing copolymer was dissolved in methyl ethyl ketone such that the resultant solution came to have a concentration of 23.7% by mass, 3.0 parts by mass of terminal methacrylate group-containing silicone resin X-22-164C (produced by Shin-Etsu Chemical Co., Ltd.), 5.1 parts by mass of active halogen compound (illustrative compound 6), 538.6 parts by mass of methyl ethyl ketone, and 26.7 parts by mass of cyclohexanone were mixed. The resultant mixture was, then, filtered through a filter made of PTFE having pores of 0.45 μm in diameter, to thereby prepare an applying liquid (LL-62) for a low refractive index layer. A viscosity of the applying liquid was 1.0 [mPa·sec] and a surface tension thereof was 24 [mN/m] and an amount of the applying liquid to be applied on the transparent support was 1.5 [ml/m$^2$].

(Preparation of Applying Liquid (LL-63) for Low Refractive Index Layer)

213.3 parts by mass of solution in which the above-described fluorine-containing copolymer was dissolved in methyl ethyl ketone such that the resultant solution came to have a concentration of 23.7% by mass, 1.5 part by mass of terminal methacrylate group-containing silicone resin X-22-164C (produced by Shin-Etsu Chemical Co., Ltd.), 2.5 parts by mass of active halogen compound (illustrative compound 6), 754.3 parts by mass of methyl ethyl ketone, and 28.4 parts by mass of cyclohexanone were mixed. The resultant mixture was, then, filtered through a filter made of PTFE having pores of 0.45 μm in diameter, to thereby prepare an applying liquid (LL-63) for a low refractive index layer. A viscosity of the applying liquid was 0.76 [mPa·sec] and a surface tension thereof was 24 [mN/m] and an amount of the applying liquid to be applied on the transparent support was 2.0 [ml/m$^2$].

(Preparation of Applying Liquid (LL-64) for Low Refractive Index Layer)

85.3 parts by mass of solution in which the above-described fluorine-containing copolymer was dissolved in methyl ethyl ketone such that the resultant solution came to have a concentration of 23.7% by mass, 0.6 part by mass of terminal methacrylate group-containing silicone resin X-22-164C (produced by Shin-Etsu Chemical Co., Ltd.), 1.0 part by mass of active halogen compound (illustrative compound 6), 883.7 parts by mass of methyl ethyl ketone, and 29.3 parts by mass of cyclohexanone were mixed. The resultant mixture was, then, filtered through a filter made of PTFE having pores of 0.45 μm in diameter, to thereby prepare an applying liquid (LL-64) for a low refractive index layer. A viscosity of the applying liquid was 0.49 [mPa sec] and a surface tension thereof was 24 [mN/m] and an amount of the applying liquid to be applied on the transparent support was 5.0 [ml/m$^2$].

(Preparation of Applying Liquid (LL-65) for Low Refractive Index Layer)

71.1 parts by mass of solution in which the above-described fluorine-containing copolymer was dissolved in methyl ethyl ketone such that the resultant solution came to have a concentration of 23.7% by mass, 0.5 part by mass of terminal methacrylate group-containing silicone resin X-22-164C (produced by Shin-Etsu Chemical Co., Ltd.), 0.8 part by mass of active halogen compound (illustrative compound 6), 898.1 parts by mass of methyl ethyl ketone, and 29.5 parts by mass of cyclohexanone were mixed. The resultant mixture was, then, filtered through a filter made of PTFE having pores of 0.45 μm in diameter, to thereby prepare an applying liquid (LL-65) for a low refractive index layer. A viscosity of the applying liquid was 0.46 [mPa·sec] and a surface tension thereof was 24 [mN/m] and an amount of the applying liquid to be applied on the transparent support was 6.0 [ml/m$^2$].

Surface conditions at the time the applying liquids for low refractive index layers were changed into from LL-61 to LL-65 were evaluated. The results are shown in Table 10. An amount of the applying liquid on the transparent support was 2 ml/m$_2$ or more, although it was possible to apply the applying liquid, it was unable to evenly apply it all over the surface and, accordingly, an antireflection film was unable to be produced. Further, when an amount of the applying liquid to be applied on the transparent support was 6 ml/m$^2$, although it was possible to apply the applying liquid, since the amount thereof is large, it did not catch up with sufficient drying and, then, an unevenness condition based on vertical streaks caused by a wind appeared all over the surface.

[Evaluation of Antireflection Film]

Surface condition of the thus-obtained antireflection film was evaluated. Further, an average reflectivity was measure in a same manner as in Example 1.

(Surface Condition)

After a reverse face of the film having a size of 1 m$^2$ after all layers were applied was painted black with a black marker, unevenness of density of the applied face was visually evaluated under the following criteria:

double circles: unevenness of density was not recognized; and cross: unevenness of density was conspicuous.

When display devices were prepared by using the resultant antireflection films (11-1), (11-3), and (11-4) in same procedures as in Examples 9 and 10, color unevenness in these display devices showed smaller color unevenness and, accordingly, of higher quality, than those in Examples 9 and 10 which were prepared with a gravure coater.

TABLE 10

| Anti-reflection film | Applying liquid for low refractive index layer | Viscosity (mPa · sec) | Application amount (ml/m$^2$) | Applicability, yes-no | Surface condition of anti-reflection film | Reflectivity |
|---|---|---|---|---|---|---|
| 11-1 | LL-61 | 0.61 | 2.8 | ○ | ○ | 0.32% |
| 11-2 | LL-62 | 1 | 1.5 | X | X | (*) |
| 11-3 | LL-63 | 0.76 | 2.0 | ○ | ○ | 0.32% |
| 11-4 | LL-64 | 0.49 | 5.0 | ○ | ○ | (*) |
| 11-5 | LL-65 | 0.46 | 6.0 | ○ | X | 0.32% |

(*): Because of wide variation according to measuring points, evaluation was not made.

Example 12

Antireflection films (12-1) to (12-5) were prepared in a same manner as in the antireflection film (11-1) except that the lip land length $I_{LO}$ were changed to 10 μm, 30 μm, 70 μm, 100 μm, 120 μm, respectively. The results are shown in Table 11. It is found that the antireflection film having no problem in the surface condition was obtained with a downstream lip land length in the range of from 30 μm to 100 μm. In the antireflection film (12-1), a streak-like unevenness was generated in a longitudinal direction of a base. Further, in the antireflection film (12-5), the bead 14a was not formed at a same applying speed as in the antireflection film (12-1) and application was unable to be conducted. On this occasion, when the applying speed was reduced by half, application itself became possible; however, streak-like unevenness was generated in a longitudinal direction of the base. When the display device was prepared by using each of the antireflection films (12-2) to (12-4) in a same procedure as in Examples 9 and 10, mirroring in the display of the background was extremely small and color tint of reflected light was remarkably reduced and, accordingly, the display device, having an extremely high display quality, in which uniformity inside the display screen was secured, was obtained. On the other hand, when the display device was prepared by using each of the antireflection films (12-1) and (12-5) in a same manner as in Examples 9 and 10, color unevenness in the display device was visually recognized and, accordingly, the display device was not of high quality.

TABLE 11

| Anti-reflection film | Downstream lip land length $I_{LO}$ (μm) | Overbite length LO (μm) | Face condition of antireflection film | Resistivity |
|---|---|---|---|---|
| (12-1) | 10 | 50 | X | (*) |
| (12-2) | 30 | 50 | ○ | 0.32% |
| (12-3) | 70 | 50 | ○ | 0.32% |
| (12-4) | 100 | 50 | ○ | 0.32% |
| (12-5) | 120 | 50 | X | (*) |

(*): Because of wide variation according to measuring points, evaluation was not made.

Example 13

Antireflection films (13-1) to (13-5) were prepared in a same manner as in the antireflection film (11-1) except that the overbite length LO were changed to 0 μm, 30 μm, 70 μm, 120 μm, 150 μm, respectively. The results are shown in Table 12. It is found that the antireflection film having no problem in the surface condition was obtained with an overbite length in the range of from 30 μm to 120 μm. In the antireflection film (13-1), although application was possible, when the face condition was observed, an unevenness in steps was generated in a width direction of a base. Further, in the antireflection film (13-5), the bead 14a was not formed at a same applying speed as in the antireflection film (13-1) and application was unable to be conducted. On this occasion, when the applying speed wad reduced by half, application itself became possible; however, streak-like unevenness was generated in a longitudinal direction of the base. When the display device was prepared by using each of the antireflection films (13-2) to (13-4) in a same procedure as in Examples 9 and 10, mirroring in the display of the background was extremely small and color tint of reflected light was remarkably reduced and, accordingly, the display device, having an extremely high display quality, in which uniformity inside the display screen was secured, was obtained. On the other hand, when the display device was prepared by using each of the antireflection films (13-1) and (13-5) in a same manner as in Examples 9 and 10, color unevenness in the display device was visually recognized and, accordingly, the display device was not of high quality.

TABLE 12

| Anti-reflection film | Downstream lip land length $I_{LO}$ (μm) | Overbite length LO (μm) | Face condition of antireflection film | Resistivity |
|---|---|---|---|---|
| (13-1) | 50 | 0 | X | (*) |
| (13-2) | 50 | 30 | ○ | 0.32% |
| (13-3) | 50 | 70 | ○ | 0.32% |
| (13-4) | 50 | 120 | ○ | 0.32% |
| (13-5) | 50 | 150 | X | (*) |

(*): Because of wide variation according to measuring points, evaluation was not made.

Example 14

Hereinafter, the present invention will be further described in the following examples, but the scope of the present invention should not be interpreted only by these examples.

(Preparation of Applying Liquid for Hard Coat Layer (Antiglare Layer))

Compositions as described below was filled in a mixing tank and, then, stirred, to thereby prepare an applying liquid for a hard coat layer.

25.4 g of a mixture of dipentaerythritol pentaacrylate and dipentaerythritol hexaacrylate (DPHA; produced by Nippon Kayaku Co., Ltd.) was diluted with 31.3 g of methyl diisobutyl ketone and, then, added with 1.4 g of a polymerization initiator (Irgacure 184: trade name; produced by Ciba Specialty Chemicals, Limited) and, thereafter, mix-stirred. Subsequently, to the resultant mixture, 0.04 g or fluorine-type surface modifying agent (FP-149, herein described), and 5.2 g of silane coupling agent (KBM-5103: trade name; manufactured by Nippon Kayaku Co., Ltd.) were added and, then, the resultant mixture was stir-mixed for 120 minutes by using an air disper.

Lastly, the resultant mixture was added with 21.0 g of a 30% methyl isobutyl ketone dispersion of cross-linked poly (acrylic-styrene) particles (copolymerization composition ratios=50:50; refractive index: 1.536) having an average particle diameter of 3.5 μm which has been treated by a polytron homogenizer at 10000 rpm for 20 minutes, and 15 g of isobutyl alcohol and, then, the resultant mixture was treated by an air disper for 10 minutes.

In the present Example, the cross-linked poly(acrylic-polystyrene) particles correspond to optically transmissive particles according to the invention.

Against optically transmissive resin DPHA, ethyl isobutylo ketone is denoted as good solvent, while isobutyl alcohol is denoted as poor solvent.

(Preparation pf Transparent Film 1001)

An applying liquid for a hard coat layer was applied on a triacetyl cellulose film (TD80UF: trade name; produced by Fuji Photo Film Co., Ltd.) having a thickness of 80 μm by using a gravure coater. An amount of applying liquid was 17.5 mL/m$^2$ on a wet basis. After being dried at 100° C., the thus-applied layer was cured by irradiating with an ultraviolet ray while the atmosphere is purged with a nitrogen gas such that an oxygen concentration in the atmosphere came to be 0.1% by volume or less by using an air-cooled metallic halide lamp of 160 W/cm (produced by Eye graphics Co., Ltd.) at an illuminance of 400 mW/cm$^2$ with an irradiation dose of 300 mJ/cm$^2$, to thereby form a hard coat layer.

(Preparation of Transparent Films 1002 to 1008)

A transparent film was prepared in a similar manner as in Sample 1001 except for changing the size of the optically transmissive particle and the type of the initiator therein. An amount of the initiator was allowed to be same as that in Sample 1001 in terms of mole.

TABLE 13

| Sample No. | Initiator species | Average particle diameter of optically transmissive particle μm | Surface haze Hs (%) | Center line average roughness Ra (μm) | Remarks |
|---|---|---|---|---|---|
| 101 | Irgacure 184 | 3.5 | 7.5 | 0.20 | Comparative Example |
| 102 | Irgacure 184 | 1.5 | 3.0 | 0.06 | Comparative Example |
| 103 | Irgacure 184 | 0.4 | 1.8 | 0.01 | Comparative Example |
| 104 | Illustrative compound 6 | 3.5 | 7.5 | 0.20 | Example |
| 105 | Illustrative compound 10 | 3.5 | 7.5 | 0.20 | Example |
| 106 | Illustrative compound 29 | 3.5 | 7.5 | 0.20 | Example |
| 107 | Illustrative compound 35 | 3.5 | 7.5 | 0.20 | Example |
| 108 | Illustrative compound 36 | 3.5 | 7.5 | 0.20 | Example |

Further, the above-described illustrative compound 6 and the like are those as already described herein. Particularly, the illustrative compound 6 is repeatedly described below.

(Illustrative Compound 6)

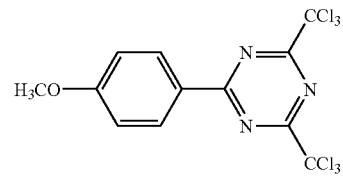

The thus obtained film was evaluated on the items described below.

[Measurement of Haze]

In accordance with measurements described below, a total haze (H), an inner haze (Hi), and a surface haze (Hs) of the thus-obtained film were measured.

[1] A total haze value (H) of the obtained film is measured in accordance with JIS-K7136.

[2] Silicone oil was added by a few drops on a surface and a reverse face of the obtained film and, then, the film was sandwiched by 2 glass plates each having a thickness of 1 mm and, thereafter, was measured on the haze value. Next, in a similar manner, only silicone oil was sandwiched between 2 glass plates and, then, measured of the haze value. Then, the former haze value was subtracted by the latter haze value and the remained value was determined as an inner haze (Hi).

[3] The value obtained by subtracting the inner haze (Hi) measured in [2] from the total haze [H] measured in [1] was determined as the surface haze (Hs).

[Center Line Average Roughness]

A center line average roughness Ra of the obtained film was measured in accordance with JIS B0601.

In the transparent film 1001 on which a hard coat layer was applied and, then, dried, a total haze H was 17.5%; an inner haze Hi was 10.0%; a surface haze Hs was 7.5%; and an Ra was 0.20 μm. Further, thickness of the hard coat layer was measured by using a film thickness meter and, was found to be 6.5 μm.

[Adhesion Test]

On a hard coat surface, lines were inscribed with intervals of 1 mm×1 mm with a cutter-knife such that 100 squares were formed and CELLOTAPE® (pressure sensitive tape; No. 405: type; produced by Nichiban) was attached to the 100 squares and, left to stand for 30 seconds and, then, the tape was peeled off and behaviors of 100 squares were observed and the number of squares which were peeled off, or damaged (partially peeled off) was counted.

[Brittleness Test]

The transparent film sample was cut into pieces each having sizes of 35 mm×140 mm which were, then, left to stand for 2 hours in an atmosphere having a temperature of 25° C. and a humidity of 60% RH for moisture conditioning and, thereafter, wound in a cylindrical shape. A diameter of curvature at the time of start of generating a crack was measured and, also, the condition of the crack on the surface was evaluated under the criterion described below.

○: Even with a curvature of 40 cam diameter, no crack was generated.

Δ: A crack was not generated with a curvature of 60 mm diameter; however, generation of crack was observed with a curvature of 40 mm diameter.

X: A crack was generated with a curvature of 60 mm.

[Evaluation of Scratch Resistance]

1.96 N/cm² of load was put on steel wool and, then, subjected to 30 reciprocations. Extent of scratches were observed.

○: A scratch was not noticed at all or almost unvisible scratch was slightly observed.

Δ: A distinct scratch was observed.

X: A distinct scratch was observed and peeling-off of the film was also observed.

TABLE 14

| Sample No. | Adhesion property | Brittleness | Scratch resistance | Remarks |
|---|---|---|---|---|
| 1001 | ○ | X | Δ | Comparative Example |
| 1002 | ○ | Δ | X | Comparative Example |
| 1003 | ○ | ○ | X | Comparative Example |

TABLE 14-continued

| Sample No. | Adhesion property | Brittleness | Scratch resistance | Remarks |
|---|---|---|---|---|
| 1004 | ○ | ○ | Δ | Example |
| 1005 | ○ | ○ | ○ | Example |
| 1006 | ○ | ○ | ○ | Example |
| 1007 | ○ | ○ | Δ | Example |
| 1008 | ○ | ○ | Δ | Example |

Transparent films 1004 to 1004 according to the invention had a same or better scratch resistance than Comparative Examples 1001 to 1003 which each use a photopolymerization initiator and was particularly excellent in brittleness compared with the conventional Examples.

When a fractured portion of the sample subjected to the brittleness test of Comparative Example was observed under an optical microscope, it is found that cracks were concentrated in a portion in which optically transmissive particles scarcely exist (corresponds to a valley of convex-concave profile). From this finding, it is considered that, in the transparent film having a convex-and-concave profile on the surface, when it is stretched, stress is concentrated in a portion in which the optically transmissive particles are scarce and, then, cracks were generated.

It is considered that, when an active halogen compound is used as a photopolymerization initiator, polymerization reaction on the film surface will not receive an influence of oxygen hindrance and the outermost surface has a sufficient cross-linking density and, then, even when the stress was concentrated, the cracks were not generated.

As for adhesion properties of Samples 1001 to 1008, there was no place in which the films were peeled off and, accordingly, there was no problem in adhesion.

Example 15

Sample Nos. 2001 to 2008 in which a low refractive layer was provided on the hard coat layer of each of Samples 1001 to 1008 of Example 14 were prepared.

However, an amount of the ultraviolet ray to be irradiated after the hard coat layer was applied can be reduced to a level of 90 ml/cm².

(Preparation of Applying Liquid for Low Refractive Index)

(Preparation of Sol Liquid a)

120 parts of methyl ethyl ketone, 100 parts of acryloyloxypropyl trimethoxysilane (KBM-5103: trade name; produced by Shin-Etsu Chemical Co., Ltd.), and 3 parts of diisopropoxyaluminum ethyl acetoacetate (Chelope EP-12: trade name; produced by Hope Chemical Co., Ltd.) were filled in a reactor equipped with a stirrer and a reflux condenser and mixed and, thereafter, added with 30 parts of ion-exchanged water and, then, allowed to react for 4 hours at 60° C. and, thereafter, cooled to room temperature, to thereby obtain a sol liquid a. The sol liquid a had a mass average molecular weight of 1600. Among components of oligomers or higher, components having a molecular weight of 1000 to 20000 were 100%. Further, from an analysis by gas chromatography, it is found that raw material acryloyloxypropyl trimethoxysilane did not remain at all therein.

(Preparation of Hollow Silica Fine Particle Dispersion)

500 parts of hollow silica fine particle sol (particle size: from about 40 μm to about 50 μm; shell thickness: from 6 to 8 nm; refractive index: 1.31; solid content: 20%; main solvent: isopropyl alcohol; prepared by changing the particle size in accordance with Preparation Example 4 described in JP-A No. 2002-79616) was added with 30 parts of acryloyloxypropyl trimethoxysilane (KBM-5103: trade name; produced by Shin-Etsu Chemical Co., Ltd.) and 1.5 part of diisopropoxyaluminum ethyl acetoacetate (Chelope EP-12: trade name; produced by Hope Chemical Co., Ltd.) and, then, mixed with one another and, thereafter, added with 9 parts of ion-exchanged water and, then, allowed to react for 8 hours at 60° C. and, thereafter, cooled to room temperature and, then, added with 1.8 part of acetyl acetone, to thereby obtain a hollow silica dispersion.

As for the thus-obtained hollow silica dispersion, the solid content was 18% by mass; the refractive index after the solvent was evaporated was 1.31.

(Preparation of Applying Liquid for Low Refractive Index Layer)

| | |
|---|---|
| DPHA | 3.3 g |
| Hollow silica fine particle dispersion | 40.0 g |
| RMS-033 | 0.7 g |
| Photopolymerization initiator described in Table 15 | 0.2 g |
| Sol liquid a | 6.2 g |
| Methyl ethyl ketone | 290.6 g |
| Cyclohexanone | 9.0 g |

Compounds thus used are as follows:

KBM-5103: silane coupling agent (produced by Shin-Etsu Chemical Co. Ltd.);

DPHA: a mixture of dipentaerythritol pentaacrylate and dipentaerythritol hexaacrylate (manufactured by Nippon Kayaku Co., Ltd.); and RMS-033: reactive silicone (manufactured by Gelest).

(Application of Low Refractive Index Layer)

An applying liquid for a low refractive index layer was applied on the hard coat layer by using a gravure coater. An amount of applying liquid was 5.0 ml/m² on a wet basis. After being dried for 150 seconds at 120° C., the thus-dried layer was further dried for 8 minutes at 140° C. and, then, irradiated with an ultraviolet ray while the atmosphere is purged with a nitrogen gas such that an oxygen concentration in the atmosphere came to be 0.1% by using an air-cooled metallic halide lamp of 240 W/cm (produced by Eye graphics Co., Ltd.) with an irradiation dose of 300 mJ/cm², to thereby form a low refractive index layer having a thickness of 100 nm which was, then, taken up.

[Measurement of Average Reflectivity]

A reverse face of a film was roughened with a sandpaper and colored black with a black ink, to thereby put the reverse face in a state of no reverse face reflection. In such state as described above, a specular spectral reflectivity at the side of the surface in the wavelength range of from 380 to 780 nm at an incident angle of 5° was measured by using a spectrophotometer (produced by JASCO Corporation) and, then, an arithmetic average of the specular spectral reflectivity in the wavelength range of from 450 to 650 nm was defined as an average reflectivity.

The average reflectivity of each of Sample Nos. 2001 to 2008 was 1.7%.

[Adhesion Test]

On a film surface, lines were inscribed with intervals of 1 mm×1 mm with a cutter-knife such that 100 squares were formed and CELLOTAPE® (pressure sensitive tape; No. 405: type; produced by Nichiban) was attached to the 100 squares and, left to stand for 30 seconds and, then, the tape was peeled off and behaviors of 100 squares were observed and the number of squares which were peeled off, or damaged (partially peeled off) was counted.

TABLE 15

| Sample No. | Initiator species added in low refractive index layer | Adhesion | Brittleness | Scratch resistance | Remarks |
|---|---|---|---|---|---|
| 2001 | Irgacure 184 | 4 | X | X | Comparative Example |
| 2002 | Irgacure 184 | 2 | Δ | X | Comparative Example |
| 2003 | Irgacure 184 | 3 | ○ | X | Comparative Example |
| 2004 | Illustrative compound 6 | 1 | ○ | Δ | Example |
| 2005 | Illustrative compound 10 | 1 | ○ | Δ | Example |
| 2006 | Illustrative compound 29 | 0 | ○ | ○ | Example |
| 2007 | Illustrative compound 35 | 1 | ○ | Δ | Example |
| 2008 | Illustrative compound 36 | 1 | ○ | Δ | Example |

Since an interface between the low refractive index layer and the hard coat layer is relatively weak, samples are apt to be peeled off in the adhesion test and are vulnerable in the scratch resistance test. For this reason, Comparative Examples 2001, 2002 and 2003 are each at an unfavorable level as being unacceptable in adhesion and scratch resistance.

However, according to the invention, since bonding strength between the low refractive index layer and the hard coat layer is strong, the adhesion between the low refractive index layer and the hard coat layer, and the scratch resistance are stable.

Example 16

Preparation of Protective Film for Polarizing Plate

A saponification liquid in which a 1.5 mol/L aqueous solution of sodium hydroxide was heated at 50° C. was prepared. Further, a 0.005 mol/L aqueous solution of diluted sulfuric acid was prepared.

A surface of the transparent base material at a side reverse to a side having a low refractive index layer in each of the antireflection films according to the invention prepared in Example 15 was subjected to a saponification treatment using the above-described saponification liquid.

After the aqueous sodium hydroxide solution on the surface of the resultant transparent base material was thoroughly rinsed off with water, the surface was rinsed with the above-described diluted aqueous solution of sulfuric acid and, then, sufficiently dried at 100° C.

When a contact angle of the surface of the transparent base material subjected to the saponification treatment at the side reverse to the side having the low refractive index layer of the antireflection film against water is evaluated, it was 40° or less. In such manner as described above, the protective film for the polarizing plate was prepared.

(Preparation of Polarizing Plate)

A polyvinyl alcohol film having a film thickness of 75 μm (produced by Kuraray Co., Ltd.) was dipped in an aqueous solution containing 1000 parts by mass of water, 7 parts by mass of iodine and 105 parts by mass of potassium iodide for 5 minutes to allow it to adsorb iodine.

Next, after the resultant film was monoaxially stretched in a vertical direction by 4.4 times in a 4% by mass aqueous solution of boric acid, the film was dried while being extended, to thereby prepare a polarizing film.

By using a polyvinyl alcohol type adhesive, the triacetyl cellulose face subjected to the saponification treatment of the antireflection film (protective film for polarizing plate) according to the invention was laminated on one face of the polarizing film and, further, by using the same polyvinyl alcohol type adhesive, the triacetyl cellulose film subjected to the saponification treatment similarly to the above was laminated on the other face of the polarizing film.

(Evaluation of Image Display Device)

Liquid crystal display device of transmission type, reflection type or a semi-transmission type of TN, STN, IPS, VA, or OCB mode in which the resultant polarizing plate according to the invention was provided such that the antireflection film came to be on the outermost surface thereof had a remarkable effects.

Example 17

Preparation of Polarizing Plate

In the optical compensation film having the optical compensation layer (Wideview film SA 12B; available from Fuji Photo Film Co., Ltd.), a surface at the side opposite to the side having the optical compensation layer was subjected to the saponification treatment in a same manner as in Example 16.

By using a polyvinyl alcohol type adhesive, the triacetyl cellulose face subjected to the saponification treatment of any one of the antireflection films (protective film for polarizing plate) according to the invention prepared in Example 15 was laminated on one face of the polarizing film prepared in Example 16 and, further, by using the same polyvinyl alcohol type adhesive, the triacetyl cellulose film of the optical compensation film subjected to the saponification treatment similarly to the above was laminated on the other face of the polarizing film.

(Evaluation of Image Display Device)

Liquid crystal display device of transmission type, reflection type or a semi-transmission type of TN, STN, IPS, VA, or OCB mode in which the resultant polarizing plate according to the invention was provided such that the antireflection film came to be on the outermost surface thereof had a better contrast in a bright room than the liquid crystal display device provide with the polarizing plate having no optical compensation film and had a wider viewing angle in up and down, and right and left directions and, further, was excellent in the antireflection property and, still further, excellent in visibility and display quality. Particularly, such effects and excellence were conspicuous in VA mode thereof.

Example 18

An applying liquid in which acrylic-styrene particles (co-polymerization composition ratios=50:50; refractive index: 1.536) having an average particle diameter of 6 μm was used in place of the optically transmissive particles on a same solid content basis in Comparative Sample 1001 of Examples 14 was prepared. Further, a plurality of applying liquids which vary polymerization initiator species form one another and applied as a hard coat layer on the triacetyl cellulose film (TD80UF: trade name; produced by Fuji Photo Film Co., Ltd.) by using a gravure coater while changing the applying amount in order to realize a film thickness of 15 μm. After being dried at 110° C., the thus-applied layer was cured by irradiating with an ultraviolet ray while the atmosphere is purged with a nitrogen gas such that an oxygen concentration in the atmosphere came to be 0.1% by volume or less by using an air-cooled metallic halide lamp of 160 W/cm (produced by Eye graphics Co., Ltd.) at an illuminance of 300 mW/cm$^2$ with an irradiation dose of 225 mJ/cm$^2$, to thereby form a hard coat layer.

Such hard coat layers were designated as Samples 3001 to 3005 and, then, the prepared transparent film was evaluated in a same manner as in Example 14. The results are shown in Table 16. In Table 16, amounts of compounds to be added are each indicated as relative numbers when the mol number of the amount of Irgacure 184 to be added is designated as 100.

TABLE 16

| Sample No. | Initiator (added amount) | Surface haze (%) | Center line average roughness Ra (μm) | Adhesion | Brittleness | Scratch resistance | Remarks |
|---|---|---|---|---|---|---|---|
| 3001 | Irgacure 184 (100) | 12.3 | 0.32 | 3 | X | ○ | Comparative Example |
| 3002 | Irgacure 184 (75) Illustrative compound 6 (25) | 12.2 | 0.30 | 0 | ○ | ○ | Example |
| 3003 | Irgacure 184 (50) Illustrative compound 6 (50) | 12.4 | 0.33 | 0 | ○ | ○ | Example |
| 3004 | Irgacure 184 (25) Illustrative compound 6 (75) | 12.1 | 0.32 | 0 | Δ | ○ | Example |
| 3005 | Illustrative compound 6 (100) | 12.5 | 0.34 | 0 | Δ | ○ | Example |

Comparative Example 3001 and Examples 3002 to 3005 according to the invention showed an approximately same antiglare property as a sensory evaluation.

Since Comparative Example 3001 was set to have a film thickness of 15 μm, there was no problem in the scratch resistance; however, the film thickness itself is large, the adhesion and the brittleness were each found to be at an unacceptable level.

On the other hand, Samples 3002 to 3005 according to the invention was found to have a favorable scratch resistance and, further, adhesion and brittleness were more advantageous than Comparative Example 501.

INDUSTRIAL APPLICABILITY

In the image display device provided with the transparent film (particularly, the reflection preventing film) or the polarizing plate of the present invention, not only ghost of other light or ghost of background is little whereby visual confirmation is significantly high but also resistance to scratch and brittleness are better as compared with the conventional ones.

Moreover, in accordance with the manufacturing method of the present invention, the aforementioned transparent film (particularly, the reflection preventing film) is able to be manufactured at a low cost.

The entire disclosure of each and every foreign patent application from which the benefit of foreign priority has been claimed in the present application is incorporated herein by reference, as if fully set forth.

The invention claimed is:

1. A transparent film comprising:
   a transparent support; and
   a hard coat layer,
   wherein the hard coat layer is a layer which is obtained by:
   applying an applying composition comprising an ionizing radiation curable compound and at least one active halogen compound;
   drying; and
   hardening by irradiation of ionizing radiation,
   wherein the at least one active halogen compound comprises a compound represented by at least one of the following formulae (2) to (4):

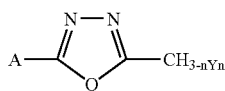

Formula (2)

wherein in the formula (2), A is phenyl group, naphthyl group, substituted phenyl group or substituted naphthyl group in which a substituent is halogen atom, an alkyl group, an alkoxy group, nitro group, cyano group or methylenedioxy group; Y is halogen atom; and n is an integer of 1 to 3;

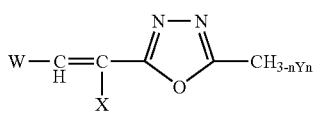

Formula (3)

wherein in the formula (3), W is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, phenyl group or an alkyl group having 1 to 3 carbon(s); Y is halogen atom; and n is an integer of 1 to 3;

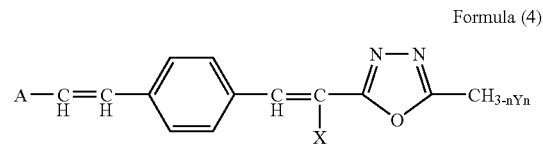

Formula (4)

wherein in the formula (4), A is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, halogen atom, cyano group, an alkyl group or an alkyl group; Y is halogen atom; and n is an integer of 1 to 3.

2. The transparent film according to claim 1, wherein the ionizing radiation curable compound is a compound having two or more ethylenic unsaturated groups.

3. The transparent film according to claim 2, wherein the applying composition forming the hard coat layer further comprises a good solvent and a poor solvent to the ionizing radiation curable compound.

4. The transparent film according to claim 1, wherein the applying composition forming the hard coat layer further comprises light-transmitting particles having an average particle size of 0.5 to 10.0 μm.

5. The transparent film according to claim 4, wherein an average roughness of center line (Ra) of a surface of the hard coat layer is 0 to 0.5 μm.

6. The transparent film according to claim 4, wherein a surface haze of the hard coat layer is 0 to 40%.

7. The transparent film according to claim 1, further comprising:
   a low refractive layer where refractive index is less than the hard coat layer to an extent of 0.05 or more, the low refractive layer provided at an opposite side to the transparent support with respect to the hard coat layer.

8. The transparent film according to claim 7, wherein the low refractive layer is formed by using an applying composition comprising a fluorine-containing polymer.

9. The transparent film according to claim 8, wherein the fluorine-containing polymer is represented by the following formula 1:

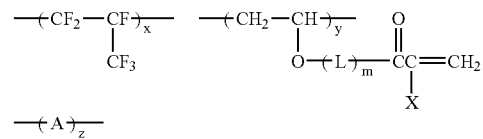

Formula 1

In the formula 1, L is a connecting group having 1 to 10 carbon(s); m is 0 or 1; X is hydrogen atom or methyl group; A is any polymer unit of vinyl monomer, A may be either a single component or may be constituted from plural components, and A may comprise a silicone moiety; x, y and z each is molar % of each constituting component and is a value satisfying the relation of $30 \leqq x \leqq 60$, $5 \leqq y \leqq 70$ and $0 \leqq z \leqq 65$ with a proviso that $x+y+z=100$.

10. The transparent film according to claim 8, wherein the applying composition forming the low refractive layer comprises a polysiloxane-containing vinyl monomer.

11. The transparent film according to claim 10, wherein the polysiloxane-containing vinyl monomer is represented by the following formula I:

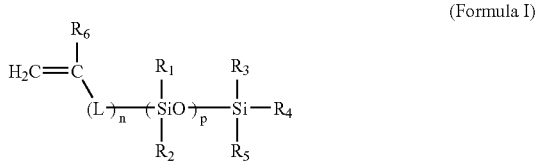

(Formula I)

wherein in the formula I, $R_1$ and $R_2$ may be same or different and each represents hydrogen atom, an alkyl group or an aryl group; p represents an integer of 10 to 500; $R_3$, $R_4$ and $R_5$ may be same or different and each represents hydrogen atom or a univalent organic group; $R_6$ represents hydrogen atom or a methyl group; L represents a single bond or a divalent connecting group; and n represents 0 or 1.

12. The transparent film according to claim 7, wherein the low refractive layer comprises fine hollow silica particles.

13. A transparent film according to claim 7, wherein the low refractive layer is a layer which is obtained by:
applying on a transparent support an applying composition comprising an ionizing radiation curable compound and at least one kind of active halogen compound;
drying; and
hardening by irradiation of ionizing radiation.

14. The transparent film according to claim 7, wherein the reflection preventing layer is manufactured by a method comprising the step (1) and step (2) or (3) to form at least one layer of layers which are layered on the transparent support:
(1) a step where an applying liquid comprising at least one kind of active halogen compound and an ionizing radiation curable compound is applied on a web containing the transparent support which runs continuously and then dried to form an applied layer;
(2) a step where ionizing radiation is irradiated for 0.5 second or longer under an atmosphere of not more than 3% by volume of oxygen concentration on the applied layer of the web to harden the applied layer; and
(3) a step where the applied layer on the web is irradiated, together with heating, with ionizing radiation for 0.5 second or longer under an atmosphere of not more than 3% of oxygen concentration.

15. The transparent film according to claim 1, further comprising
an antistatic layer provided between the transparent support and the hard coat layer.

16. The transparent film according to claim 1, wherein the hard coat layer is manufactured by a method comprising the step (1) and step (2) or (3) to form at least one layer of layers which are layered on the transparent support:
(1) a step where an applying liquid comprising at least one kind of active halogen compound and an ionizing radiation curable compound is applied on a web containing the transparent support which runs continuously and then dried to form an applied layer;
(2) a step where ionizing radiation is irradiated for 0.5 second or longer under an atmosphere of not more than 3% by volume of oxygen concentration on the applied layer of the web to harden the applied layer; and
(3) a step where the applied layer on the web is irradiated, together with heating, with ionizing radiation for 0.5 second or longer under an atmosphere of not more than 3% of oxygen concentration.

17. The transparent film according to claim 1, wherein the transparent film is an antireflection film.

18. The transparent film according to claim 17, wherein the transparent film further comprises an antireflection layer, wherein the transparent support, the hard coat layer and the antireflection layer are provided in this order.

19. The transparent film according to claim 17, wherein the transparent film further comprises an antireflection layer for reducing a reflectance by optical interference, wherein the transparent support, the hard coat layer and the antireflection layer are provided in this order.

20. A transparent film comprising:
a transparent support; and
a reflection preventing layer and a hard coat layer,
wherein the reflection preventing layer is a layer which is obtained by hardening a compound comprising at least one active halogen compound and an ionizing radiation curable compound with irradiation of ionizing radiation, the active halogen compound being a compound represented by the following formulae (1) to (4):

Formula (1)

In the formula (1), X represents halogen atom; Y represents —CX$_3$, —NH$_2$, —NHR', —NR'$_2$ or —OR' in which R' is an alkyl group or an aryl group; and R is —CX$_3$, an alkyl group, a substituted alkyl group, an aryl group, a substituted aryl group or a substituted alkenyl group;

Formula (2)

In the formula (2), A is phenyl group, naphthyl group, substituted phenyl group or substituted naphthyl group in which a substituent is halogen atom, an alkyl group, an alkoxy group, nitro group, cyano group or methylenedioxy group; Y is halogen atom; and n is an integer of 1 to 3;

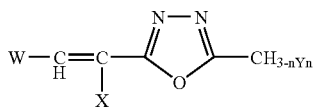

Formula (3)

In the formula (3), W is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, phenyl group or an alkyl group having 1 to 3 carbon(s); Y is halogen atom; and n is an integer of 1 to 3;

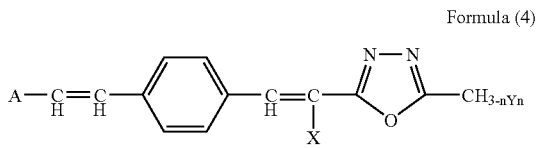

Formula (4)

In the formula (4), A is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, halogen atom, cyano group, an alkyl group or an alkyl group; Y is halogen atom; and n is an integer of 1 to 3, and wherein the hard coat layer is a layer which is obtained by:

applying an applying composition comprising an ionizing radiation curable compound and at least one active halogen compound;

drying; and hardening by irradiation of ionizing radiation, wherein the at least one active halogen compound comprises a compound represented by at least one of the following formulae (2) to (4):

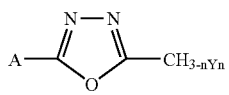

Formula (2)

wherein in the formula (2), A is phenyl group, naphthyl group, substituted phenyl group or substituted naphthyl group in which a substituent is halogen atom, an alkyl group, an alkoxy group, nitro group, cyano group or methylenedioxy group; Y is halogen atom; and n is an integer of 1 to 3;

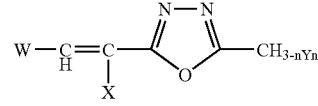

Formula (3)

wherein in the formula (3), W is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, phenyl group or an alkyl group having 1 to 3 carbon(s); Y is halogen atom; and n is an integer of 1 to 3;

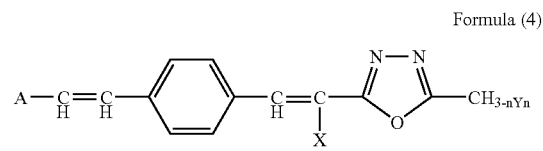

Formula (4)

wherein in the formula (4), A is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, halogen atom, cyano group, an alkyl group or an alkyl group; Y is halogen atom; and n is an integer of 1 to 3.

21. A method for the manufacture of a transparent film comprising at least one of a hard coat layer and a reflection preventing layer, the method comprising the step (1) and step (2) or (3) to form at least one layer of layers which are layered on the transparent support:

(1) a step where an applying liquid comprising at least one active halogen compound and an ionizing radiation curable compound is applied on a web containing the transparent support which runs continuously and then dried to form an applied layer;

(2) a step where ionizing radiation is irradiated for 0.5 second or longer under an atmosphere of not more than 3% by volume of oxygen concentration on the applied layer of the web to harden the applied layer; and (3) a step where the applied layer on the web is irradiated, together with heating, with ionizing radiation for 0.5 second or longer under an atmosphere of not more than 3% of oxygen concentration, wherein the at least one active halogen compound comprises a compound represented by at least one of the following formulae (2) to (4):

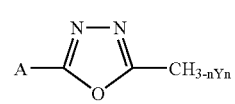

Formula (2)

wherein in the formula (2), A is phenyl group, naphthyl group, substituted phenyl group or substituted naphthyl group in which a substituent is halogen atom, an alkyl group, an alkoxy group, nitro group, cyano group or methylenedioxy group; Y is halogen atom; and n is an integer of 1 to 3;

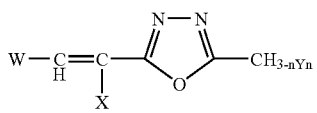

Formula (3)

wherein in the formula (3), W is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, phenyl group or an alkyl group having 1 to 3 carbon(s); Y is halogen atom; and n is an integer of 1 to 3;

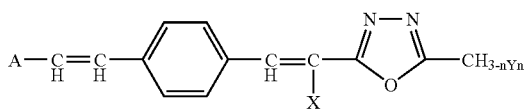

Formula (4)

wherein in the formula (4), A is unsubstituted or substituted phenyl group or unsubstituted naphthyl group in which a substituent for phenyl group is halogen atom, nitro group, cyano group, an alkyl group having 1 to 3 carbon(s) or an alkoxy group having 1 to 4 carbon(s) where numbers of the substituent is 1 or 2 when the substituent is halogen atom while, when the substituent is other group, it is 1; X is hydrogen atom, halogen atom, cyano group, an alkyl group or an alkyl group; Y is halogen atom; and n is an integer of 1 to 3.

22. The method for the manufacture of transparent film according to claim 21,
wherein, after the step (1) for forming the applied layer, (4) a step where the applied layer of the web is heated so that the applied layer is hardened by heating is provided and, after that, the step (2) or (3) is provided.

23. The method for the manufacture of the transparent film according to claim 21,
wherein the web being continuously run and subjected to the step (1) or step (4) is conveyed in a previous chamber where oxygen concentration is made low by infusion of inert gas and, further, the web is conveyed in an ionizing radiation reaction chamber, being provided in connection with the previous chamber, where oxygen concentration is made not more than 3% by volume by infusion of inert gas whereupon a hardening step of the applied layer is conducted in the ionizing radiation reaction chamber.

24. A polarizing plate comprising:
a polarizing film; and
two protective films for the polarizing film,
wherein one of the two protective films is the transparent film according to claim 1.

25. An image display device comprising:
a display; and
one of: a transparent film; and a polarizing plate comprising:
a polarizing film; and
two protective films for the polarizing film,
wherein one of the two protective films is a transparent film, provided at the outermost surface of the display wherein the transparent film or one of the two protective films is the transparent film according to claim 1.

* * * * *